(12) United States Patent
Park

(10) Patent No.: US 8,292,367 B2
(45) Date of Patent: Oct. 23, 2012

(54) PUMPING DEVICE FOR SEAT CUSHION OF VEHICLE

(75) Inventor: Jiyong Park, Busan (KR)

(73) Assignee: DAS Corporation, Gyeongsangbuk-do (KR)

( * ) Notice: Subject to any disclaimer, the term of this patent is extended or adjusted under 35 U.S.C. 154(b) by 656 days.

(21) Appl. No.: 12/311,221

(22) PCT Filed: Sep. 20, 2007

(86) PCT No.: PCT/KR2007/004582
§ 371 (c)(1),
(2), (4) Date: Mar. 23, 2009

(87) PCT Pub. No.: WO2008/038943
PCT Pub. Date: Apr. 3, 2008

(65) Prior Publication Data
US 2009/0273218 A1    Nov. 5, 2009

(30) Foreign Application Priority Data

Sep. 26, 2006   (KR) .................. 10-2006-0093429
Mar. 21, 2007   (KR) .................. 10-2007-0027638

(51) Int. Cl.
*A47C 7/02*        (2006.01)
*F16D 67/02*       (2006.01)
*A47C 3/20*        (2006.01)

(52) U.S. Cl. ..................................... 297/344.12; 192/15
(58) Field of Classification Search ............. 297/344.12; 192/15
See application file for complete search history.

(56) References Cited

U.S. PATENT DOCUMENTS

| | | | | |
|---|---|---|---|---|
| 6,481,557 B2* | 11/2002 | Denis | ........................... | 192/223.2 |
| 6,641,215 B2* | 11/2003 | Rohee | ....................... | 297/344.12 |
| 6,955,251 B2* | 10/2005 | Kurita et al. | ..................... | 192/19 |
| 7,032,731 B2* | 4/2006 | Kim | ................................ | 192/15 |
| 7,182,196 B2* | 2/2007 | Weber | ......................... | 192/223.1 |
| 7,651,164 B2* | 1/2010 | Garnier et al. | ............ | 297/344.12 |

FOREIGN PATENT DOCUMENTS

| | | |
|---|---|---|
| JP | 2002-45254 | 2/2002 |
| JP | 2002-266903 | 9/2002 |
| JP | 2004-338426 | 12/2004 |
| KR | 10-2005-0007915 | 1/2005 |

* cited by examiner

*Primary Examiner* — David Dunn
*Assistant Examiner* — Tania Abraham
(74) *Attorney, Agent, or Firm* — Dickstein Shapiro LLP

(57) ABSTRACT

The present invention relates to a pumping device for a seat cushion of a vehicle, in which a brake assembly 40 is disposed outside a clutch assembly 30 and parts are arranged in a line, such that it is possible to reduce the entire size, volume, and weight, thereby reducing cost. Further, because it is possible to prevent pollution of parts, it is possible to improve the durability, performance, and quality. Furthermore, it is possible to reduce operational noise and improve operational sensitivity.

23 Claims, 44 Drawing Sheets

[Fig. 1]
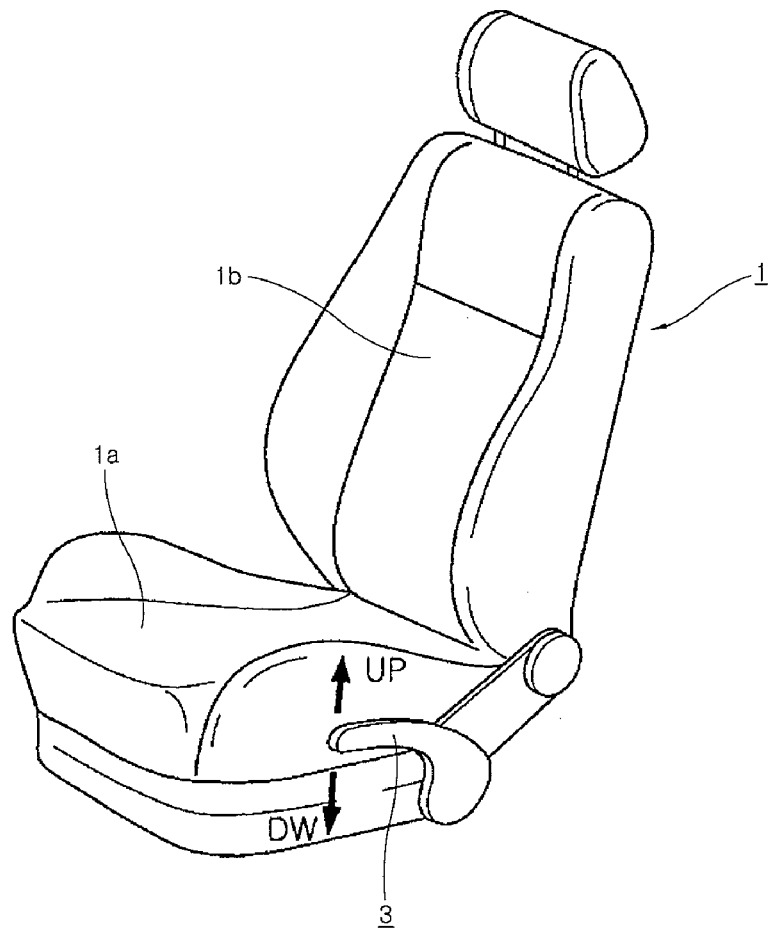
[Fig. 2]
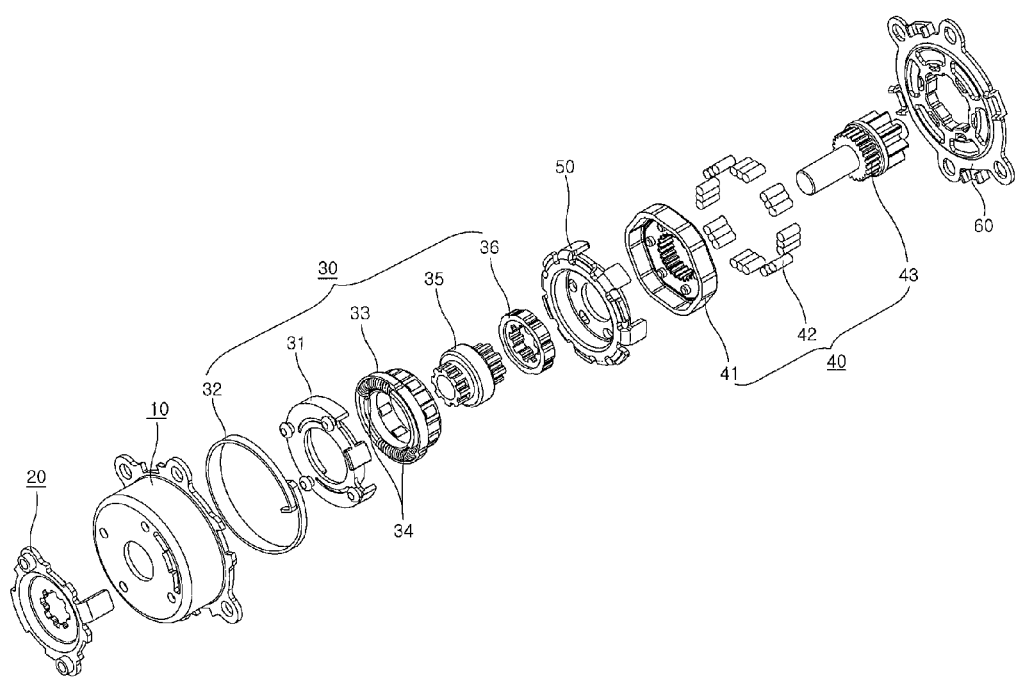

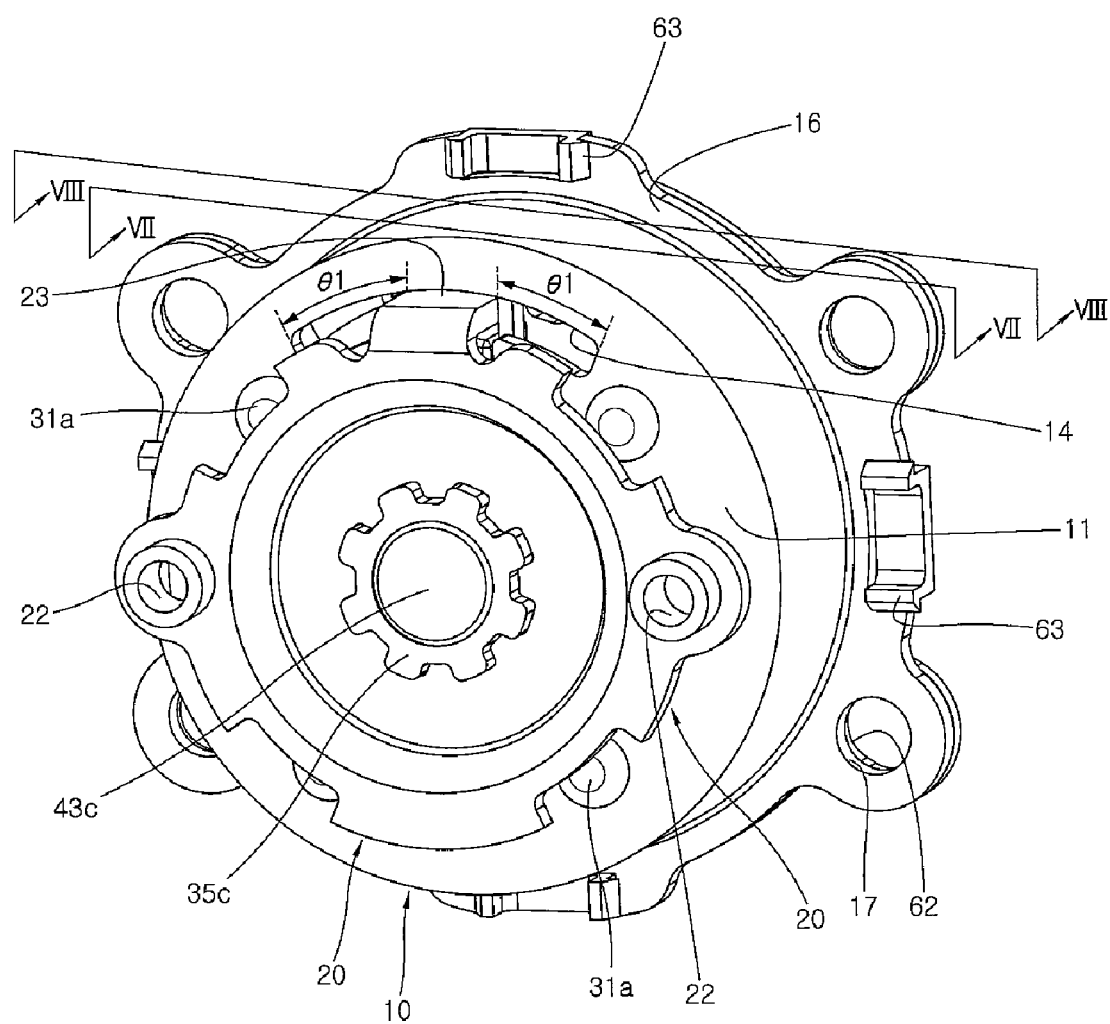
[Fig. 3]

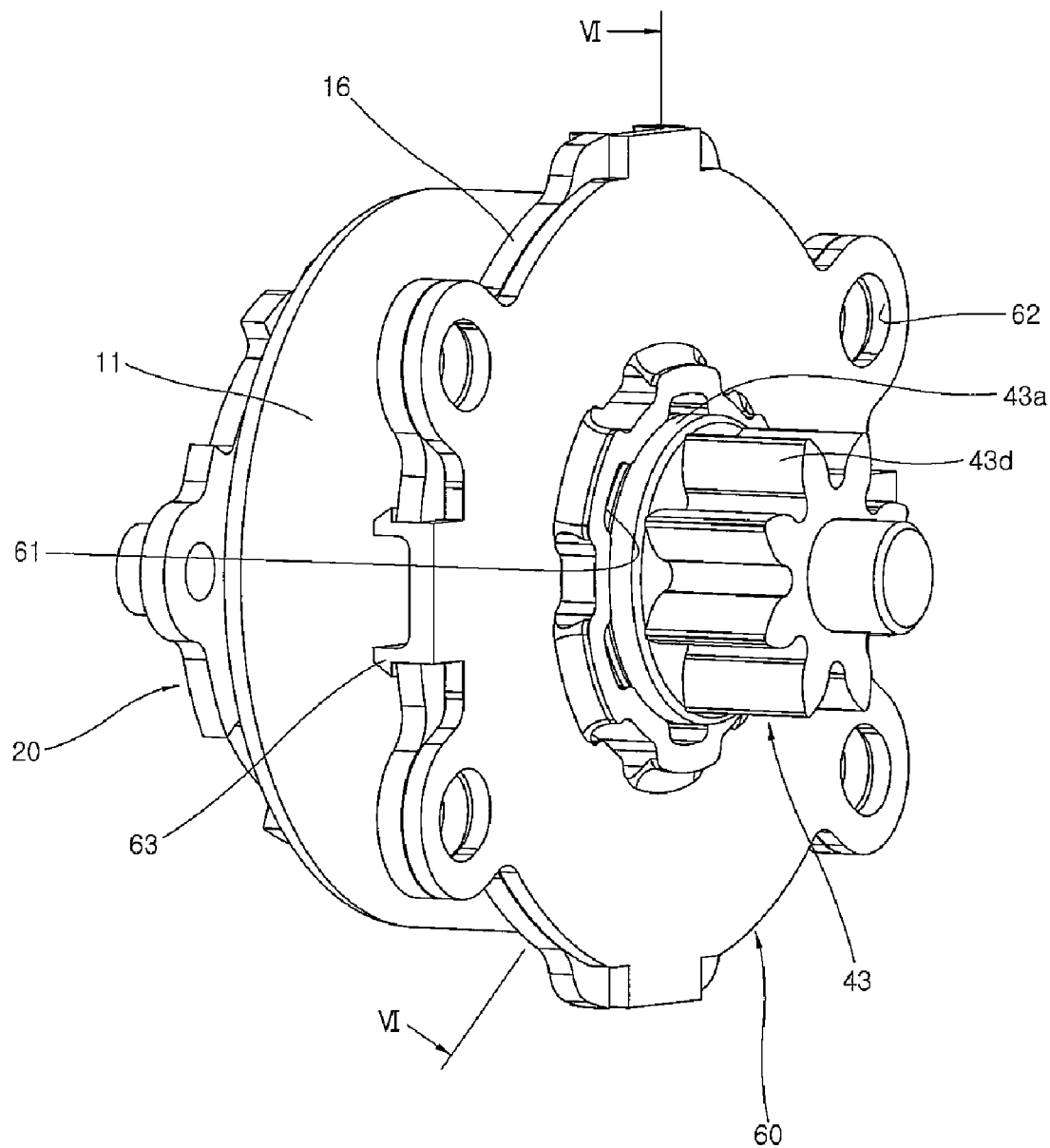
[Fig. 4]

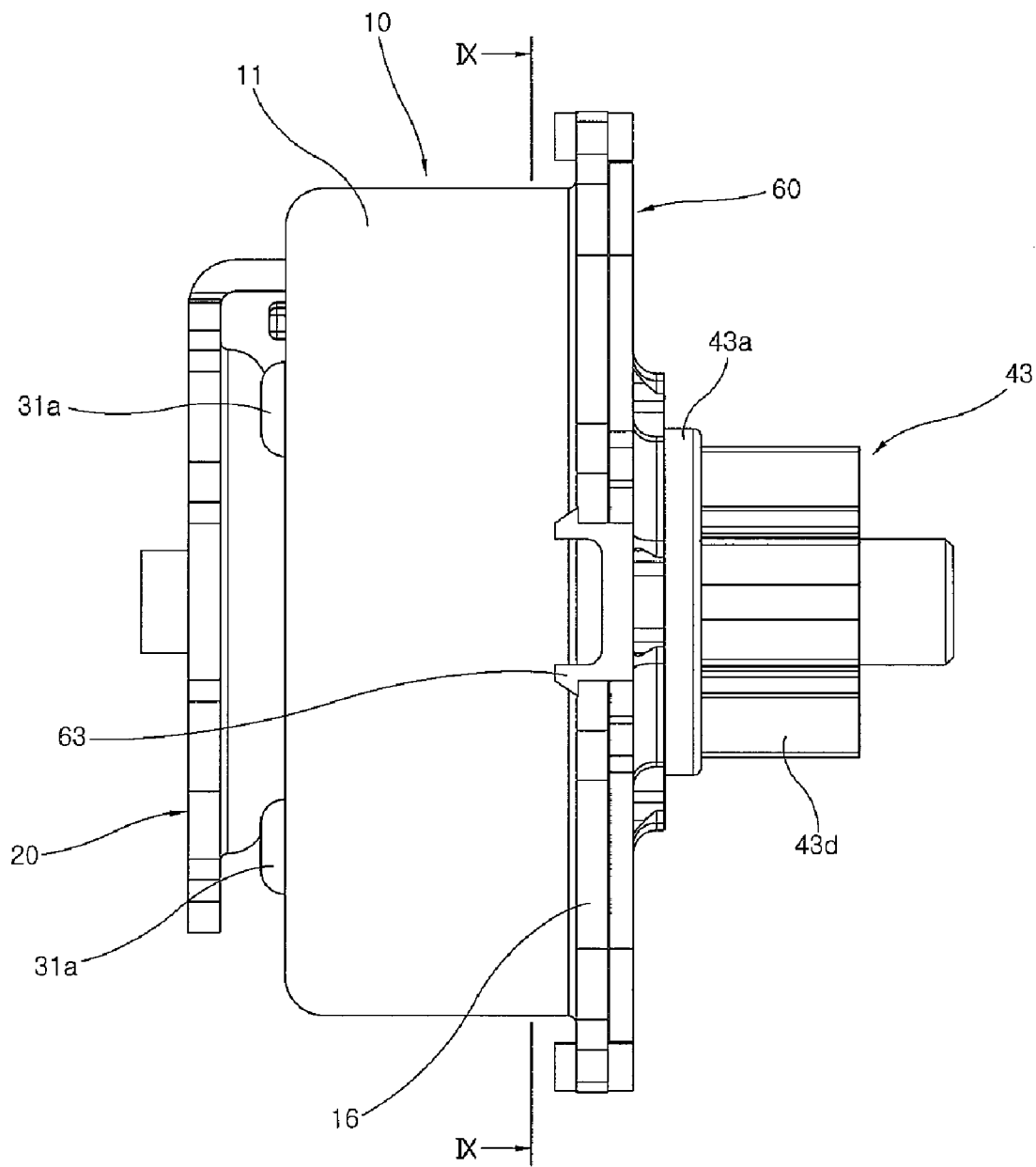
[Fig. 5]

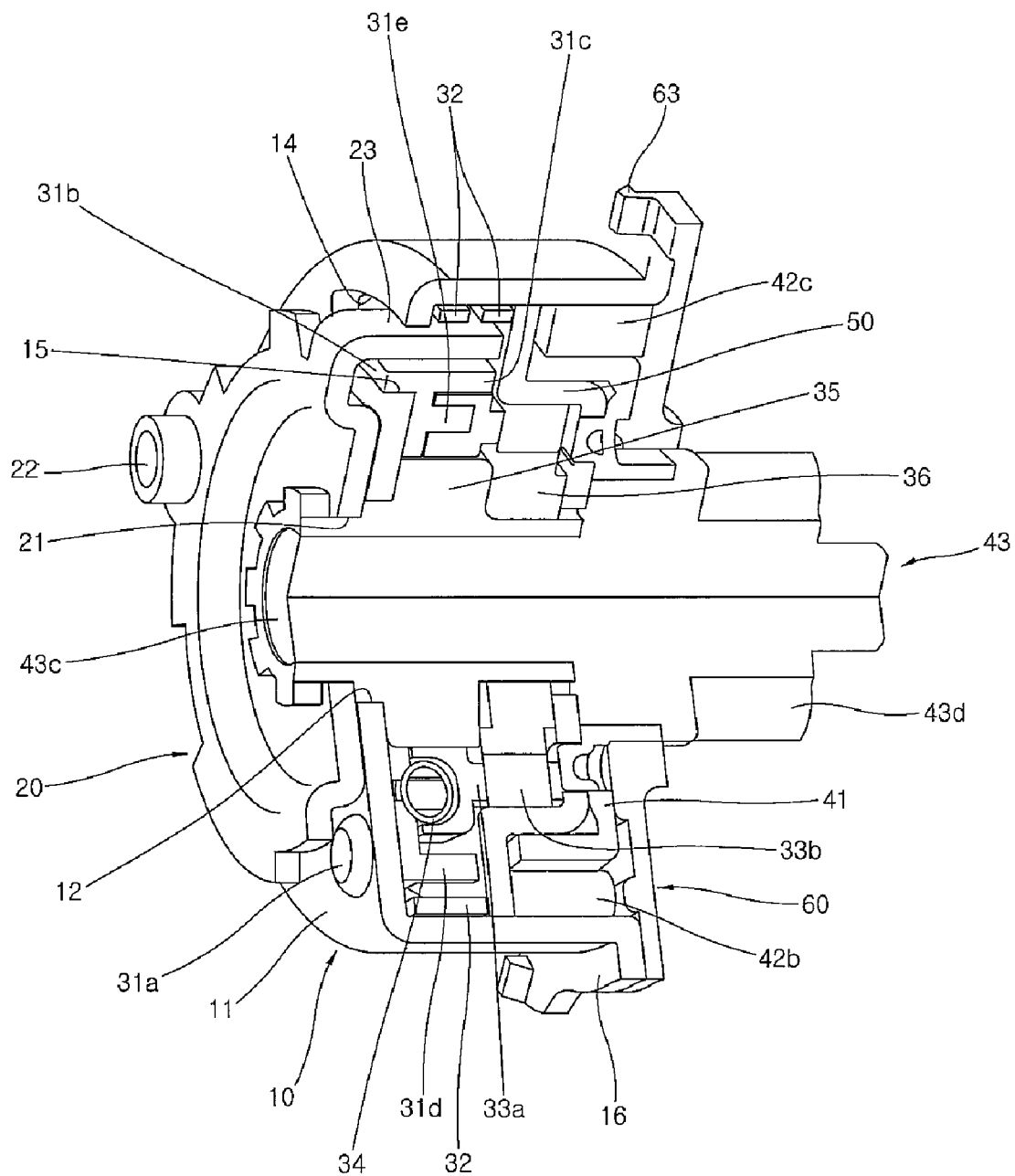
[Fig. 6]

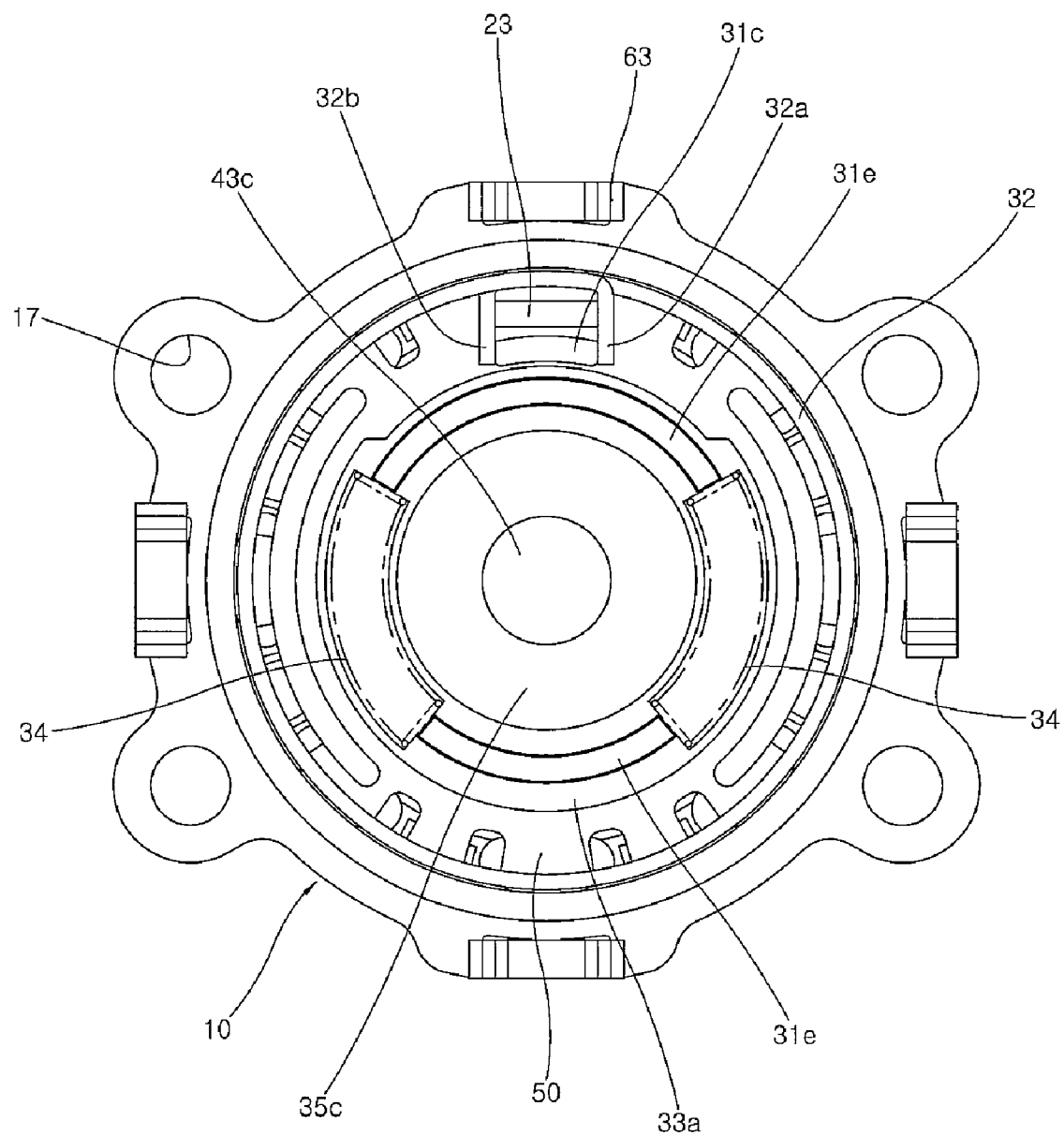
[Fig. 7]

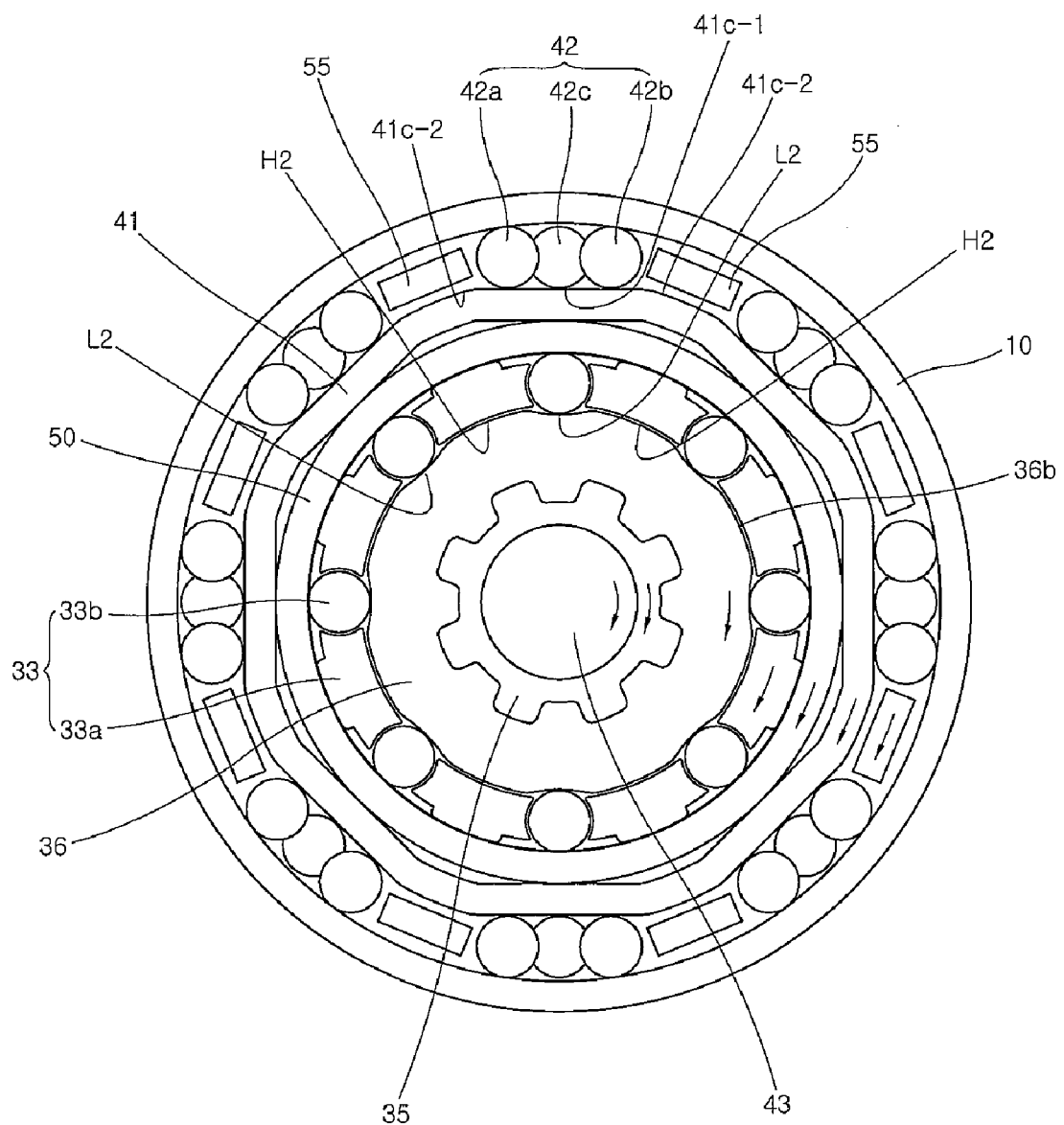
[Fig. 8]

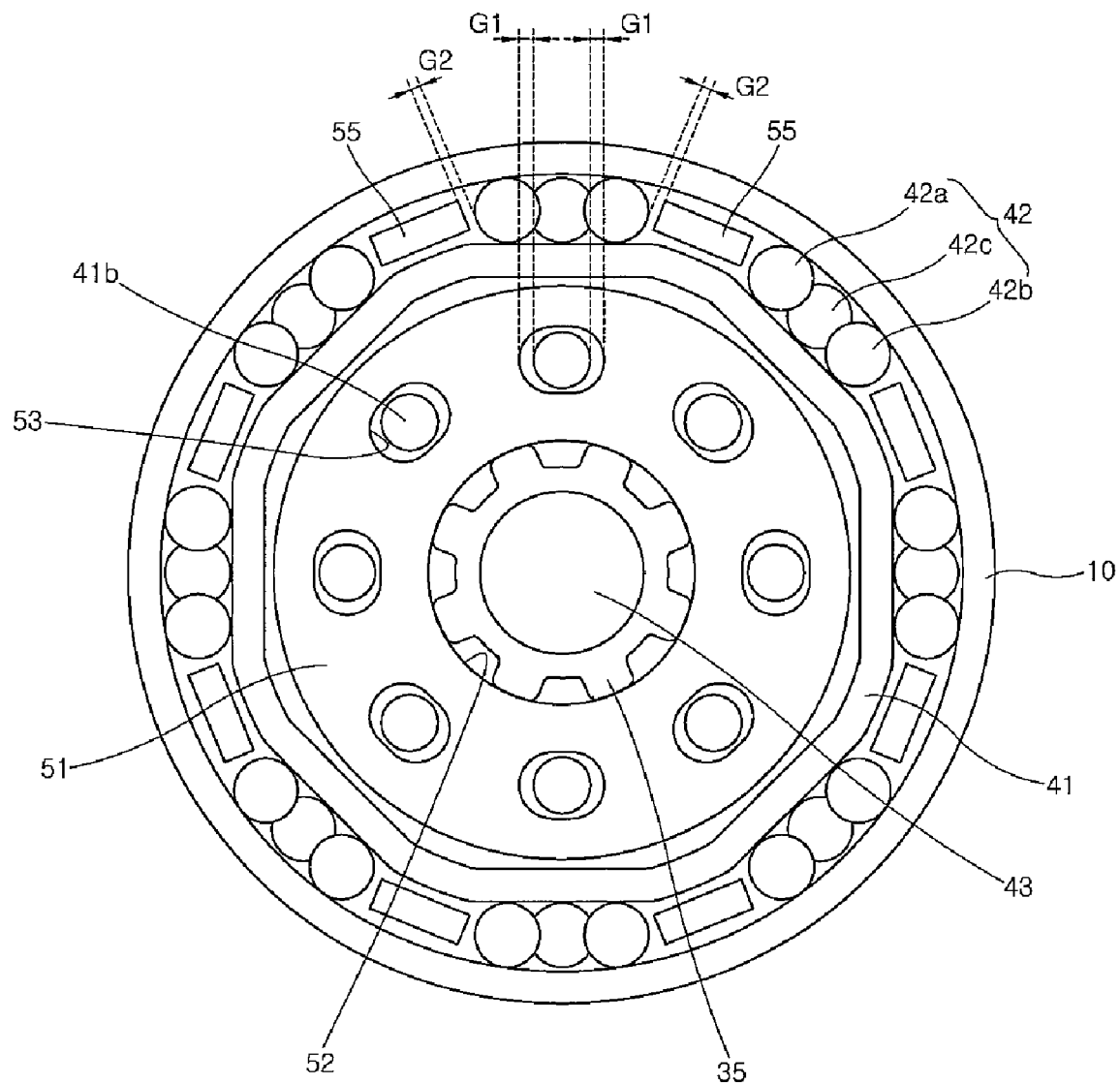
[Fig. 9]

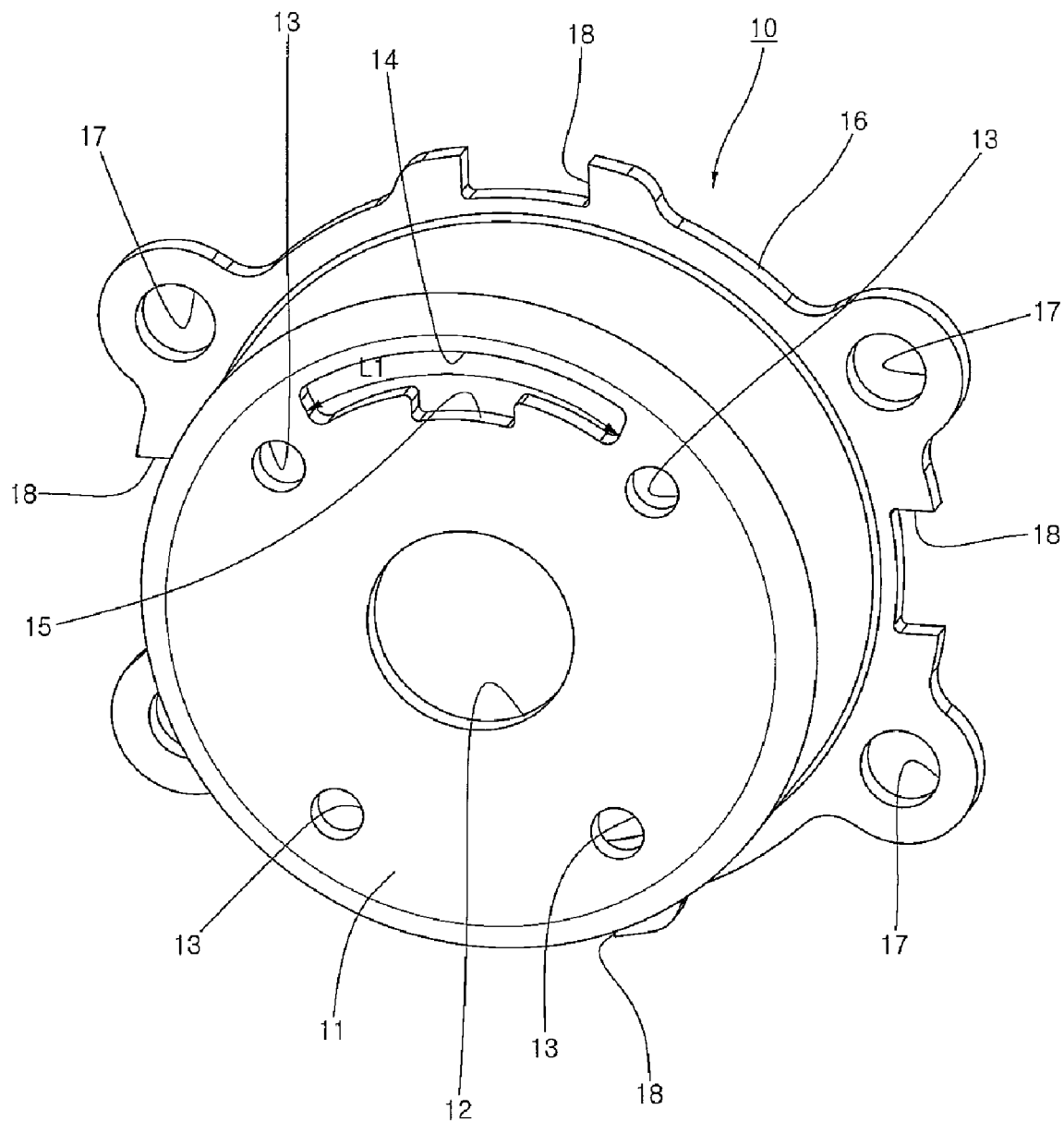
[Fig. 10]

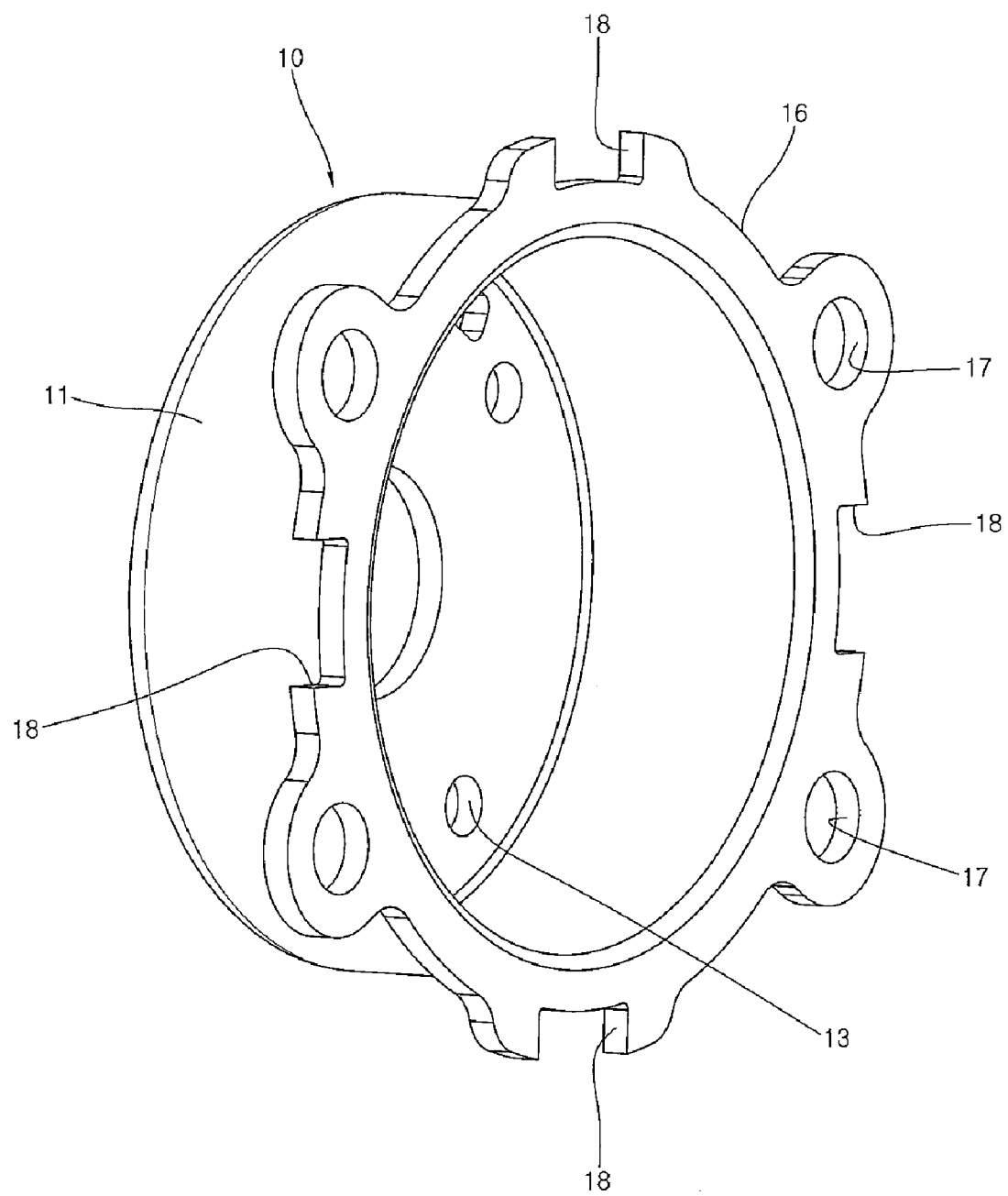
[Fig. 11]

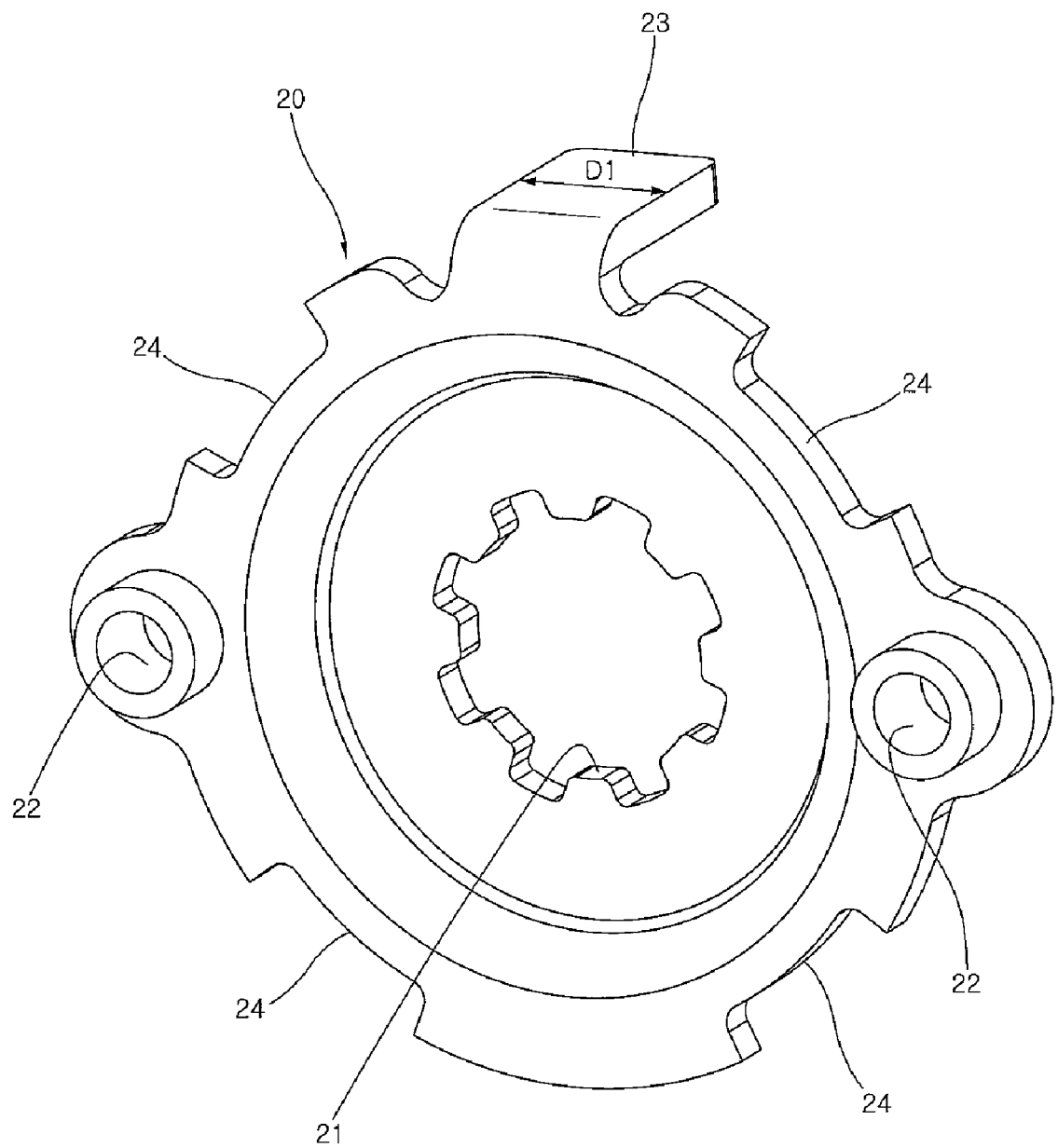
[Fig. 12]

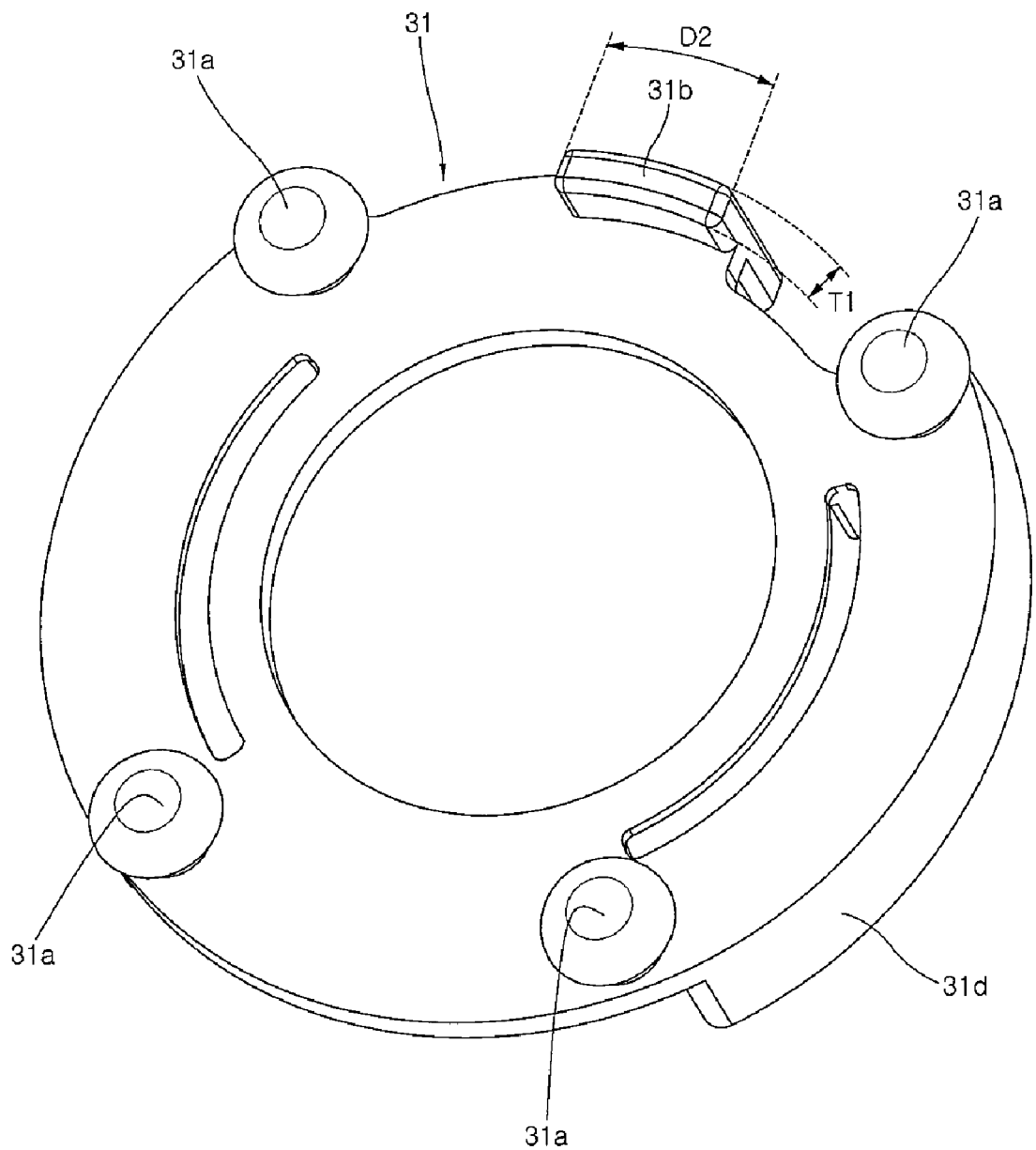
[Fig. 13]

[Fig. 14]
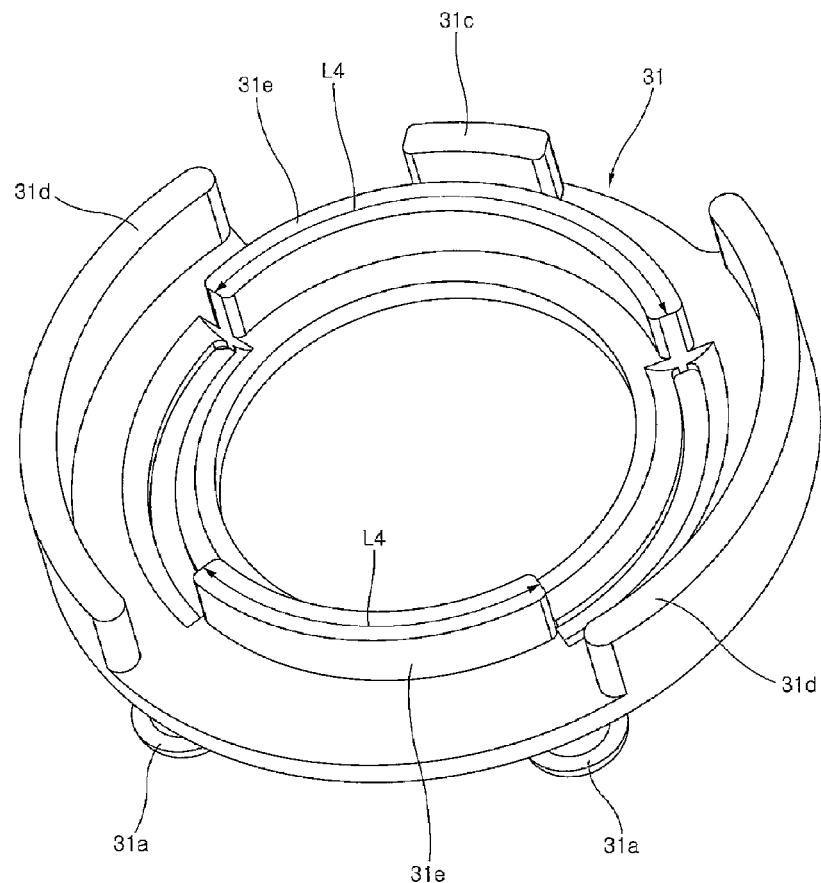
[Fig. 15]
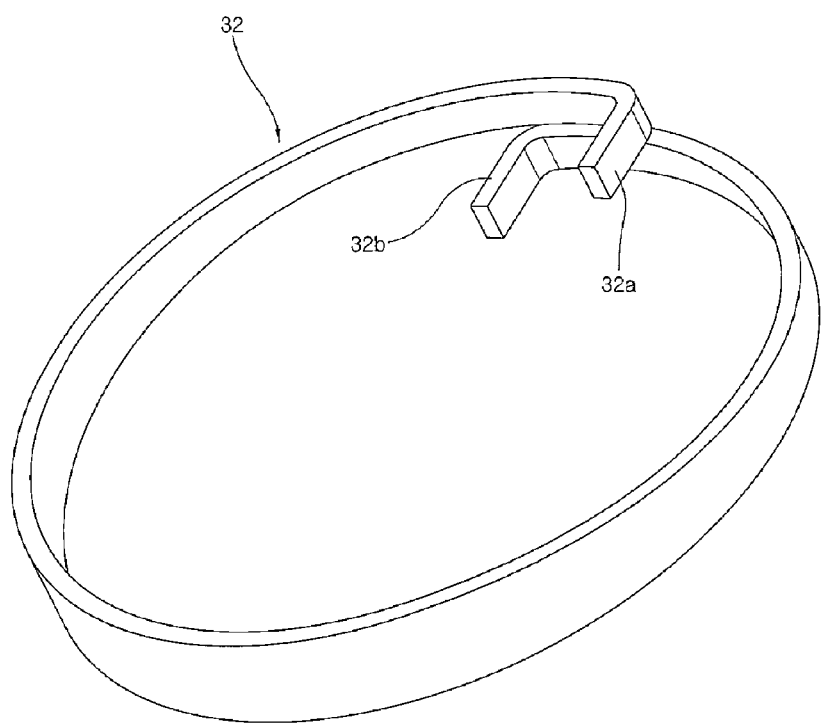

[Fig. 16]
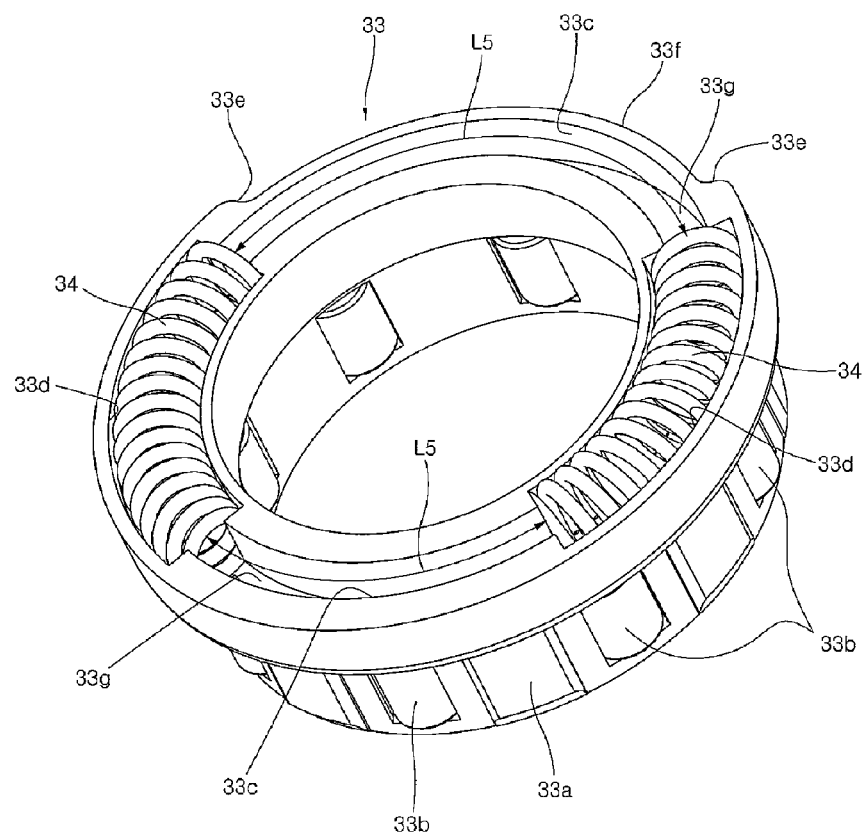
[Fig. 17]
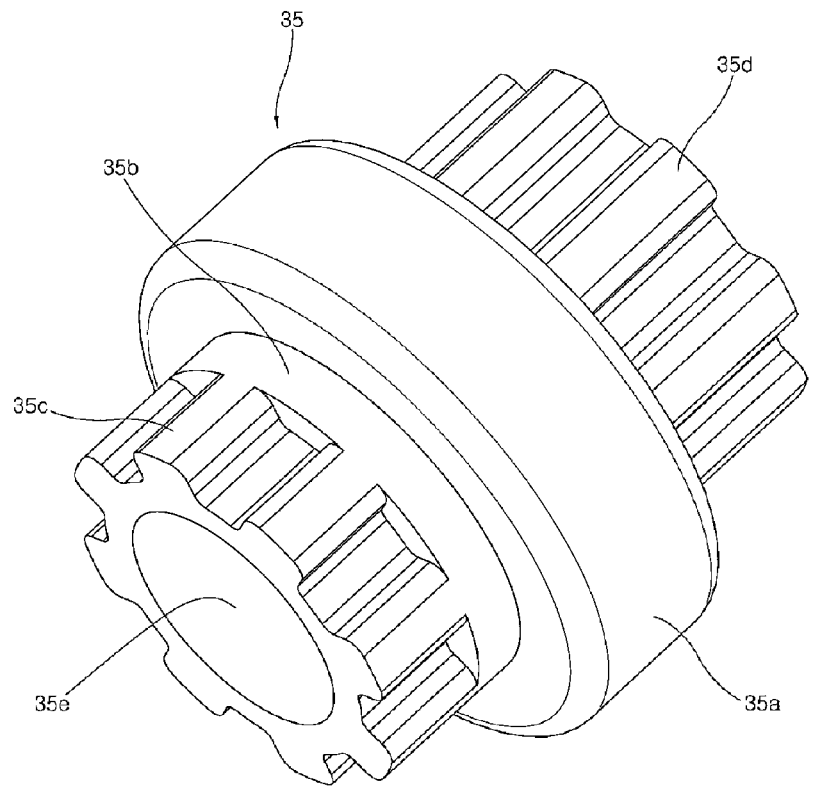

[Fig. 18]
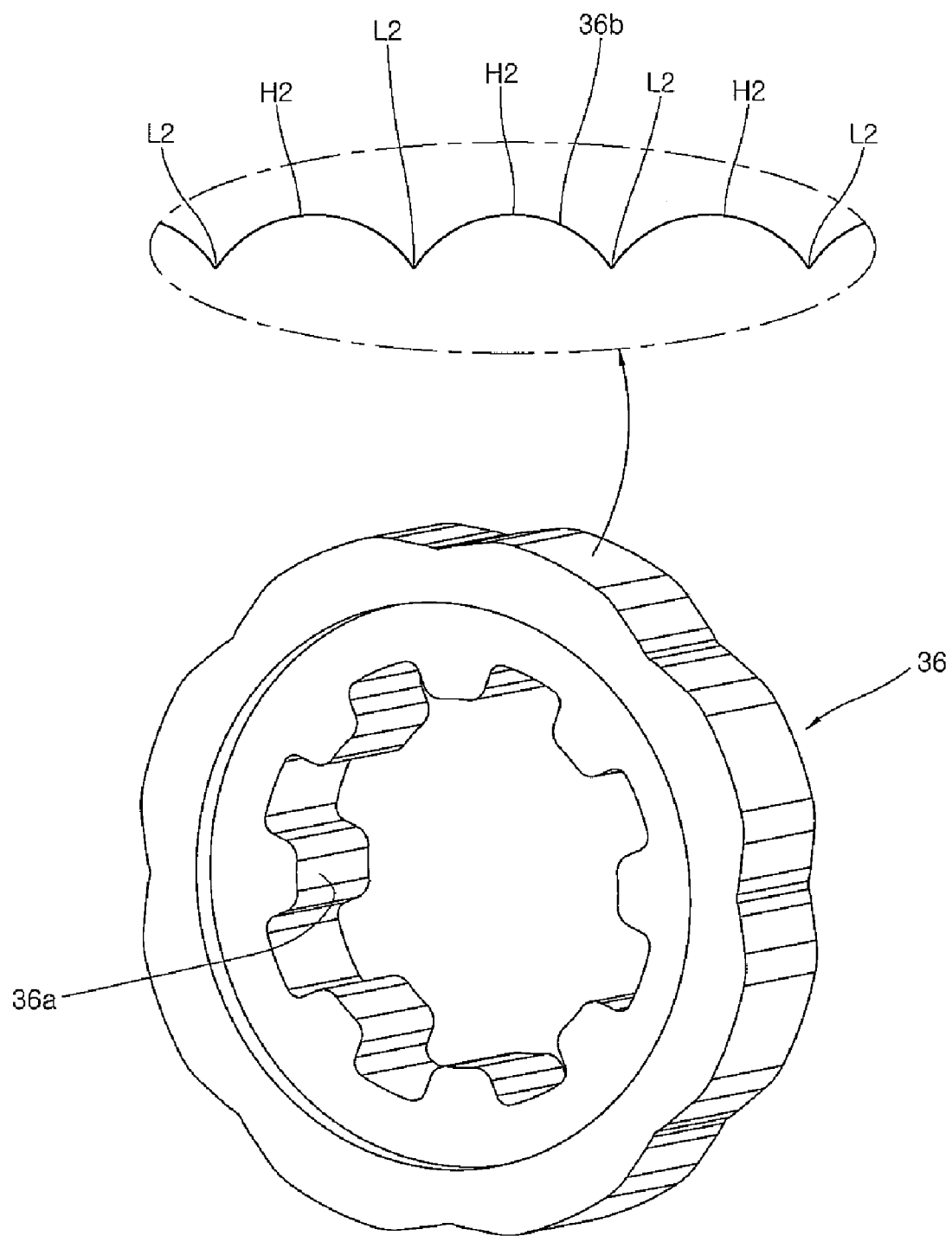

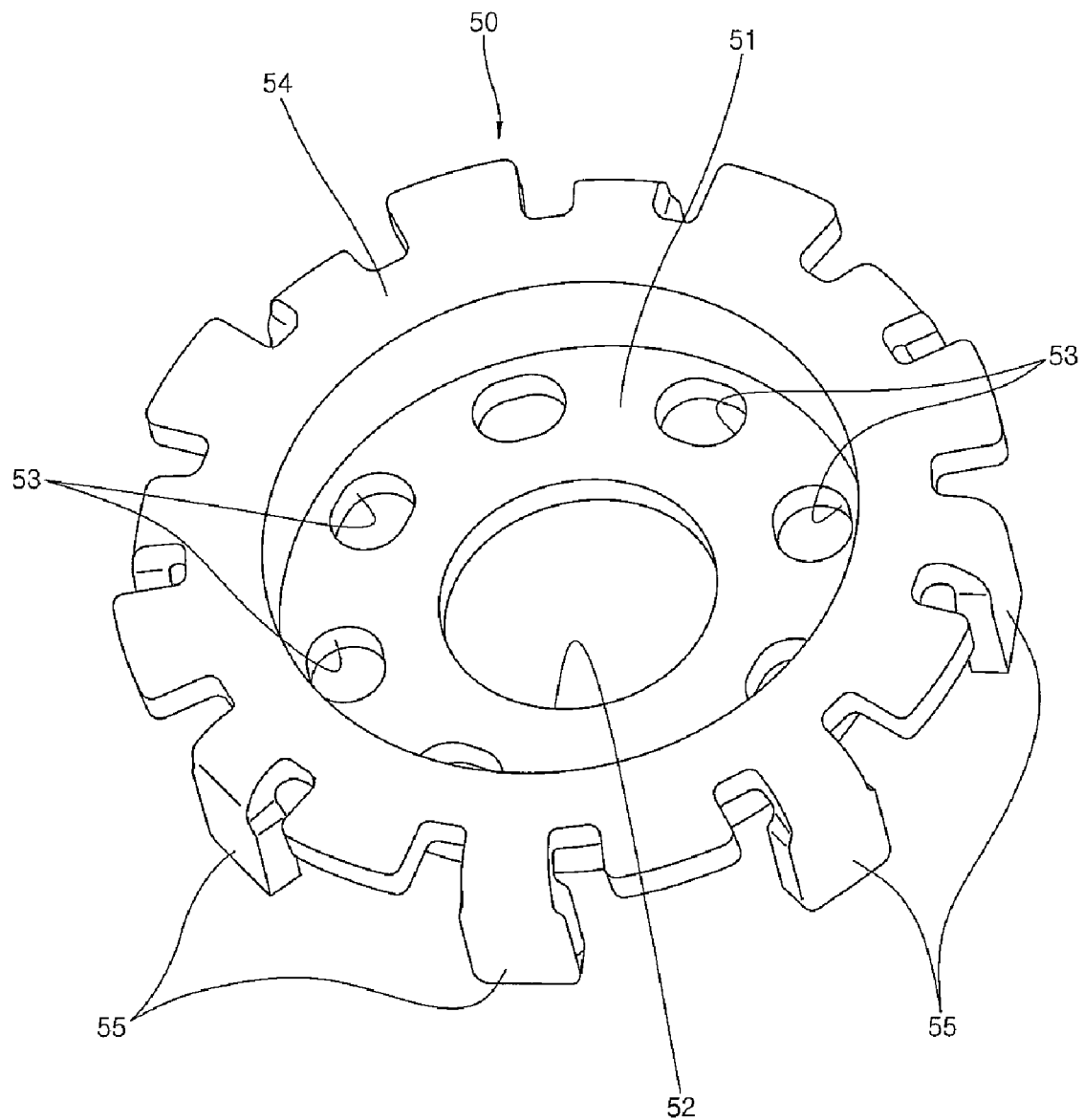
[Fig. 19]

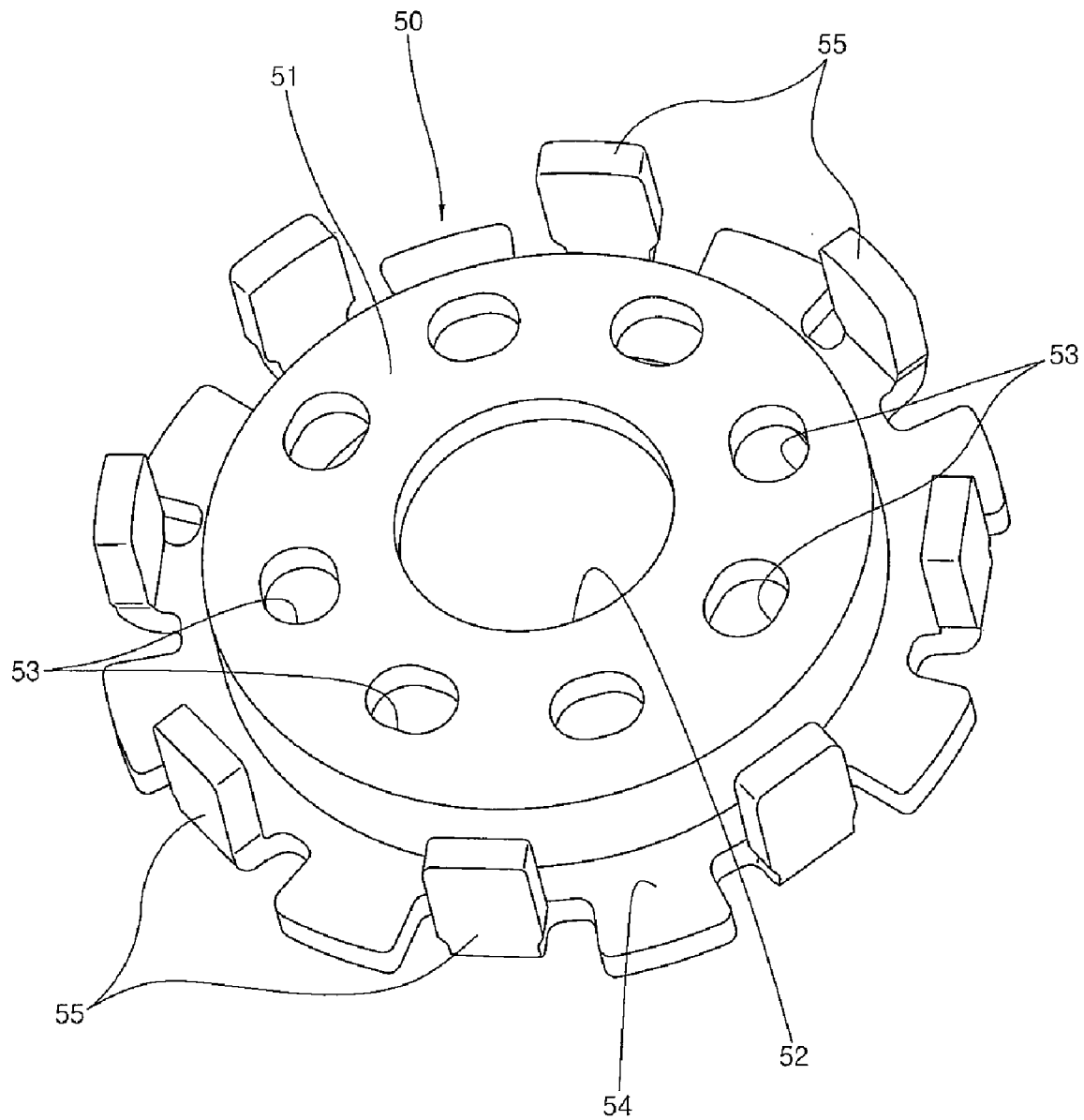
[Fig. 20]

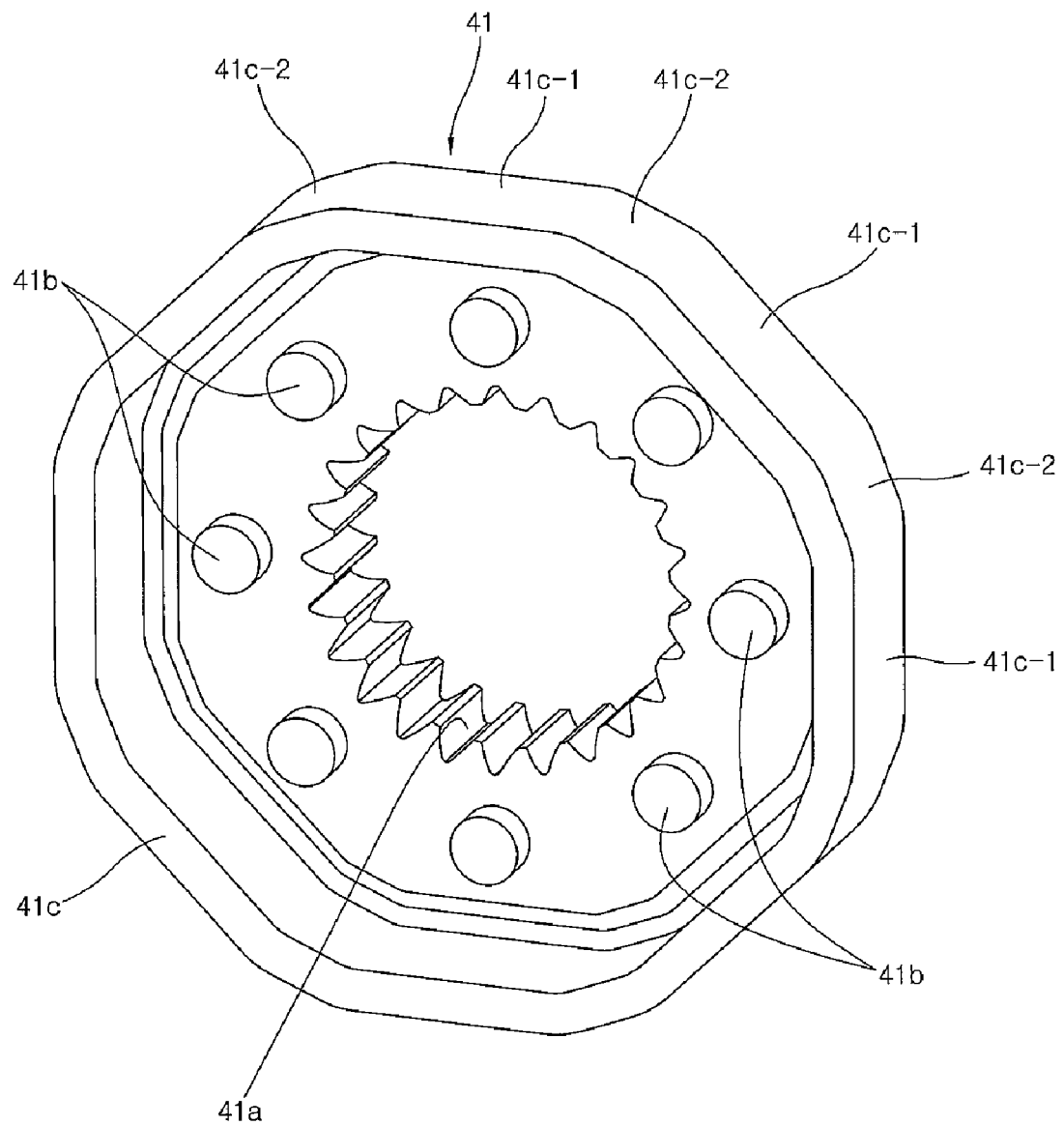
[Fig. 21]

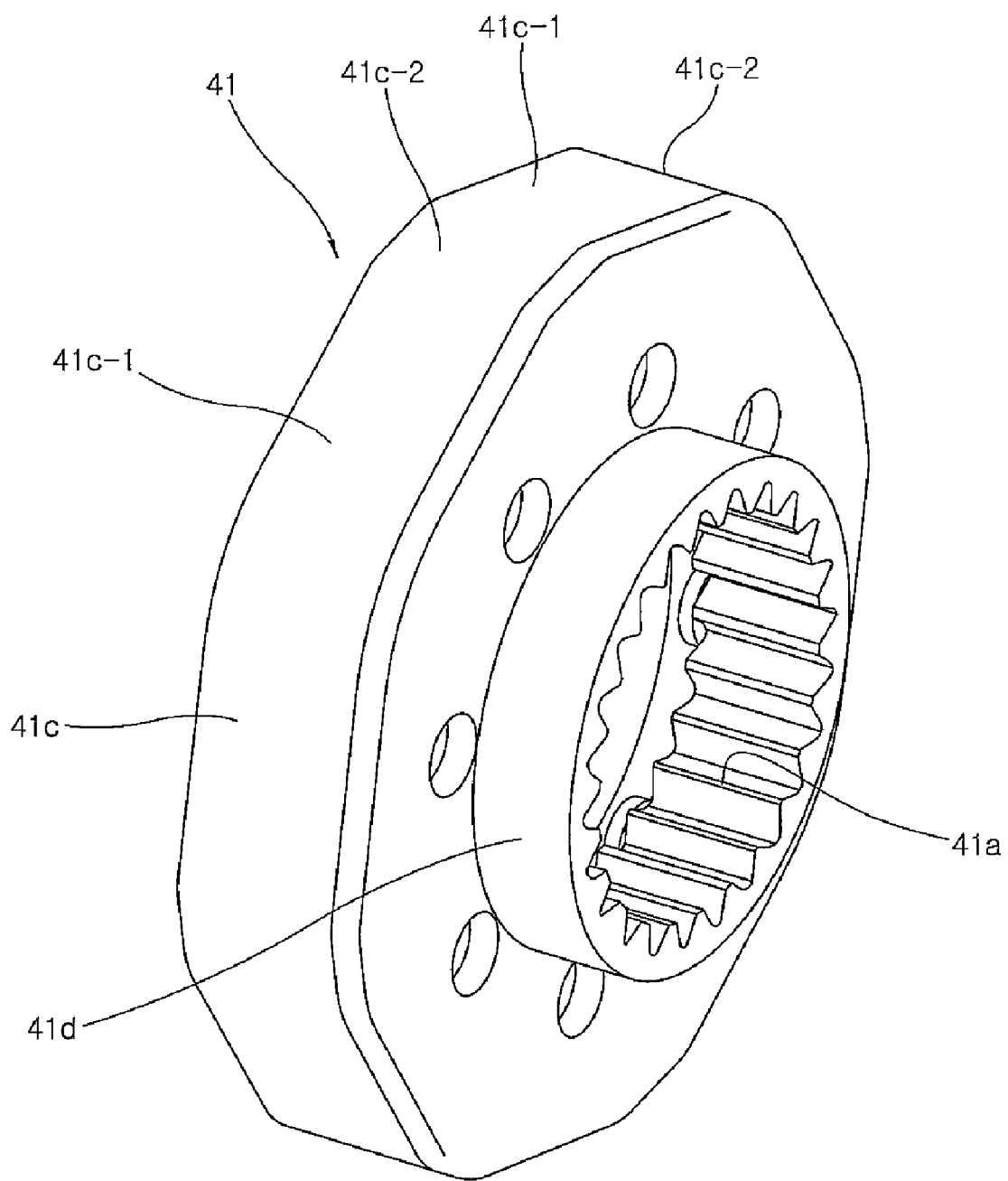
[Fig. 22]

[Fig. 23]
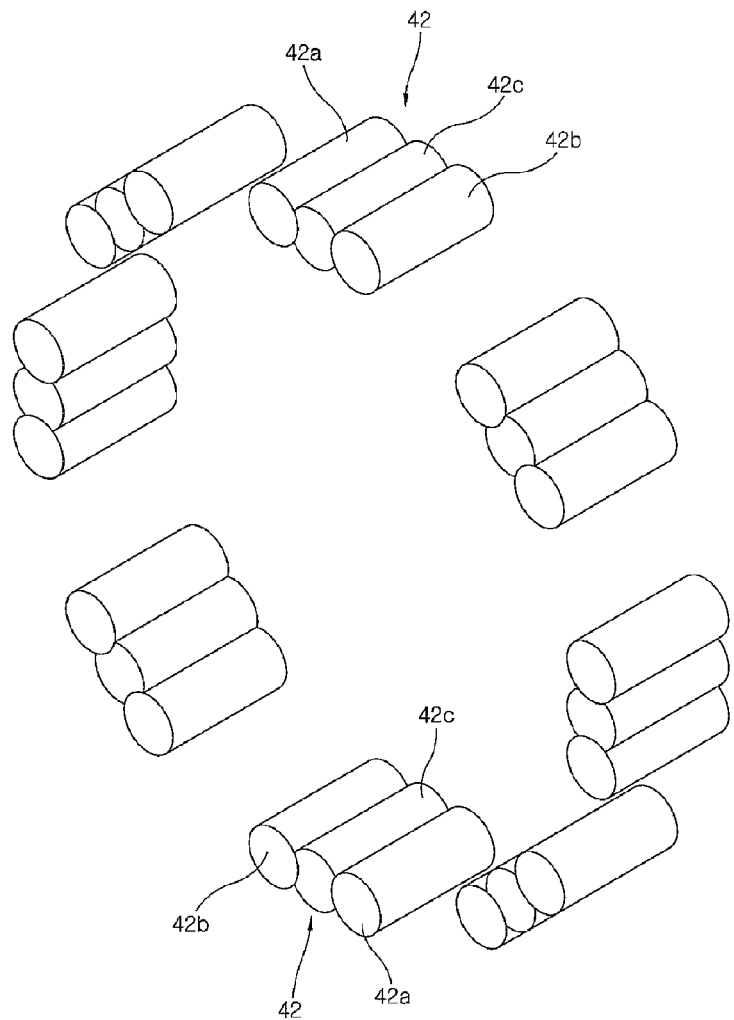
[Fig. 24]
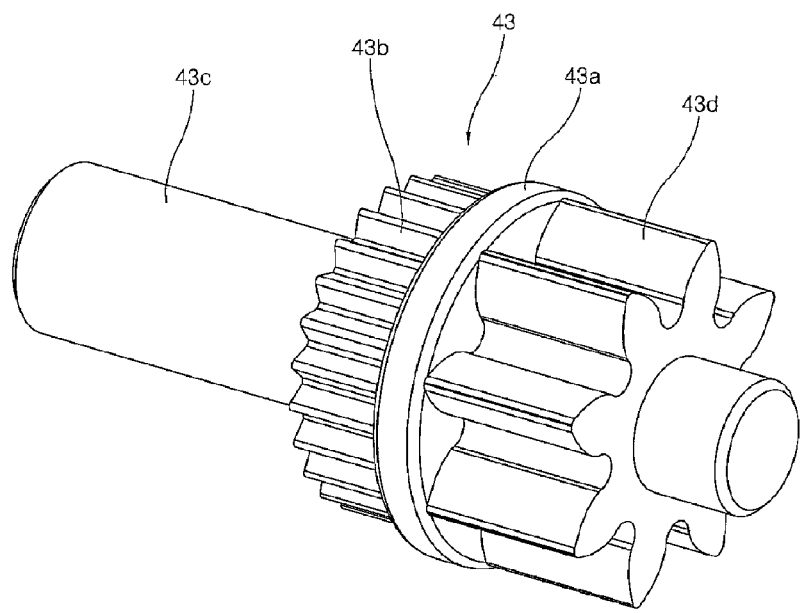

[Fig. 25]
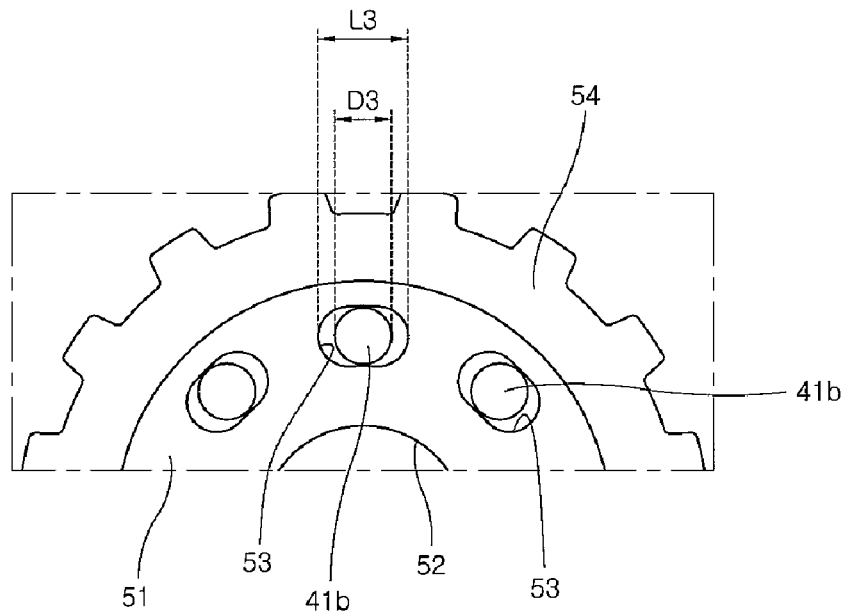
[Fig. 26]
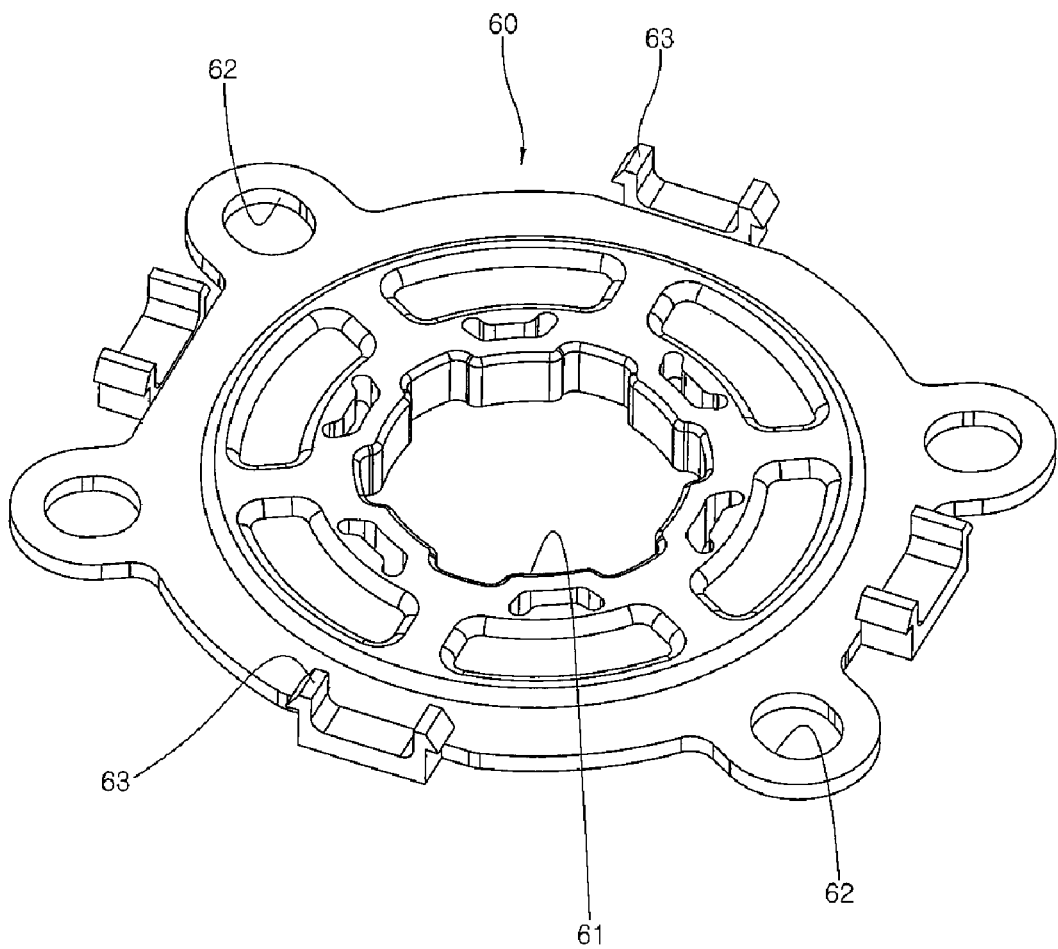

[Fig. 27]
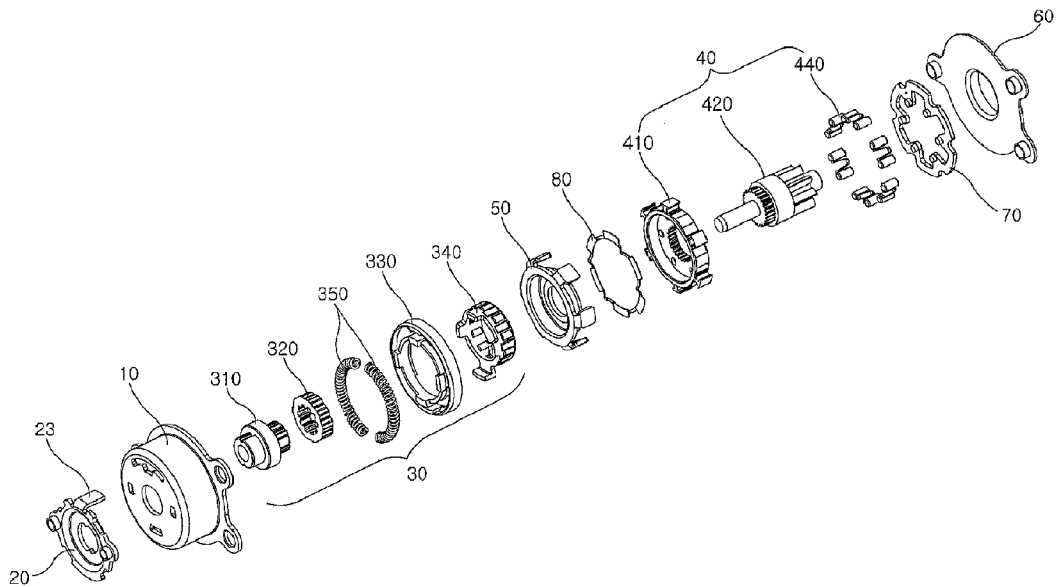
[Fig. 28]
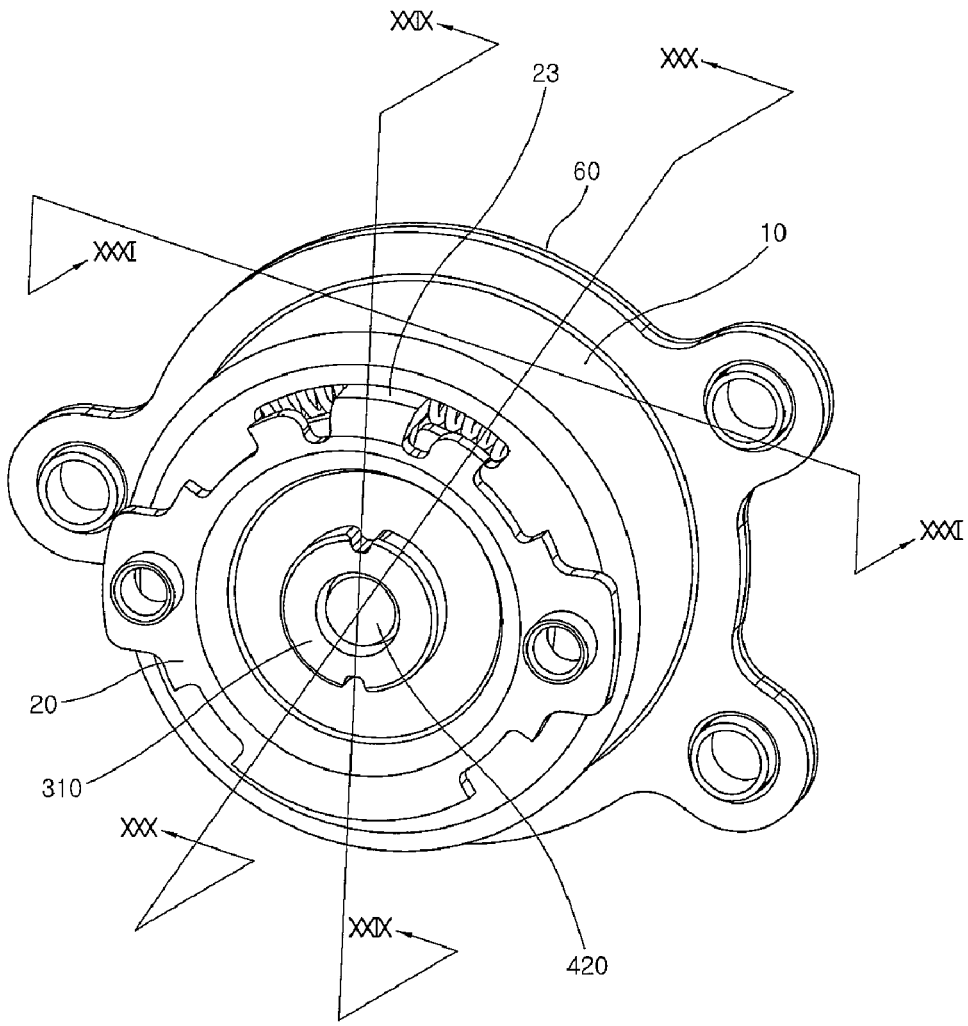

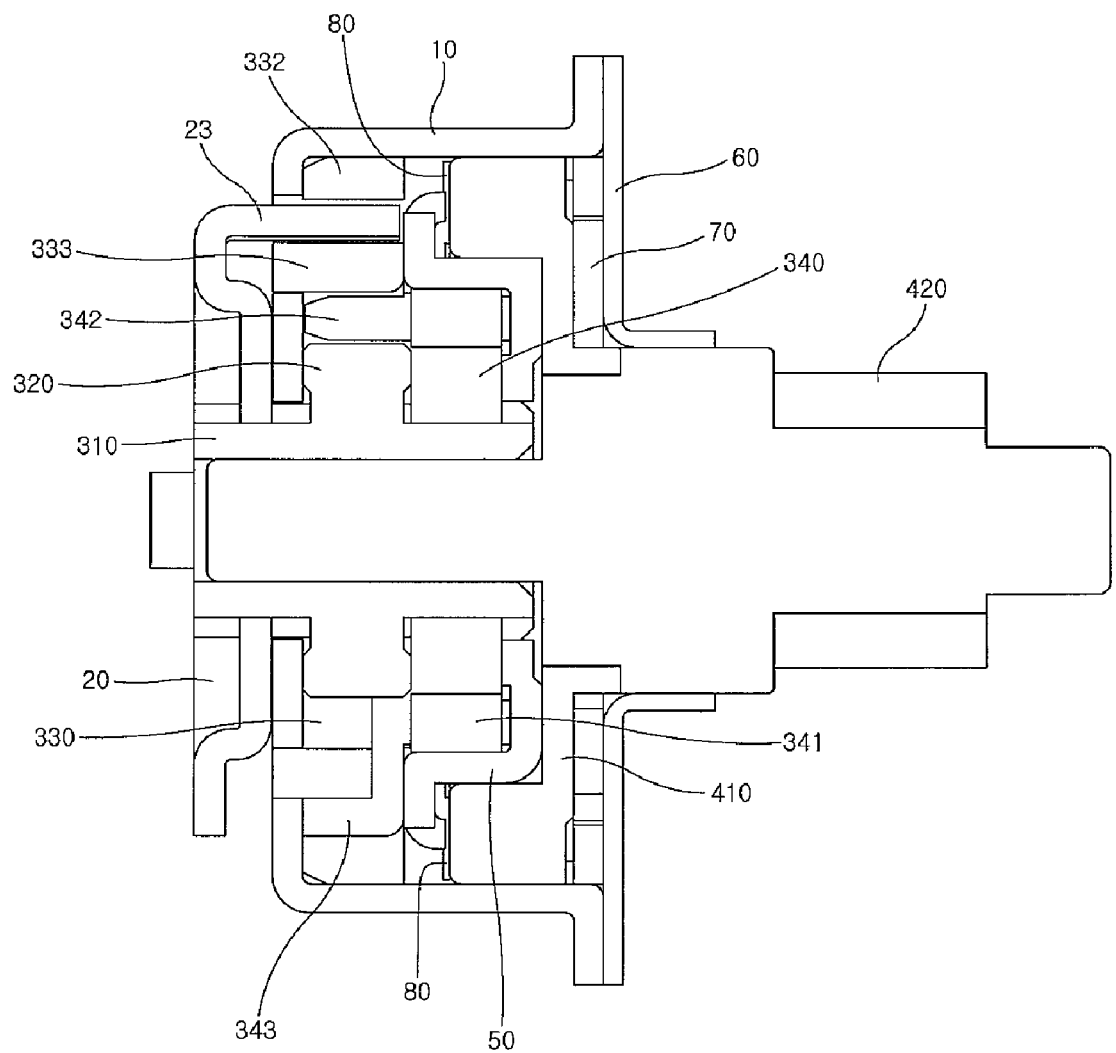
[Fig. 29]

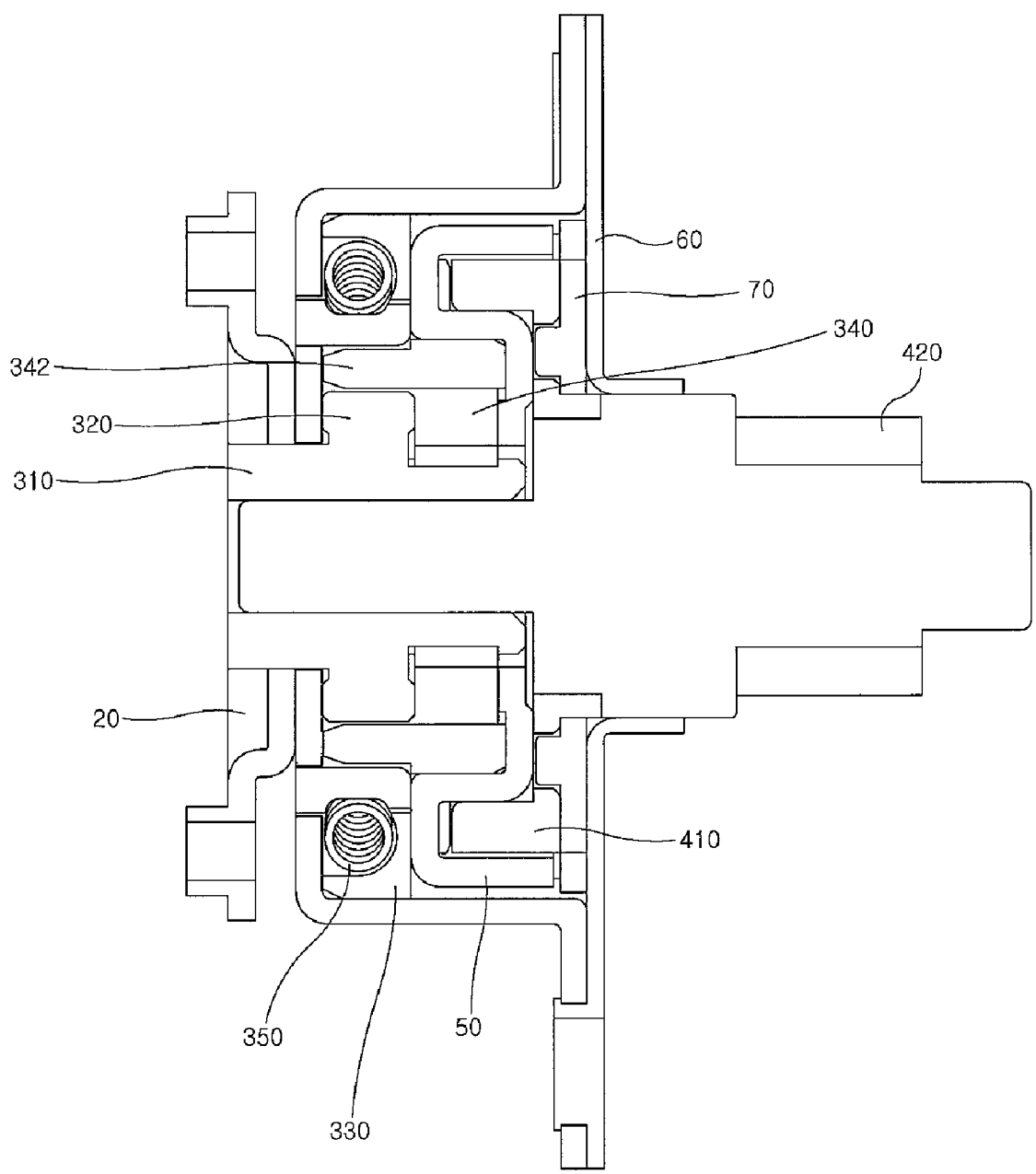
[Fig. 30]

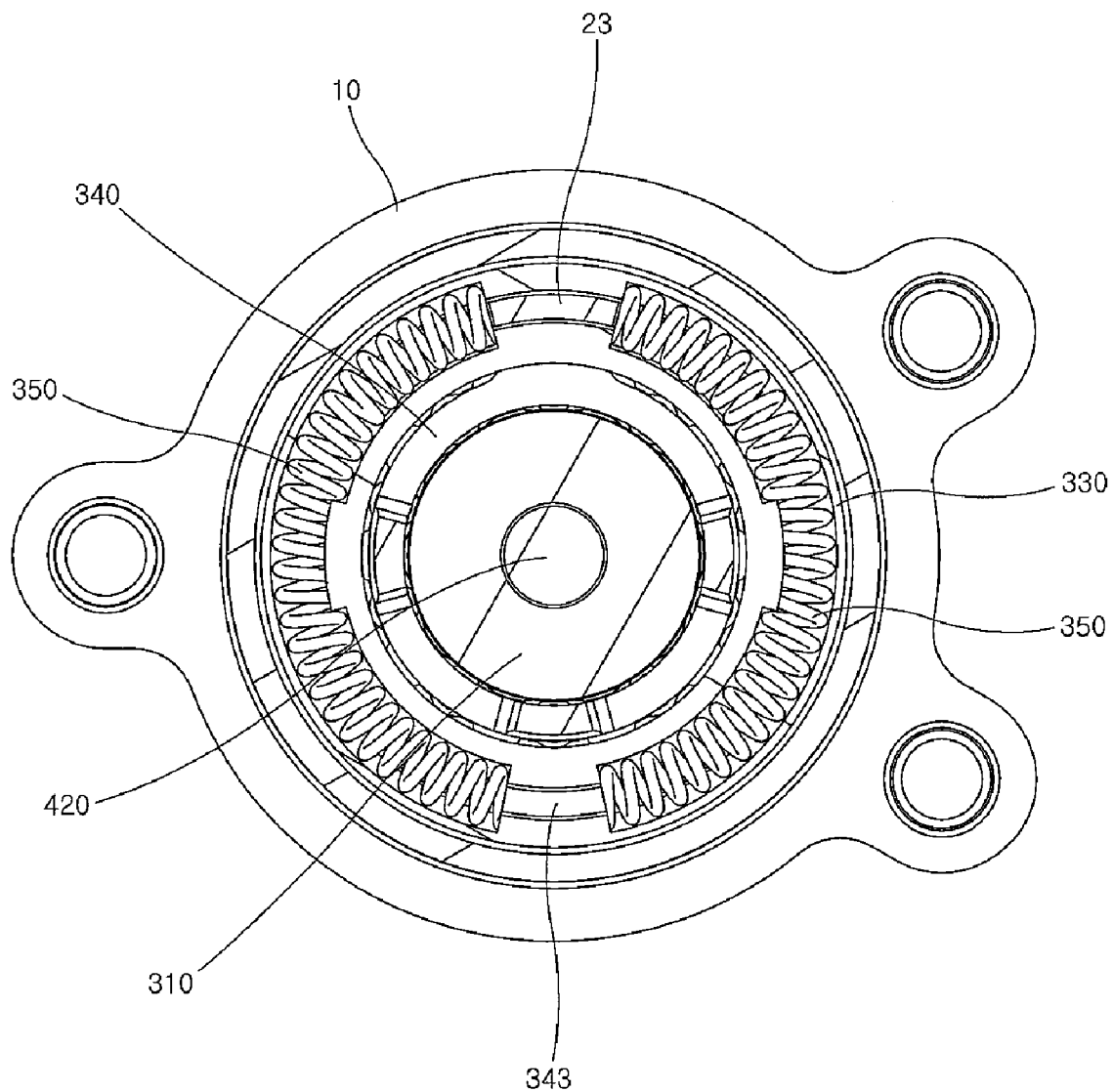
[Fig. 31]

[Fig. 32]
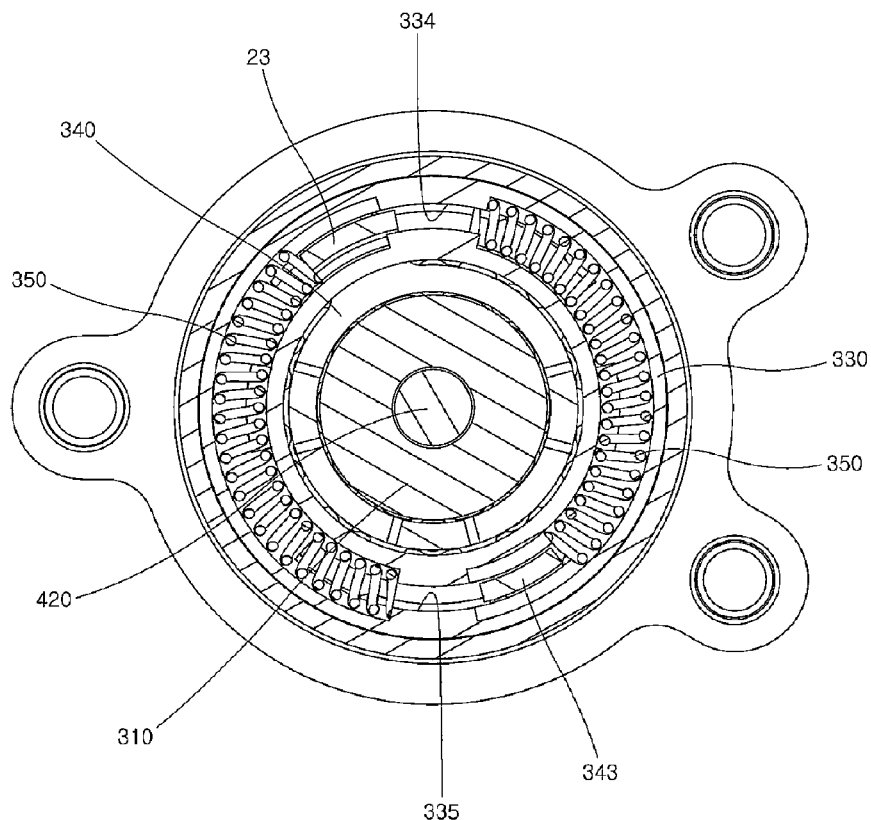
[Fig. 33]
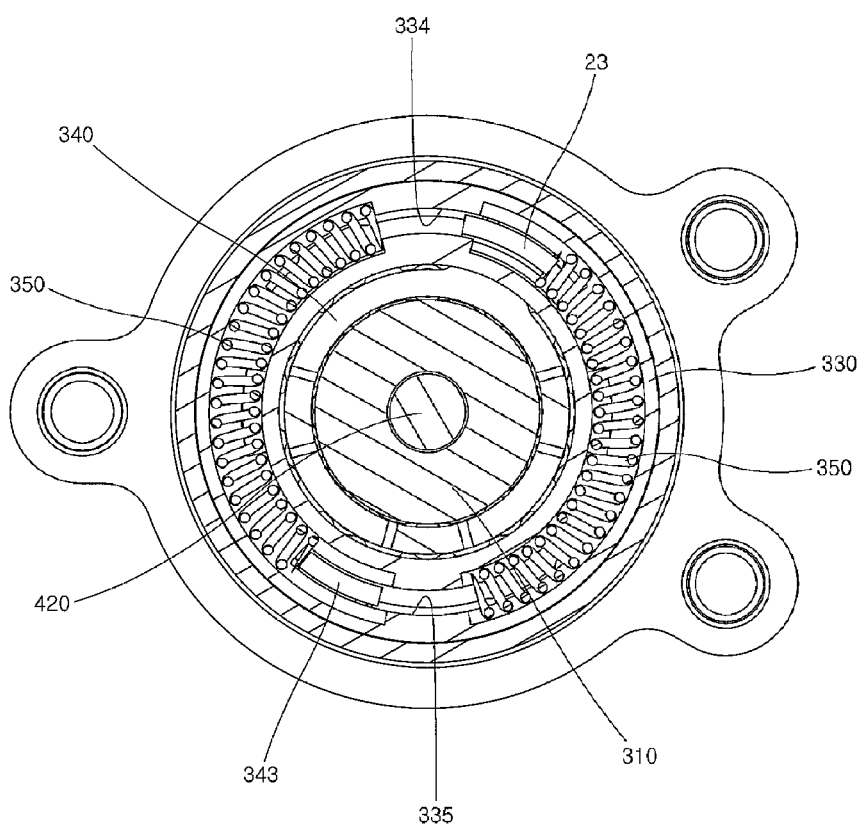

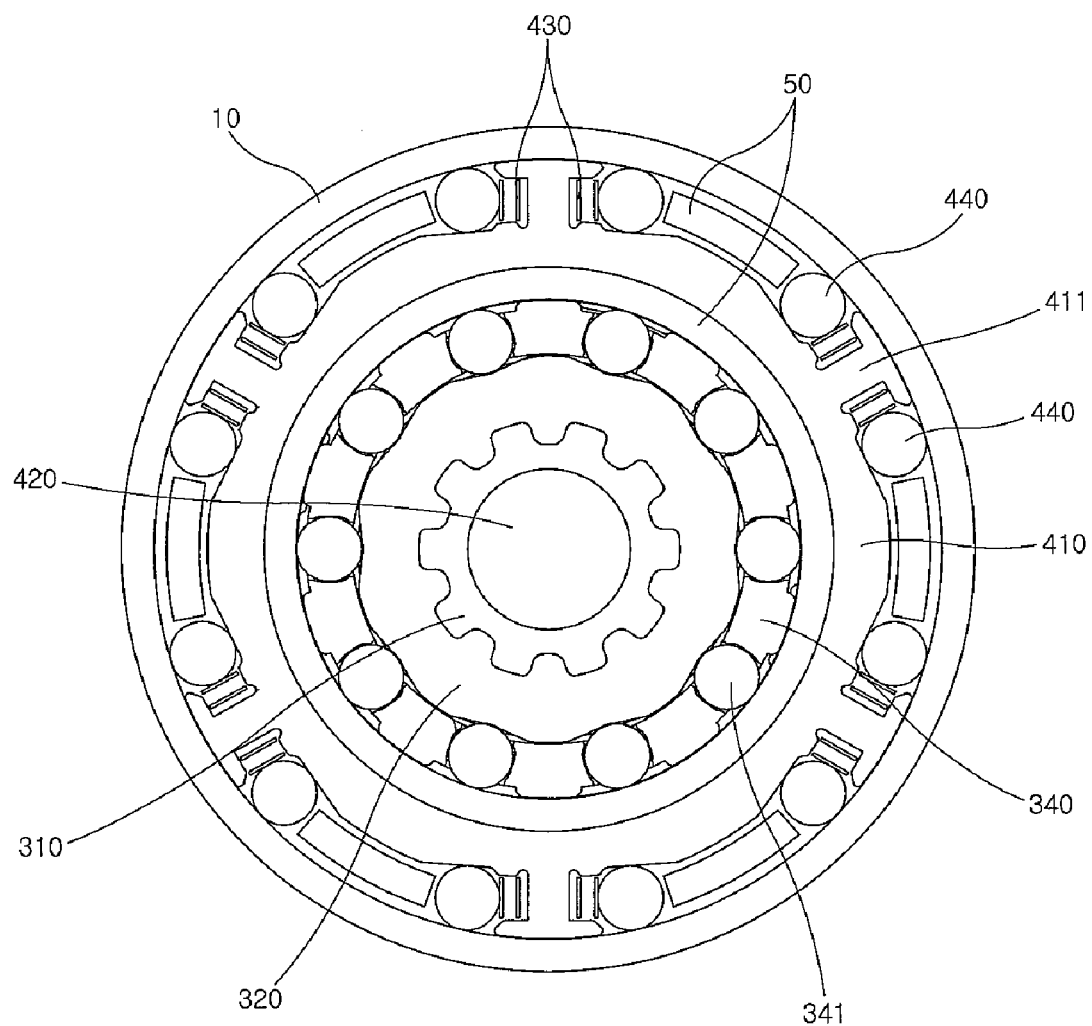
[Fig. 34]

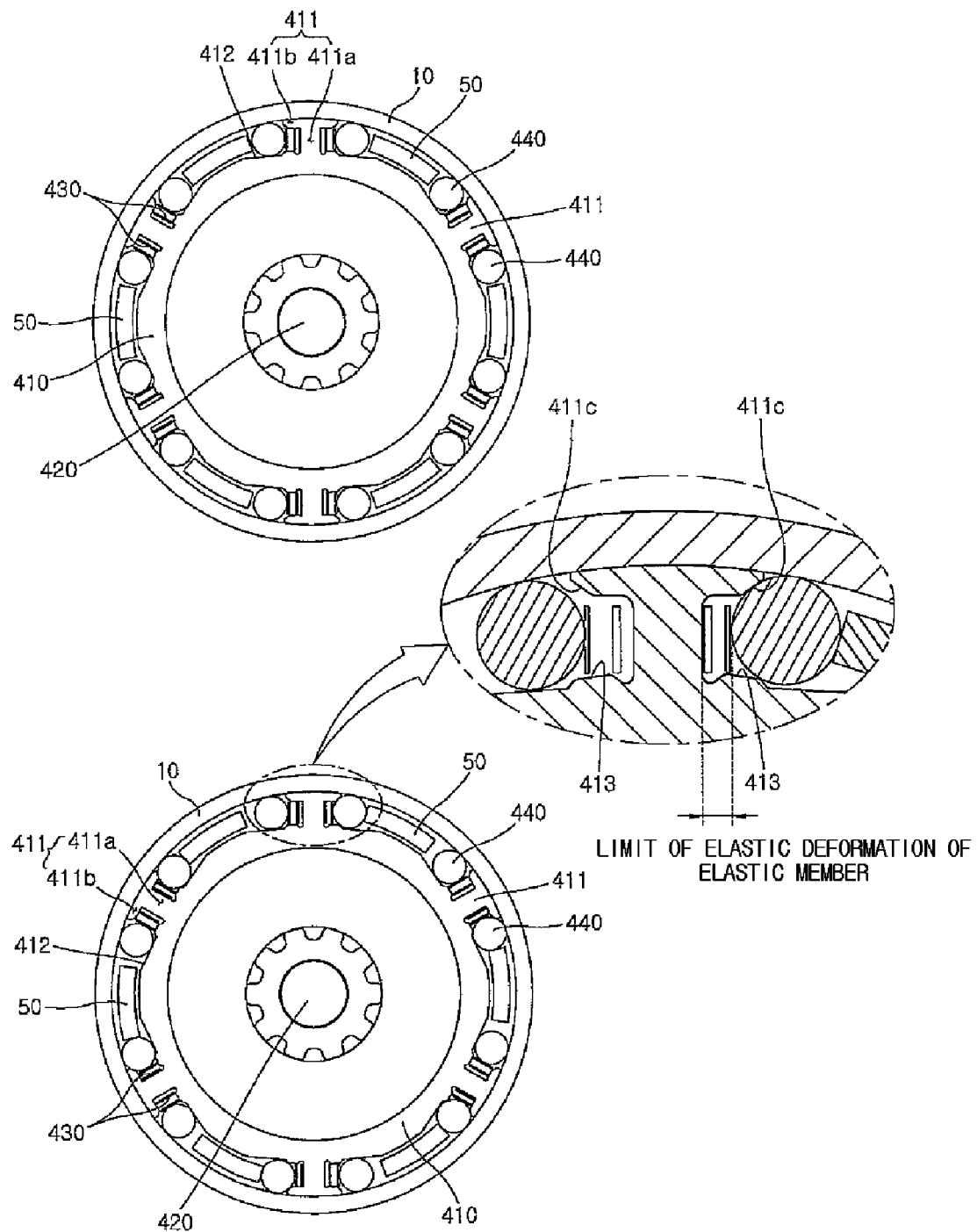
[Fig. 35]

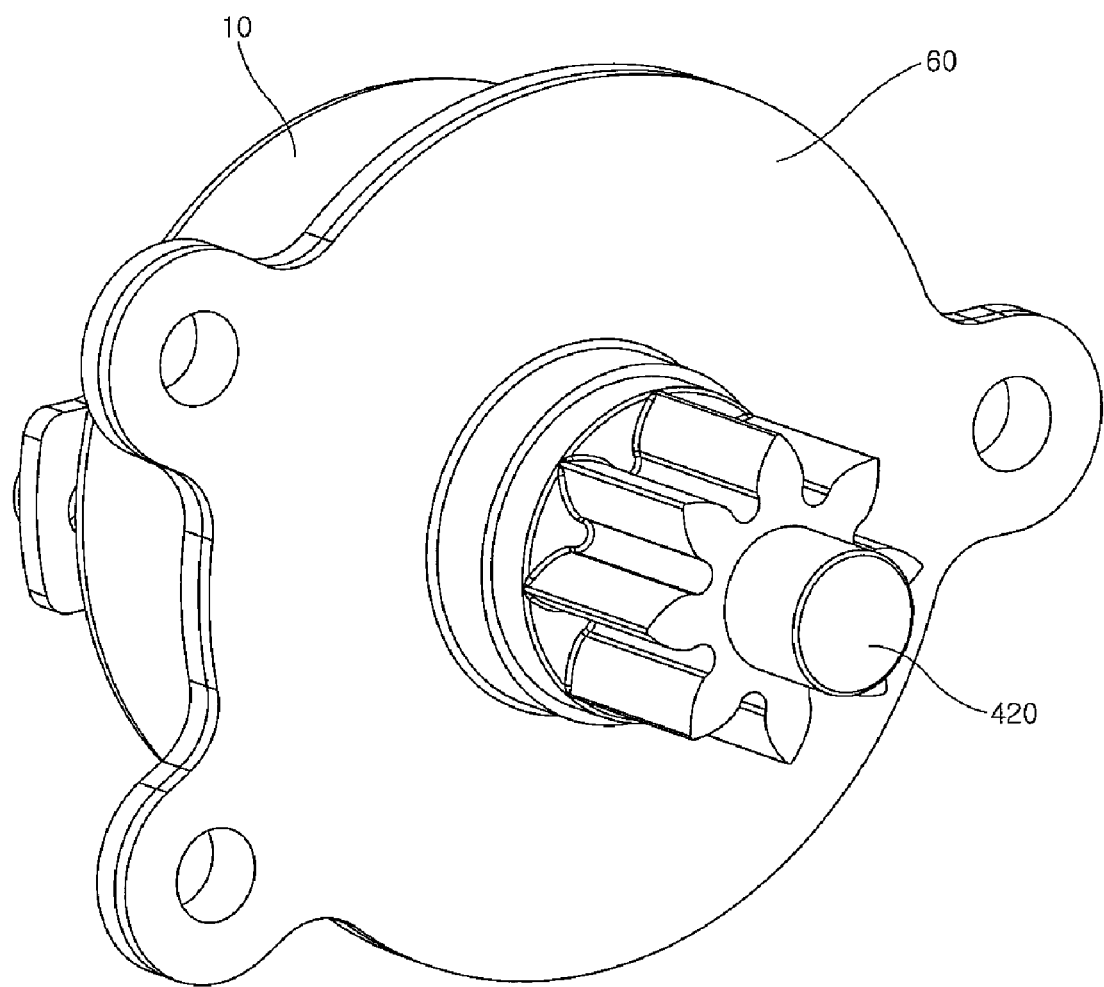
[Fig. 36]

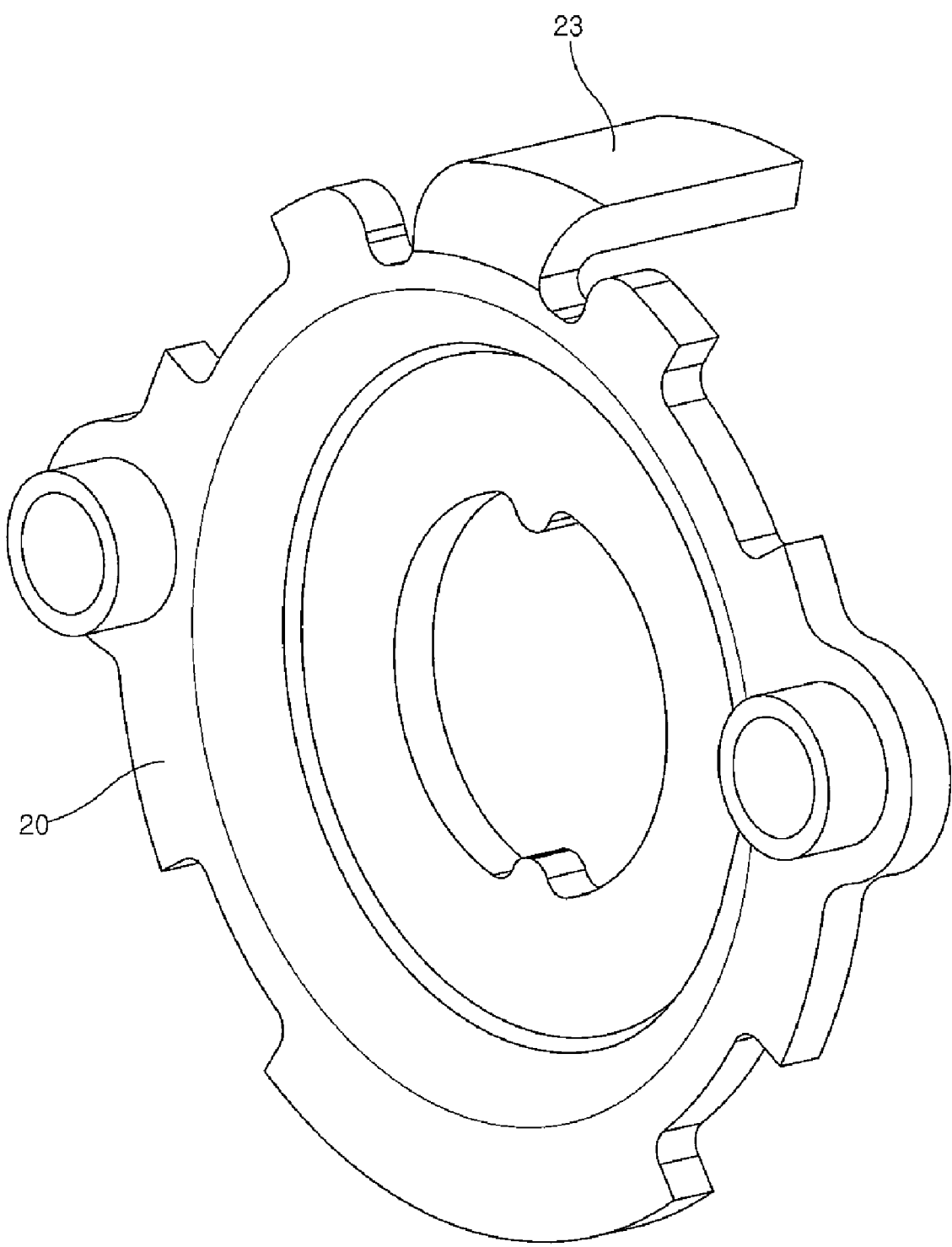
[Fig. 37]

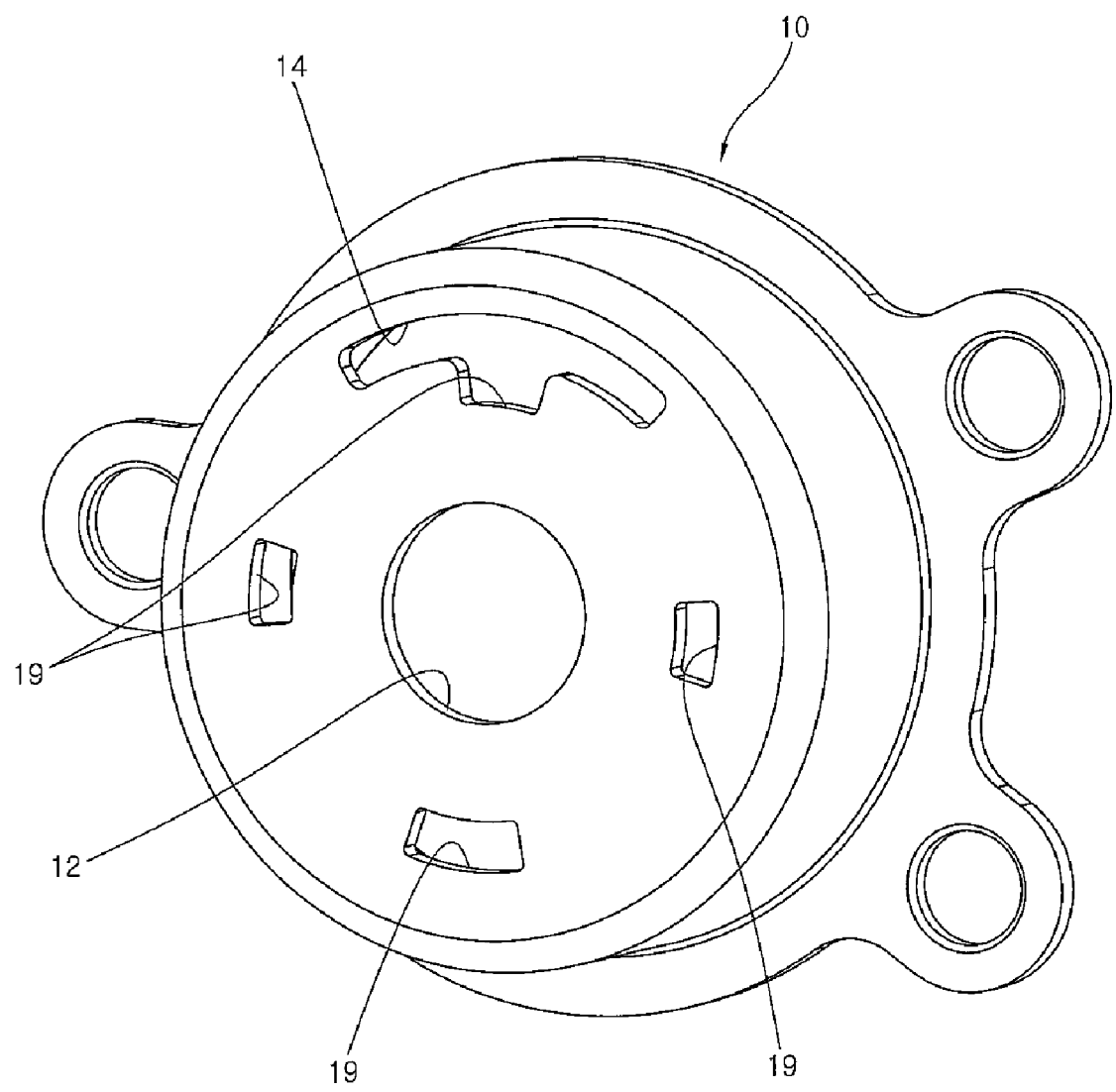
[Fig. 38]

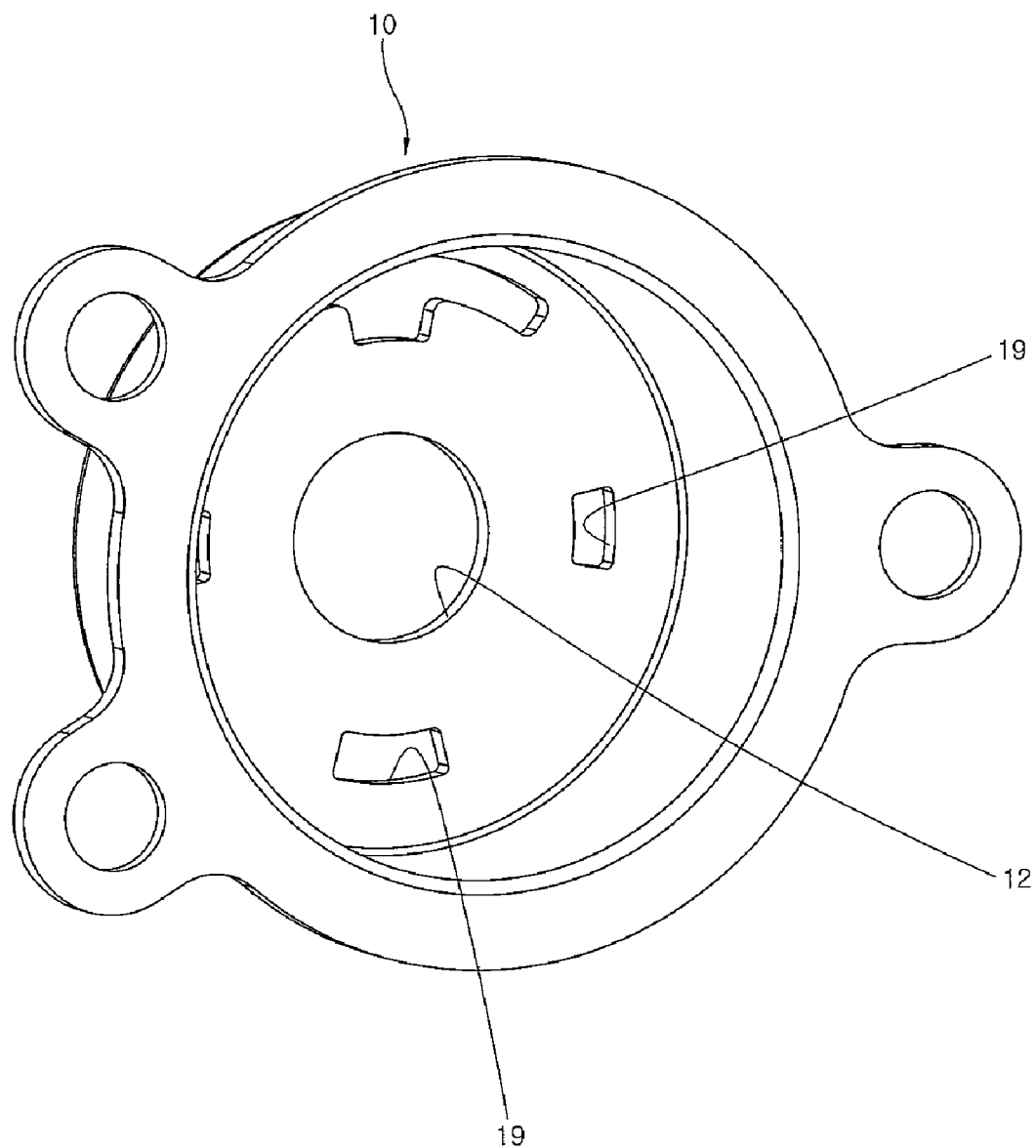
[Fig. 39]

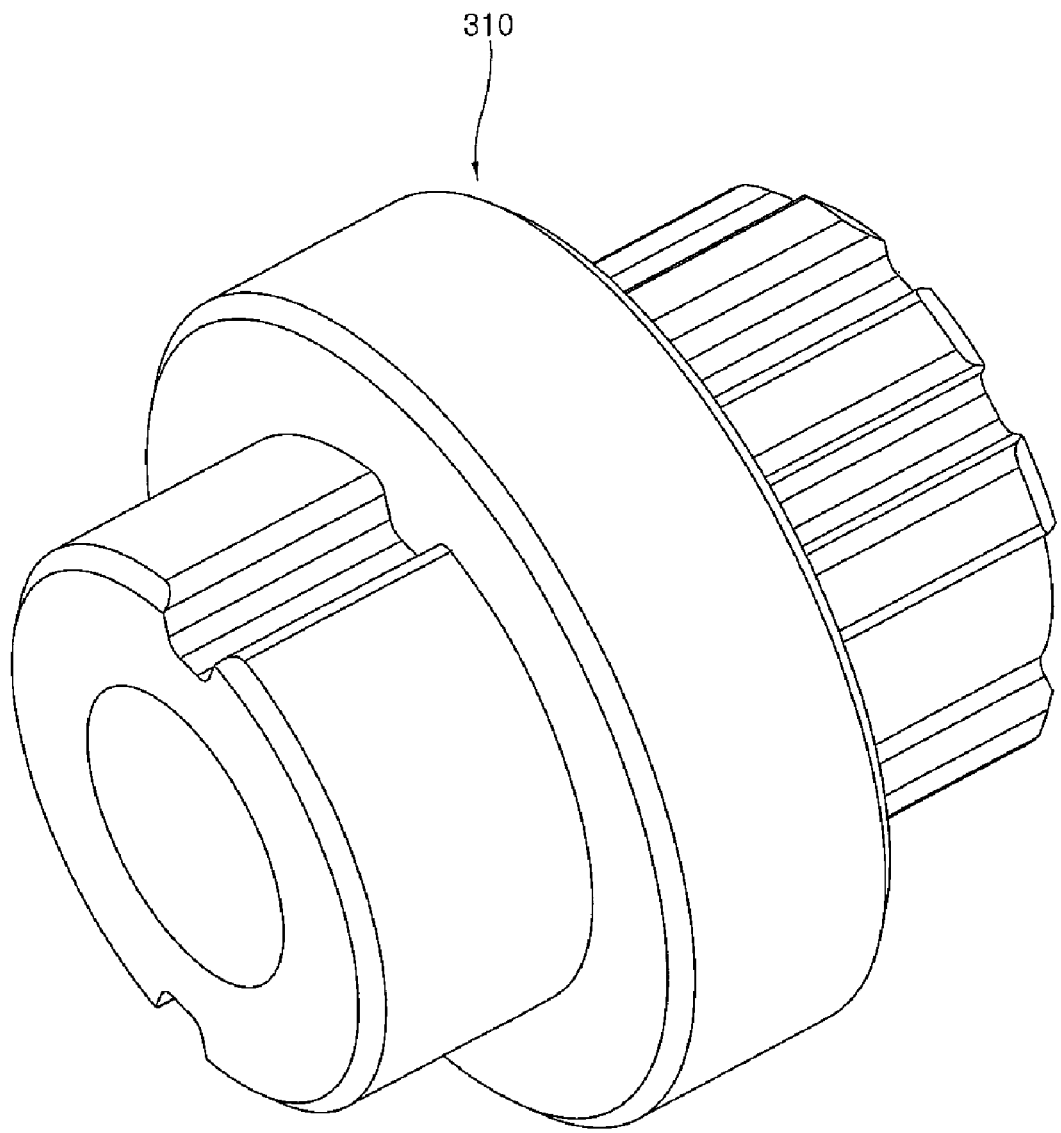
[Fig. 40]

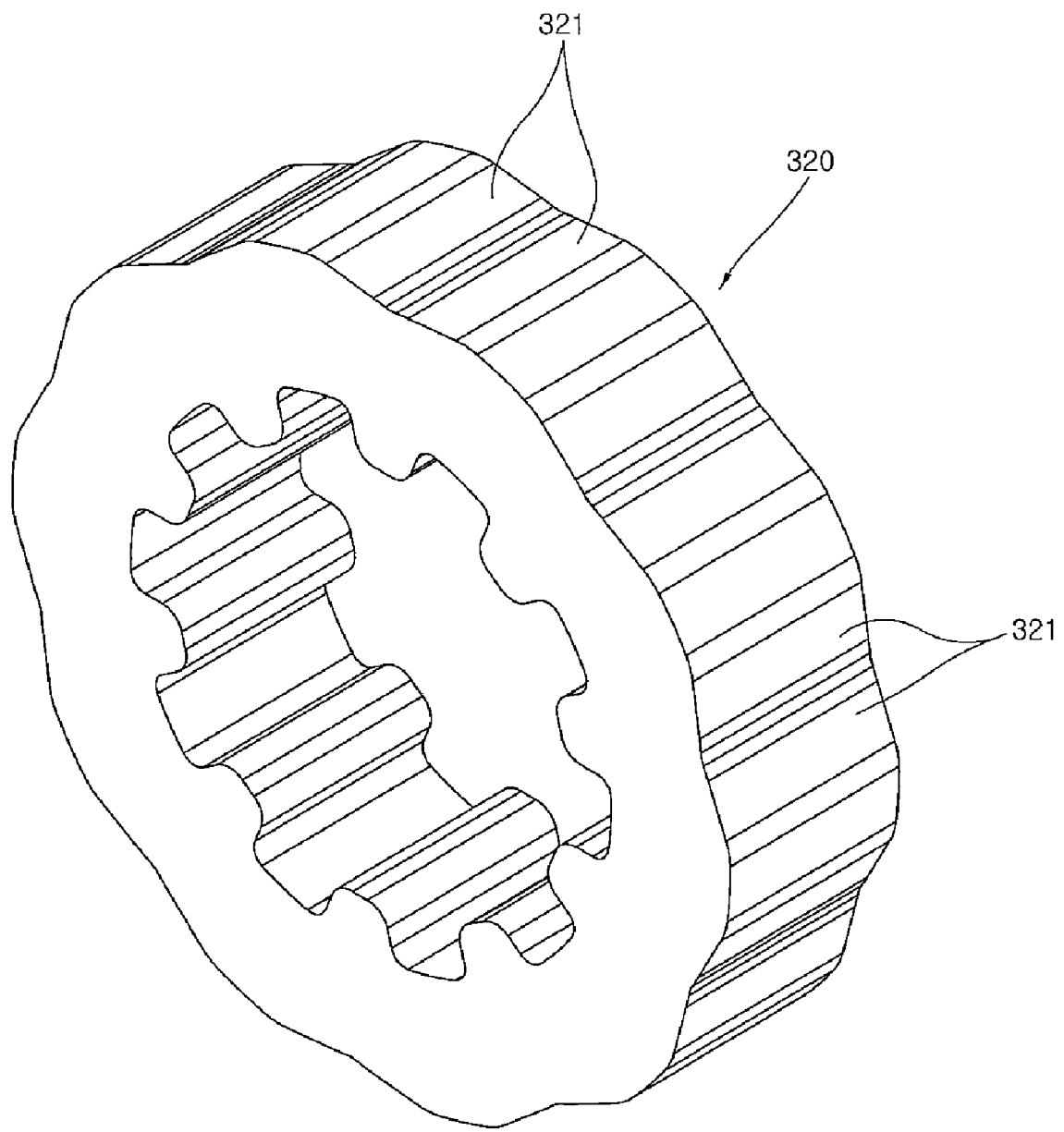
[Fig. 41]

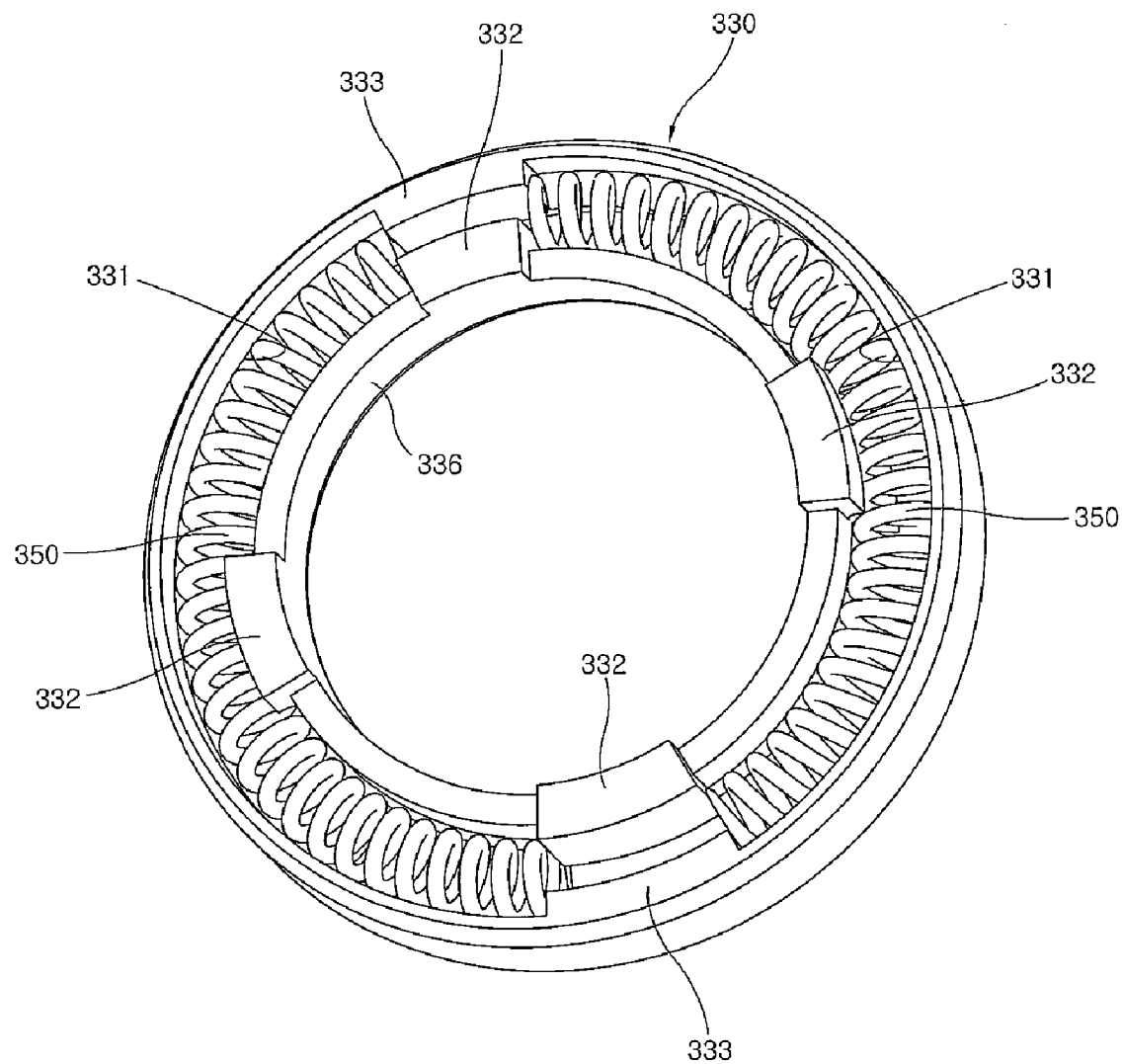
[Fig. 42]

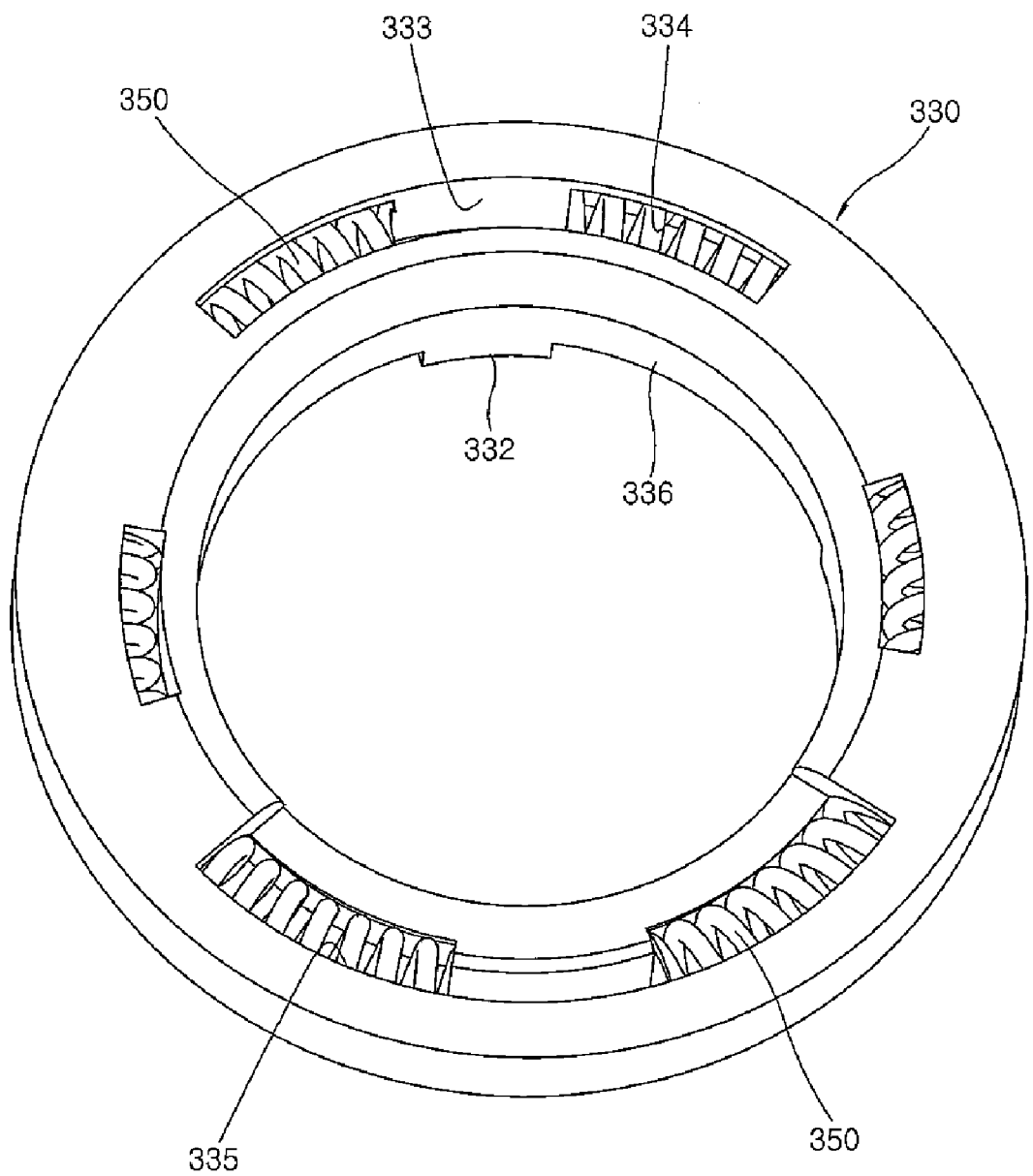
[Fig. 43]

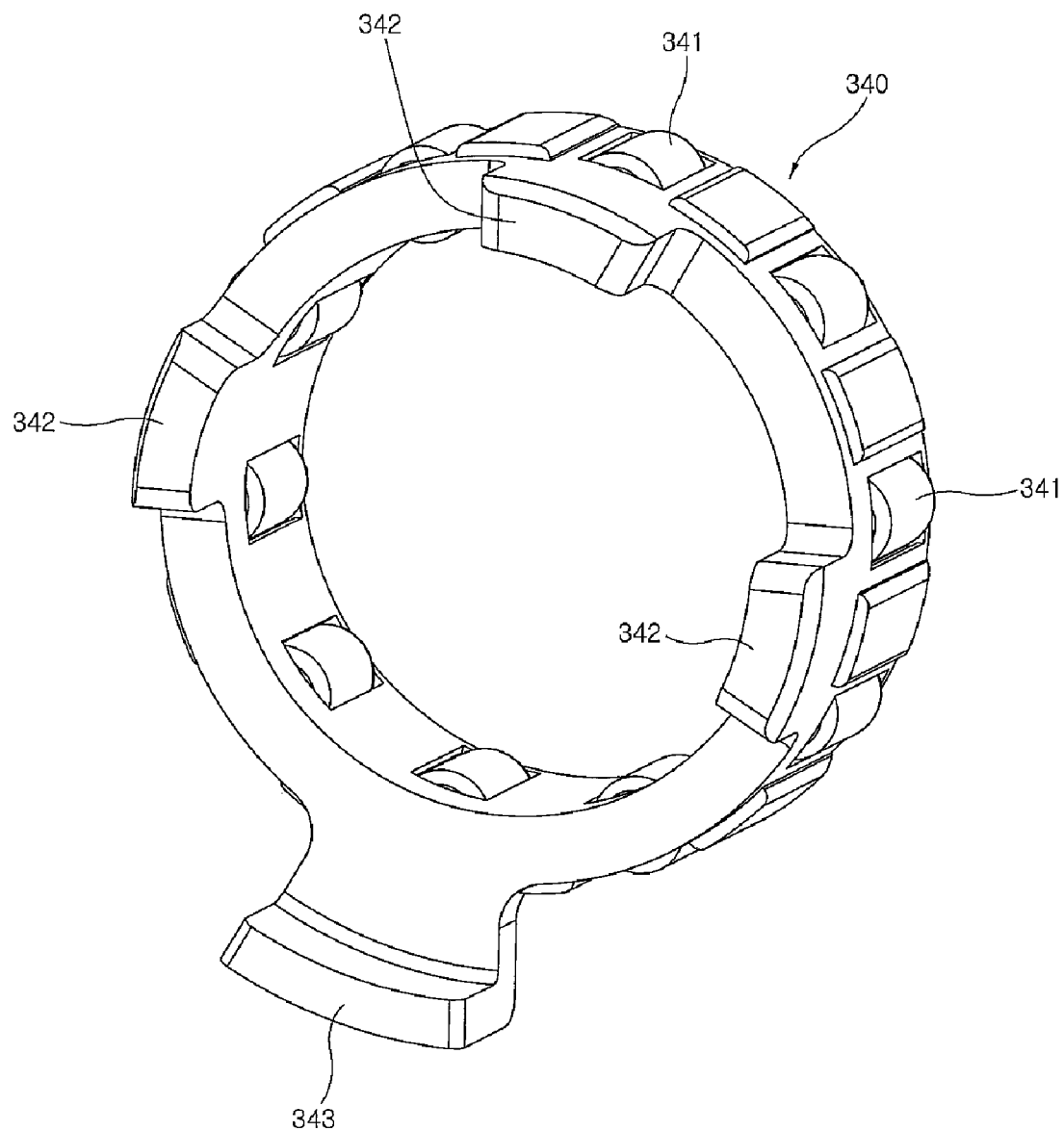
[Fig. 44]

[Fig. 45]
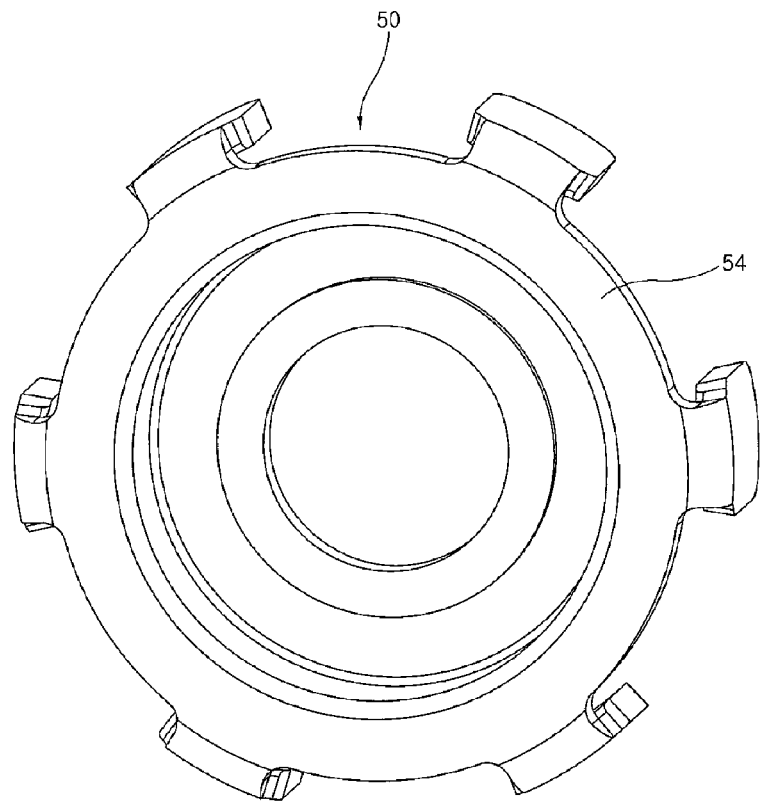
[Fig. 46]
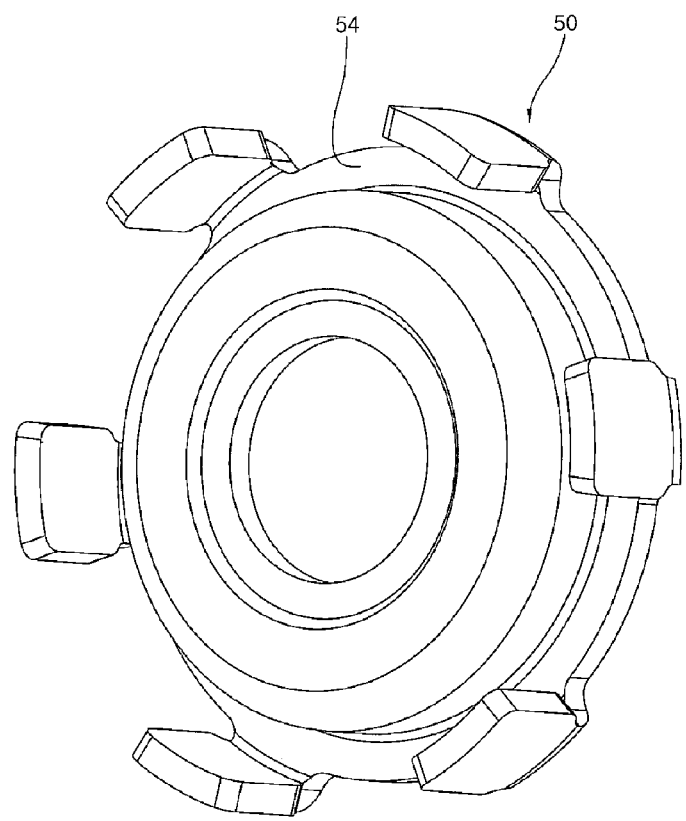

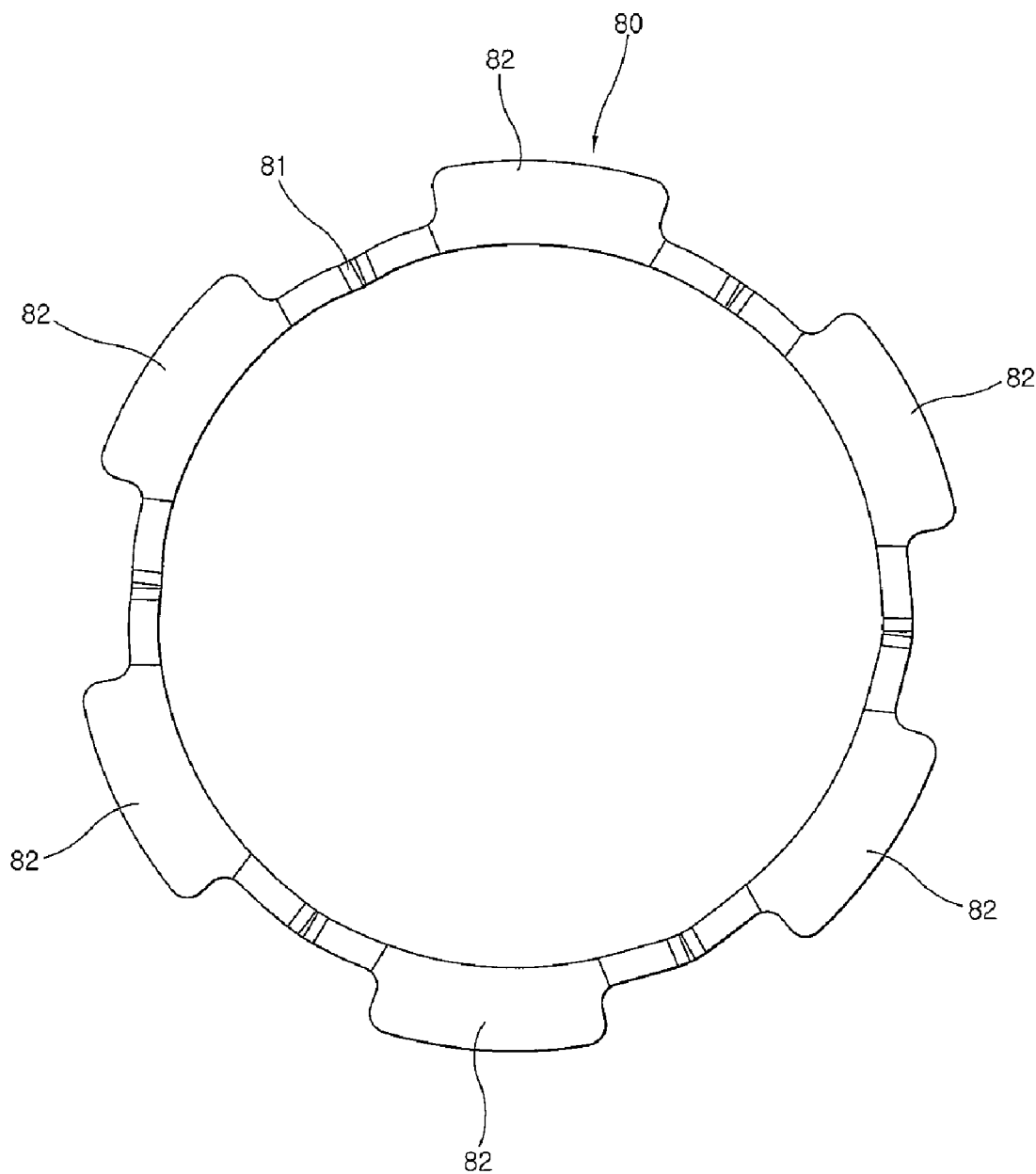
[Fig. 47]

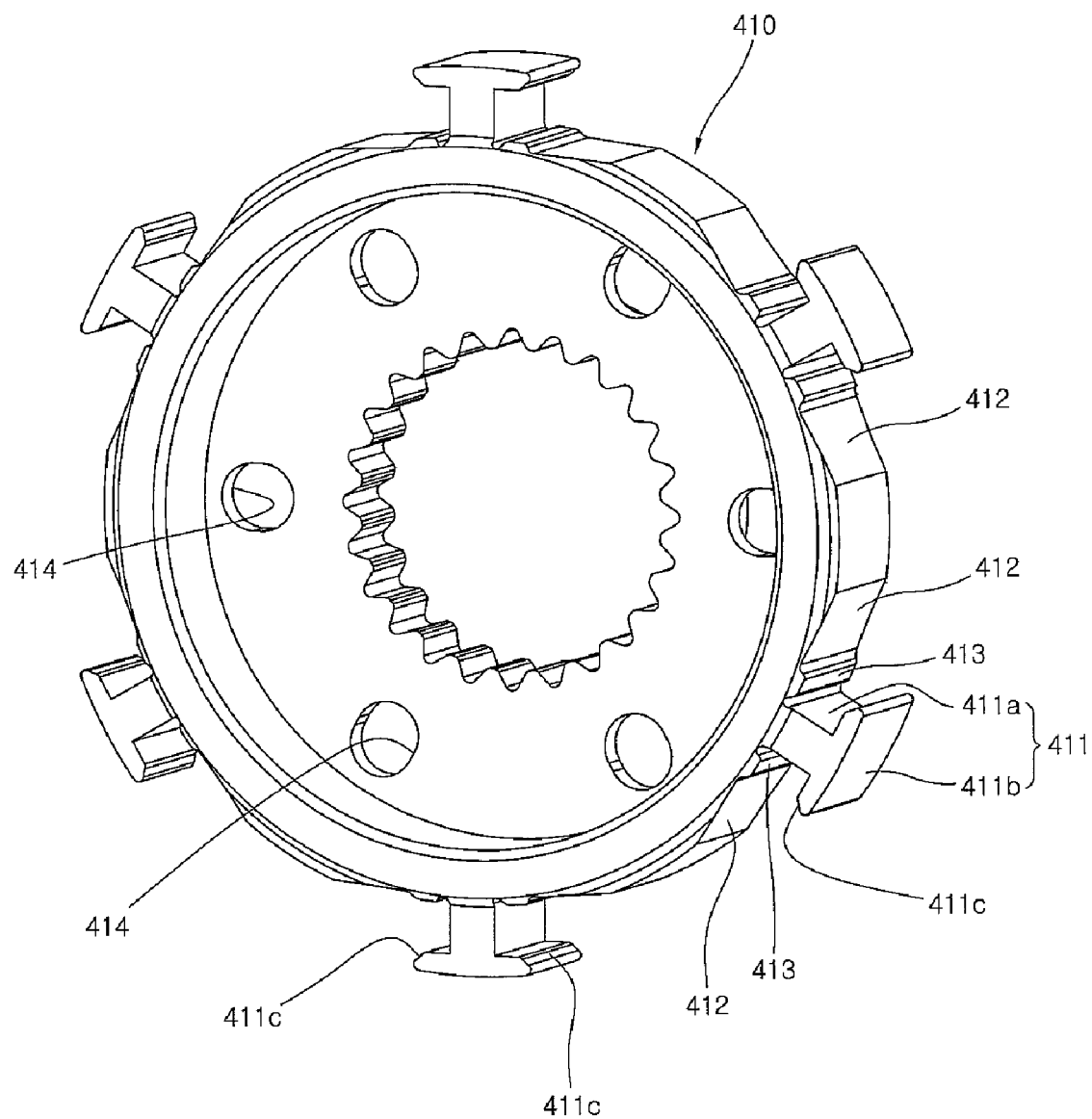
[Fig. 48]

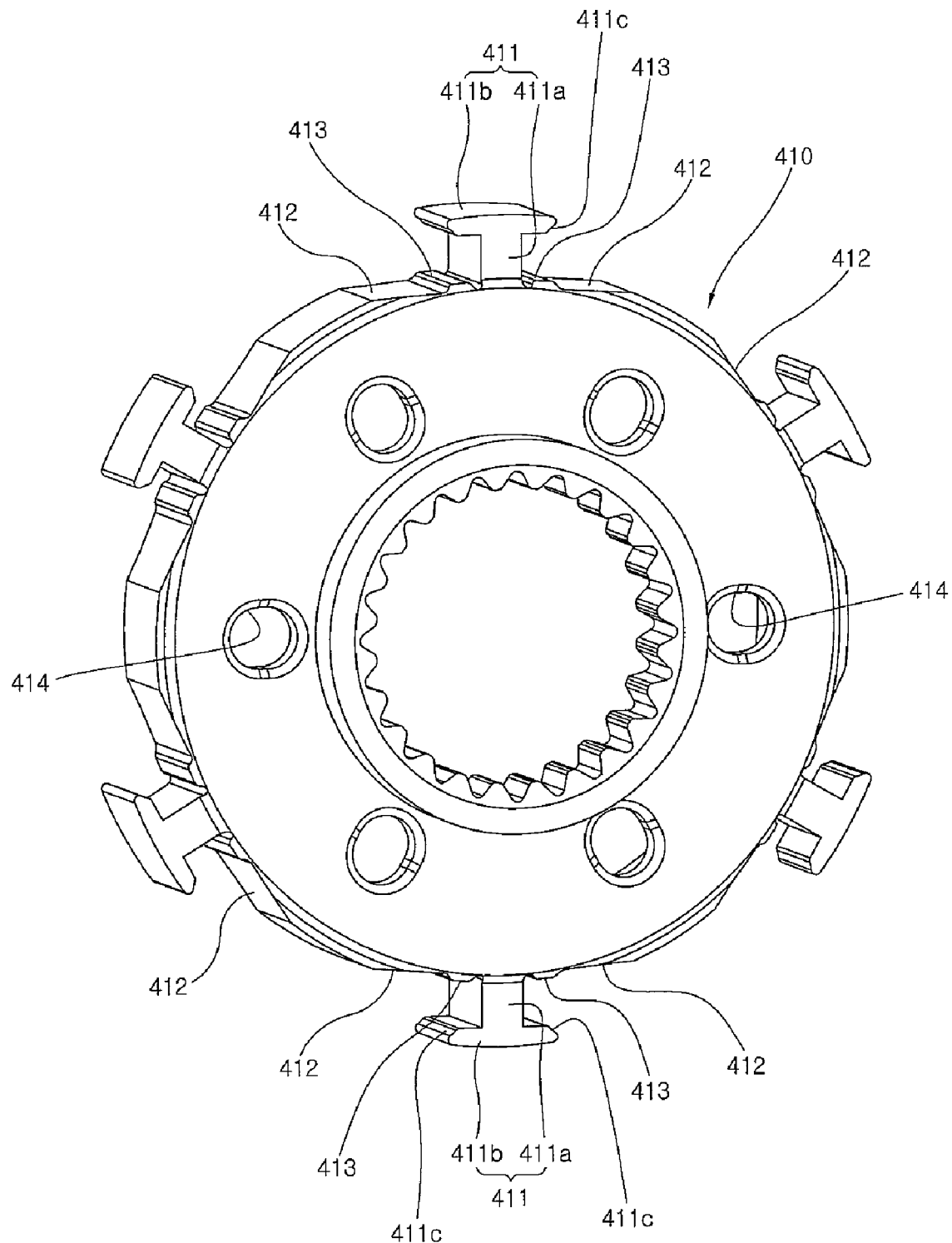
[Fig. 49]

[Fig. 50]
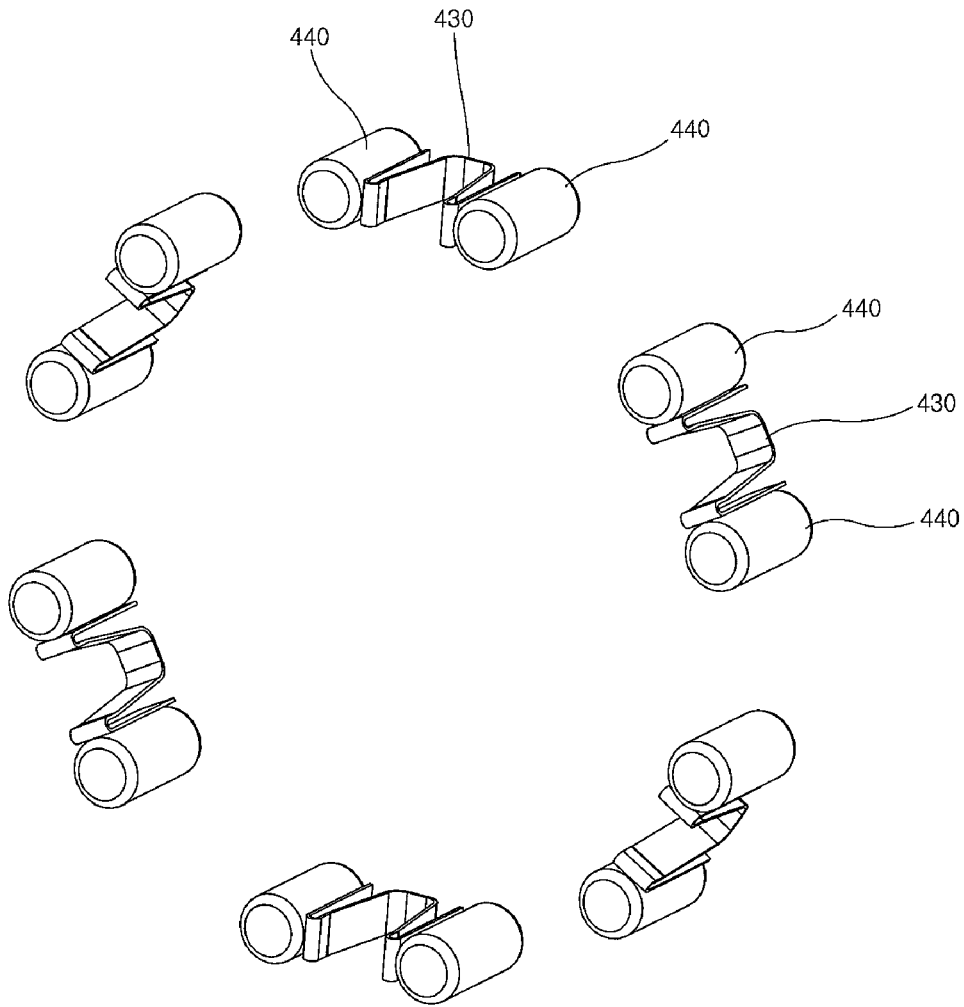
[Fig. 51]
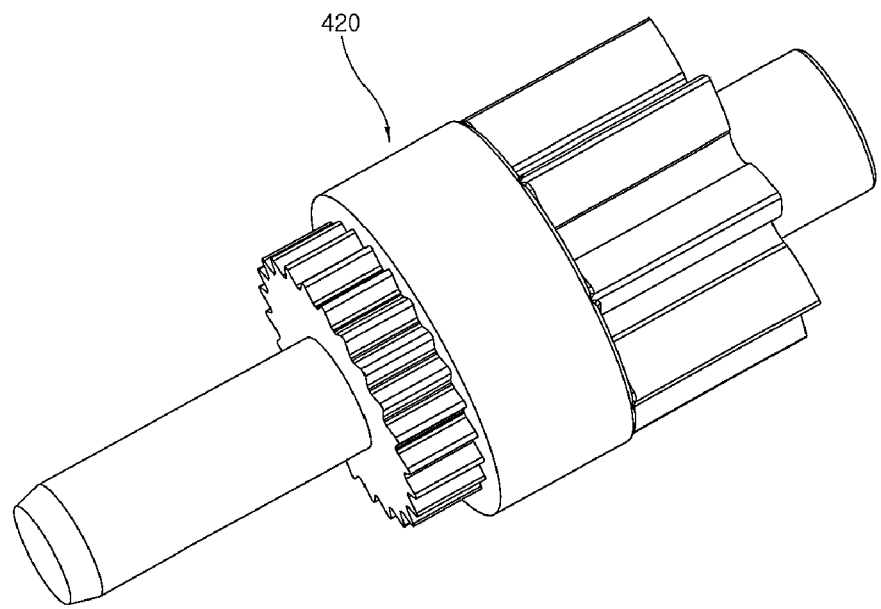

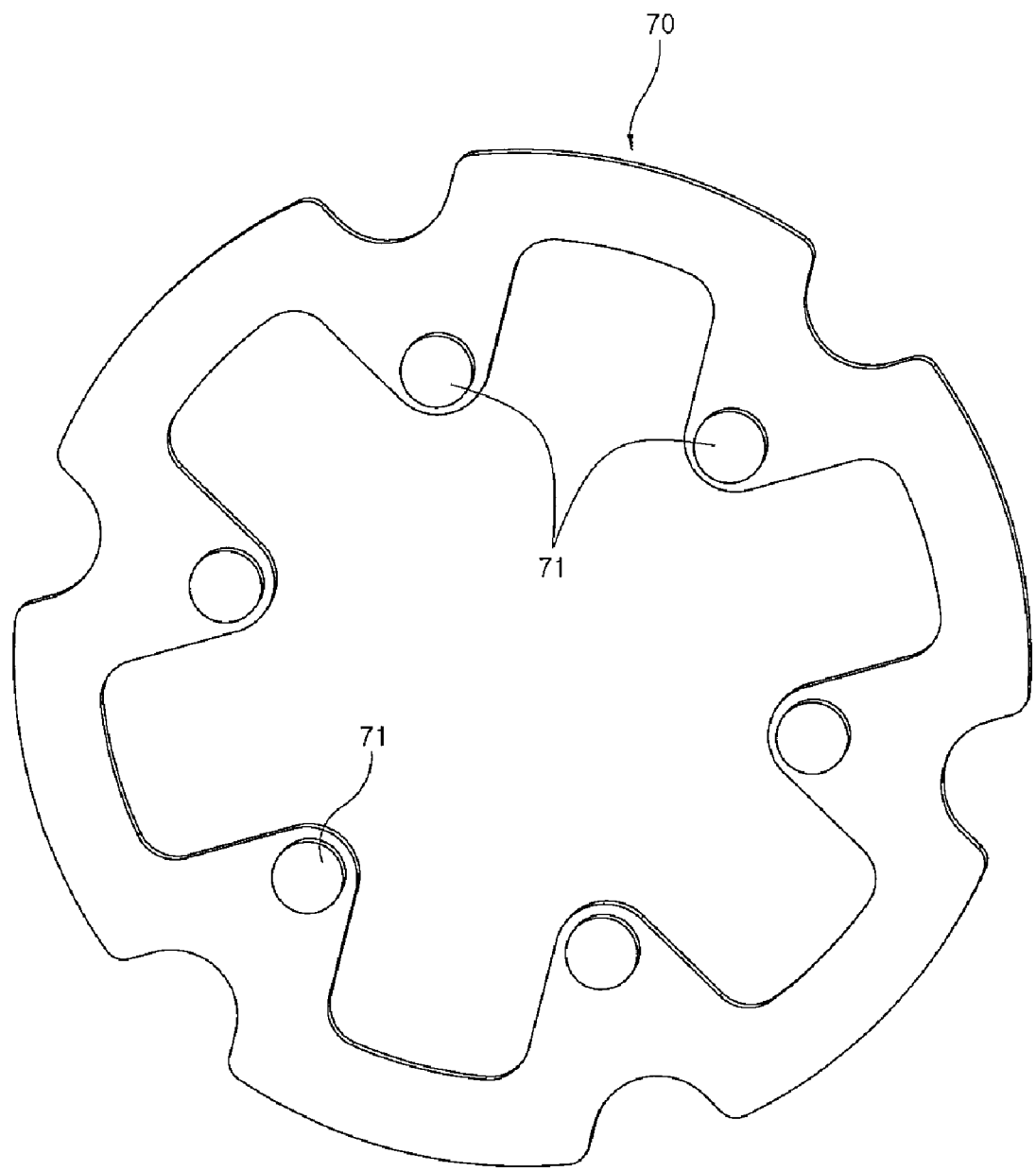
[Fig. 52]

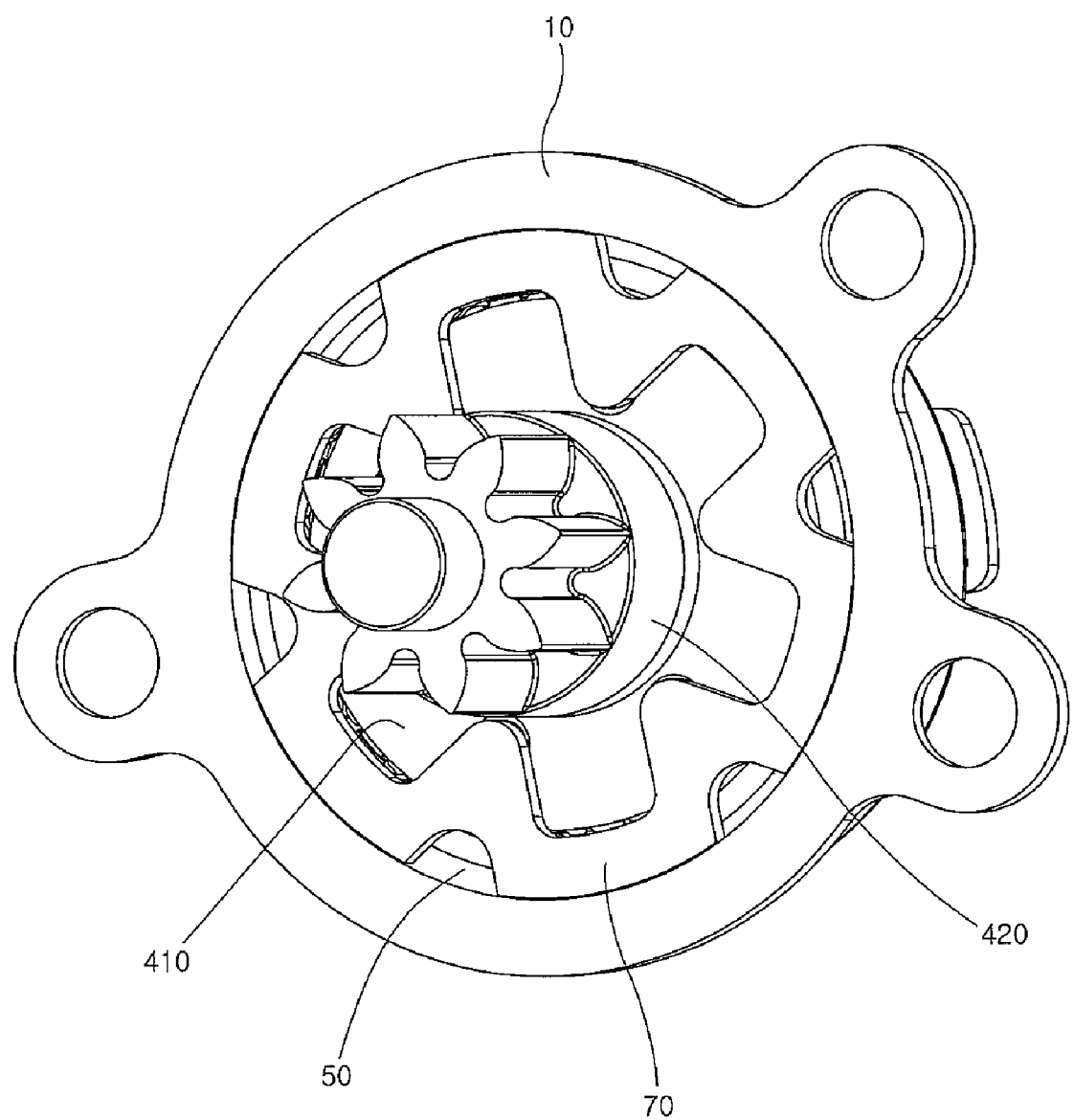
[Fig. 53]

PUMPING DEVICE FOR SEAT CUSHION OF VEHICLE

TECHNICAL FIELD

The present invention relates to a pumping device for a seat cushion of a vehicle that allows adjusting the position of a seat cushion, depending on the shape of an occupant.

BACKGROUND ART

As shown in FIG. 1, a seat 1 of a vehicle is composed of a seat cushion 1a and a seat back 1b. Seat cushion 1a can be adjusted to a predetermined position by a pumping device and seat back 1b can be adjusted to either angle forward or backward by a reclining device.

The pumping device is disposed in seat cushion 1a such that it can transmit power by connection with a link assembly of the seat cushion, and, as shown in FIG. 1, is actuated by a handle lever 3 that protrudes from a side of seat cushion 1a and moves up/down.

On the other hand, the pumping device is provided at a side in the seat, such that it is preferable for the pumping device to have a small size and volume in consideration of the space between the seat and the car body.

Further, the pumping device needs to smoothly operate when a user operates handle lever 3. In addition, the pumping device should have high operational sensitivity without generating noise in order to gain the consumers' confidence.

In particular, torque is exerted in the direction of moving down the seat cushion while a user is on the seat, such that the pumping device should not be suddenly actuated so that the seat does not jolt, even if the user operates handle lever 3 to move the seat cushion down.

Further, the pumping device should not be suddenly actuated so that the seat does not jolt, even if the user who is not in the seat operates handle lever 3 to move up the empty seat cushion.

DISCLOSURE OF INVENTION

Technical Problem

It is an object of the invention to provide a pumping device for a seat cushion of a vehicle, in which a brake assembly is disposed outside a clutch assembly and parts are entirely arranged in a line, such that the entire size, volume, and weight are reduced, thereby reducing cost and operational noise, and improving operational sensitivity.

Further, it is another object of the invention to provide a pumping device for a seat cushion of a vehicle that can smoothly operate and has improved stability by improving concentricity of components of the brake assembly, and has good operational sensitivity by preventing sudden operation due to torque that has been exerted in a brake shaft when a brake mechanism is unlocked.

Further, it is another object of the invention to reduce the weight, manufacturing cost and accomplish a compact pumping device by reducing the number of parts of a clutch assembly.

Further, it is another object of the invention to minimize operational loss of the clutch assembly in the next operation of a handle lever by additionally providing a friction plate between a connecting drum and a brake drum to increase a friction force between the connecting drum and the brake drum in order to prevent the connecting drum from returning to a neutral position when the handle lever returns to the neutral position.

Technical Solution

Embodiments of the present invention help overcome the drawbacks of pumping device for a seat cushion of a vehicle in the related art and provide a pumping device for a seat cushion of a vehicle that includes: a clutch assembly that is disposed in an outer case such that the clutch assembly is elastically rotated by operation of a handle lever, and adjusts the position of the seat cushion by transmitting power to a link assembly of the seat cushion; a brake assembly that is disposed outside the clutch assembly in the outer case and selectively locks the link assembly of the seat cushion of which the position has been adjusted, using the power transmitted from the clutch assembly; and a connecting drum that is disposed between the clutch assembly and brake assembly and transmits the power of the clutch assembly to the brake assembly.

Advantageous Effects

According to a pumping device of an embodiment of the invention, a brake assembly is disposed outside a clutch assembly and parts are entirely arranged in a line, such that it is possible to reduce the entire size, volume, and weight, thereby reducing cost. Further, because it is possible to prevent pollution of parts, it is possible to improve the durability, performance, and quality. Furthermore, it is possible to reduce operational noise and improve operational sensitivity.

Further, according to a pumping device of an embodiment of the invention, the pumping device smoothly operates and has improved stability by improving the concentricity of components of the brake assembly, including operational sensitivity by preventing a sudden operation due to torque that has been exerted in a bake shaft when a brake mechanism is unlocked.

Further, according to a pumping device of an embodiment of the invention, in addition to reducing the weight and manufacturing cost and achieving a compact pumping device by reducing the number of parts of a clutch assembly, it is possible to reduce operational loss of the clutch assembly in the next operation of a handle lever by additionally providing a friction plate between a connecting drum and a brake drum.

BRIEF DESCRIPTION OF THE DRAWINGS

FIG. 1 is a perspective view showing a seat equipped with a handle lever for actuating a pumping device according to an embodiment of the invention.

FIGS. 2 to 5 are perspective, and side views showing a pumping device that is exploded or assembled, according to a first embodiment of the invention.

FIG. 6 is a cross-sectional view taken along the line VI-VI of FIG. 4.

FIGS. 7 and 8 are cross-sectional views taken along the lines VII-VII and VIII-VIII of FIG. 3, respectively.

FIG. 9 is a cross-sectional view taken along the line IX-IX of FIG. 5.

FIGS. 10 and 11 are perspective views showing an outer case.

FIG. 12 is a perspective view showing a lever bracket.

FIGS. 13 and 14 are perspective views showing a spring stopper block.

FIG. 15 is a perspective view showing a leaf spring.

FIG. 16 is a perspective view showing a retainer assembly with clutch springs.

FIG. 17 is a perspective view showing a clutch shaft.

FIG. 18 is a perspective view showing a clutch block.

FIGS. 19 and 20 are perspective views showing a connecting drum.

FIGS. 21 and 22 are perspective views showing a brake drum.

FIG. 23 is a perspective view showing a roller assembly.

FIG. 24 is a perspective view showing a brake shaft.

FIG. 25 is a front view showing the brake drum with drum protrusions inserted in protrusion holes of the connecting drum.

FIG. 26 is a perspective view showing a cover plate.

FIGS. 27 and 28 are perspective views showing a pumping device, which is exploded and assembled, respectively, according to a second embodiment of the invention.

FIG. 29 is a cross-sectional view taken along the line XXIX-XXIX of FIG. 28.

FIG. 30 is a cross-sectional view taken along the line XXX-XXX of FIG. 28.

FIG. 31 is a cross-sectional view taken along the line XXXI-XXXI of FIG. 28.

FIGS. 32 and 33 are cross-sectional views illustrating the operation of a bracket protrusion and a spring actuating protrusion by up/down motion of a handle lever from the position shown in FIG. 31.

FIG. 34 is a cross-sectional view showing a clutch assembly and a brake assembly.

FIG. 35 is a cross-sectional view illustrating the relationship of a brake drum, a connecting drum, and the brake assembly, in which the upper view shows brake rollers when a force is not yet applied yet by the connecting drum and the lower view shows the brake roller when a force is applied.

FIG. 36 is a rear perspective view showing the pumping device according to the second embodiment of the invention, which has been assembled.

FIG. 37 is a perspective view showing a lever bracket.

FIGS. 38 and 39 are a perspective views showing an outer case.

FIG. 40 is a perspective view showing a clutch shaft.

FIG. 41 is a perspective view showing a clutch block.

FIGS. 42 and 43 are perspective views showing a spring stopper block equipped with clutch springs.

FIG. 44 is a perspective view showing a retainer assembly.

FIGS. 45 and 46 are perspective views showing the connecting drum.

FIG. 47 is a perspective view showing a friction plate.

FIGS. 48 and 49 are perspective views showing the brake drum.

FIG. 50 is a perspective view showing brake rollers and elastic members.

FIG. 51 is a perspective view showing a brake shaft.

FIG. 52 is a perspective view showing an elastic ring.

FIG. 53 is a perspective view showing the elastic ring combined.

MODE FOR THE INVENTION

Hereinafter, preferred embodiments of the invention are described in detail with reference to accompanying drawings.

A pumping device according to a first embodiment of the invention is shown in FIGS. 2 to 26, which is described first.

The pumping device according to a first embodiment of the invention includes a clutch assembly 30 and a brake assembly 40 that is disposed outside clutch assembly 30 to reduce the entire size, volume, and weight.

In detail, the pumping device includes a drum-shaped outer case 10, a lever bracket 20, clutch assembly 30, brake assembly 40, a connecting drum 50, and a cover plate 60. Outer case 10 is fixed inside seat cushion 1a. Lever bracket 20 is attached to the front of outer case 10 and a portion of which passes through and is disposed in outer case 10. Further, lever bracket 20 is connected to handle lever 3 and rotates to move handle lever 3 up/down. Clutch assembly 30 that is disposed in outer case 20 can be elastically rotated by lever bracket 20 and adjusts the position of seat cushion 1a by transmitting power to a link assembly of seat cushion 1a. Brake assembly 40 is disposed in outer case 10 and arranged in a line outside of clutch assembly 30, and selectively locks the link assembly of seat cushion 1a that has been moved to a desired position by the power transmitted from clutch assembly 30. Connecting drum 50 is disposed between clutch assembly 30 and brake assembly 40 and transmits the power from clutch assembly 30 to brake assembly 40. Cover plate 60 is attached to the rear, which is open, of outer case 10 to seal outer case 10.

Outer case 10 has a drum portion 11 that accommodates clutch assembly 30, brake assembly 40, and connecting drum 50, a shaft hole 12 that is formed at the center of drum portion 11, a plurality of protrusion holes 13 that is circumferentially formed at the same distance from shaft hole 12, an arc-shaped lever hole 14 that is circumferentially formed at a predetermined distance larger than the distance of protrusion hole 13 from shaft hole 12, a block protrusion hole 15 that is formed by cutting a portion of lever hole 14 toward shaft hole 12, a flange 16 that is formed along the circumference of drum portion 11 and bent in the radial direction of drum portion 11 to be in surface contact with cover plate 60, and a plurality of connection holes 17 and connection grooves 18 that are formed at flange 16.

Lever bracket 20 has a bracket hole 21 that is formed in a spline shape at the center, connection holes 22 that are circumferentially formed at the same distance from bracket hole 21 and where connecting members pass through for connection with handle lever 3, a bracket protrusion 23 that protrudes at a position on the outer circumference of lever bracket 20 toward outer case 10 and is inserted in lever hole 14, and lever connection grooves 24 that are formed at a plurality of positions along the outer circumference of lever bracket 20 and spaced apart from each other in order to increase a connection force with handle lever 3.

On the other hand, the distance L1 that is circumferentially defined between both ends of lever hole 14 is larger than the width D1 of bracket protrusion 23.

Further, bracket protrusion 23 is inserted in the center of lever hole 14 and rotated clockwise or counterclockwise within a predetermined rotation angle θ1 by handle lever 4, in which the rotation angle θ1 of bracket protrusion 23 is preferably in a range of 15 to 30°.

Clutch assembly 30 includes a spring stopper block 31, a leaf spring 32, a retainer assembly 33, clutch springs 34, a clutch shaft 35, and a clutch block 36.

Spring stopper block 31 has a plurality of connection protrusions 31a and a block protrusion 31b that are formed on the front facing outer case 10 and respectively inserted in protrusion holes 13 and block protrusion hole 15 formed through drum portion 11.

Further, a rotation locking protrusion 31c that extends from block protrusion 31b, a pair of guide flanges 31d that are symmetrically formed at predetermined sections, and a pair of spring actuating protrusions 31e that symmetrically protrude at a distance smaller than the distance of guide flange 31d from the center are formed of the outer circumference on the rear facing cover plate 60.

The width D2 and thickness T1 of block protrusion 31b has the same dimension as block protrusion hole 15 of outer case 10.

Leaf spring 32 is disposed between drum portion 11 of outer case 10 and spring stopper block 31 and has first and second support protrusions 32a, 32b that are bent at right angles at both ends, respectively. First and second support protrusions 32a, 32b are locked to the sides of bracket protrusion 23 and block protrusion 31b to apply a return force to rotation of lever bracket 20.

Retainer assembly 33 includes a cylindrical retainer 33a and a plurality of rollers 33b that is rotatably disposed along the circumference of retainer 33a.

A pair of protrusion guide grooves 33c where spring actuating protrusions 31e are inserted and a pair of spring seating grooves 33d that is formed in connection with each other at symmetric positions, respectively, are formed on the front of retainer 33a that is fitted on guide flanges 31d of spring stopper block 31. A retainer cut portion 33f is formed at a section of the outer circumference of protrusion guide groove 33c such that the rotation angle of spring stopper block 31 is controlled by locking steps 33e that selectively contact both sides of rotation locking protrusion 31c.

The lengths L4 and L5 defined along the circumferences between both ends of spring actuating protrusion 31e and protrusion guide groove 33c are the same.

Further, retainer cut portion 33f is formed along the outer circumference of one of protrusion guide grooves 33c.

Clutch springs 34 make a pair and are inserted in spring seating grooves 33d such that both ends are supported by both ends of spring seating groove 33d, respectively. Further, clutch springs 32 are elastically deformed by both ends of spring actuating protrusions 31e, which contact clutch springs 32, by rotation of retainer 33a.

Clutch shaft 35 has a shaft flange 35a that radially extends at a middle position in the longitudinal direction of the shaft and is disposed in retainer assembly 33, a case connection surface 35b that extends from shaft flange 35a in the longitudinal direction of the shaft and is disposed in shaft hole 12 of outer case 10, a first spline shaft 35c that extends from case connection surface 35b in the longitudinal direction of the shaft and is engaged in bracket hole 21 of lever bracket 20, a second spline shaft 35d that extends from shaft flange 35a in the opposite direction of first spline shaft 35c, and a center hole 35e formed through the centers of first and second spline shafts 35c, 35d.

Clutch block 36 has a block hole 36a that is formed in a spline shape through the center and engaged with second spline shaft 35d, and arc-shaped surfaces 36b each of which has a top H2 and bottoms L2 and repeatedly formed along the circumference that contacts with roller 33b of retainer assembly 33 when clutch block 36 is engaged with second spline shaft 35d.

Connecting drum 50 has a drum portion 51 that accommodates a portion of retainer assembly 33 such that rollers 33b of retainer assembly 33 contact with the inner circumference of drum portion 51, a drum hole 52 that is formed through the center of drum portion 51 and second spline shaft 35d of clutch shaft 35 passes through, a plurality of protrusion holes 53 that is formed at the same distance from drum hole 51a and circumferentially arranged at regular intervals, a flange 54 that is circumferentially formed and radially bent from drum portion 51, and a plurality of flange protrusions 55 that extends from the outer circumference of flange 54 and bends toward cover plate 60.

Protrusion hole 53 is a hole that increases in size in the radial direction.

On the other hand, brake assembly 40 according to an embodiment of the invention includes a brake drum 41, a roller assembly 42, and brake shaft 43.

First, brake drum 41 has a spline hole 41a that is formed through the center, a plurality of drum protrusions 41b that is circumferentially formed at the same distance from spline hole 41a and inserted in protrusion holes 53 of connecting drum 50, an outer flange 41c that protrudes from the outer circumference toward connecting drum 50 to accommodate drum portion 51 of connecting drum 50 and has a polygonal border with a plurality of planes 41c-1 and edges 41c-2 connecting planes 41c-1, an inner flange 41d that surrounds spline hole 41a and protrudes toward cover plate 60.

Further, roller assembly 42 includes a pair of rollers 42a, 42b that is inserted between flange protrusions 55 of connecting drum 50 and of which the outer circumference contacts with the inner circumference of drum portion 11 of outer case 10 and the outer circumference of outer flange 41c of brake drum 41, and a roller spring 42c that connects rollers 42a, 42b.

Roller spring 42c is a member having high elasticity and, for example, made of rubber, but is not limited thereto.

Finally, brake shaft 43 includes a first spline shaft 43b that protrudes from a flange 43a, which radially protrudes, in the longitudinal direction of brake shaft 43 to be engaged in spline hole 41a of brake drum 41 and a second spline shaft 43d that has an integral shaft rod 43c that is inserted in center hole 35e of clutch shaft 35, protrudes from flange 43a in the other longitudinal direction of brake shaft 43 to be engaged with the link assembly of seat cushion 1a to transmit power.

The length L3 defined in the circumferential direction between both ends of protrusion hole 53 is larger than the diameter D3 of drum protrusion 41b.

Further, the gap G1 between drum protrusion 41b and protrusion hole 53 is larger than the gap G2 between the pair of rollers 42a, 42b and flange protrusion 55.

Cover plate 60 has a flange hole 61 that is formed at the center and in which inner flange 41d of brake drum 41 is force-fitted, a plurality of assembly holes 62 that is formed along the outer circumference such that they are connected with connection holes 17 of outer case 10 and where fixing members pass through, and a plurality of connection hooks 63 that protrudes from the outer circumference toward outer case 10 and inserted in connection grooves 18 of outer case 10 to be locked by flanges 16.

The diameter of flange hole 61 is slightly smaller than the diameter of inner flange 41d of brake drum 41 to force-fit them. As a result, a second brake force can be obtained.

The operation of the pumping device according to a first embodiment of the invention is described hereafter.

In FIG. 1, it is assumed that as handle lever 3 is pulled up, lever bracket 20 rotates clockwise and seat cushion 1a is moved up.

On the contrary, it is assumed that as handle lever 3 is pushed down, lever bracket 20 rotates counterclockwise and seat cushion 1a is moved down.

First, when an occupant pulls handle lever 3 up to move the position of seat cushion 1a, lever bracket 20 connected with handle lever 3 rotates clockwise In this operation, first support protrusion 32a of leaf spring 32 is rotated clockwise with lever bracket 20 by bracket protrusion 23 of lever bracket 20 and second support protrusion 32b of leaf spring 32 is kept in lock by block protrusion 31b of spring stopper block 31.

Accordingly, leaf spring 32 is elastically contracted by the clockwise rotation of lever bracket 20 and then returns to the initial position by opposite rotation of lever bracket 20 due to an elastic return force.

On the other hand, as lever bracket 20 rotates clockwise, clutch shaft 35 engaged with lever bracket 20 and clutch block 36 engaged with clutch shaft 35 rotate clockwise (see FIG. 8).

As clutch block 36 rotates clockwise, roller 33b of retainer assembly 33 that has been at the bottom L2 of arc-shaped surface 36b comes in contact with top H2 of arc-shaped surface 36b, such that a space between clutch block 36 and drum portion 51 of connecting drum 50 is removed. Therefore, retainer 33a of retainer assembly 33 and connecting drum 50 rotates clockwise together with clutch block 36 by frictional force.

In this operation, as retainer assembly 33 rotates clockwise, one of the pair of clutch springs 34 in spring seating groove 33d of retainer assembly 33 is pressed and elastically deformed by spring actuating protrusion 31e of spring stopper block 31.

One of clutch springs 34 that is deformed stores an elastic force and the elastic force is converted into a return force that rotates retainer assembly 33 in the opposite direction and returns it to the initial position.

On the other hand, when connecting drum 50 is rotated clockwise with clutch block 36, drum protrusion 41a at the center of protrusion hole 53 as shown in FIG. 25 moves from the position and contacts with the left end of protrusion hole 53 where it can transmit power. At the same time, flange protrusion 55 of connecting drum 50 moves from the position shown in FIG. 9 and the right side of which presses left roller 42a, such that roller spring 42c is elastically contracted.

As left roller 42a of roller assembly 42 on plane 41c-1 of outer flange 41c of brake drum 41 is pressed by flange protrusion 55, left roller 42a moves right from plane 41c-1 and contracts roller spring 42c, such that roller spring 42c generates a force that moves right roller 42b from a return force. However, because right roller 42b is in lock by adjacent right edge 41c-2, roller spring 42c cannot return unless brake drum 41 rotates and right roller 42b kept locked.

In the above condition, when connecting drum 50 further rotates clockwise, brake drum 41 receives a rotation force through protrusion hole 53 and drum protrusion 41a and then rotates clockwise. Further, roller spring 42c that has been contracted returns while moving right roller 42b to the right and is in ready for the next operation.

Further, after left and right rollers 42a, 42b have been moved, they are locked again between edges 41c-2.

On the other hand, as brake drum 41 rotates clockwise, brake shaft 43 engaged with brake drum 41 rotates in the same direction and the power is transmitted to the link assembly of seat cushion 1a connected with brake shaft 43, such that seat cushion 1a is moved up at a distance corresponding to rotation of one pitch of brake drum 41.

Handle lever 3 that has been pulled up to move seat cushion 1a up is released, only retainer assembly 33, clutch block 36, and clutch shaft 35 are returned to the initial positions by a return force of clutch spring 34 and in ready for the next operation. Further, lever bracket 20 and handle lever 3 are returned to the initial position by a return force of leaf spring 32 and in ready for the next operation.

On the other hand, when retainer assembly 33 is returned by a return force of clutch spring 34, roller 33b that is in contact to top H2 of arc-shape surface 36b reaches bottom L2 of arc-shaped surface 36b, such that the space between clutch block 36 and drum portion 51 of connecting drum 50 that has been removed is formed again. As a result, the rotation force exerted in the return direction of retainer assembly 58 (counterclockwise rotation force) is transmitted to connecting drum 50.

Brake assembly 40 with connecting drum 50 keeps locking the link assembly of seat cushion 1a that has been moved, such that seat cushion 1a is held at the lifted position.

Further, clutch shaft 35 and brake shaft 43 are not locked by each though clutch shaft 35 is being returned by the return force of clutch spring 34; therefore, power is not transmitted to brake assembly 40 even in this condition.

On the other hand, when the occupant wants to further move seat cushion 1a up, he/she has only to repeat the above action, whereas when the occupant wants to move seat cushion 1a down, he/she pushes down handle lever 3 and seat cushion 1a is moved down.

When handle lever 3 is pushed down, clutch assembly 30 and brake assembly 40 operate in the opposite direction to the above operation, which is not described.

Therefore, since brake assembly 40 is disposed outside clutch assembly 30 and clutch assembly 30 and brake assembly 40 are arranged in a line in the entire structure, the entire size, volume, and weight of the pumping device according to the first embodiment of the invention is reduced.

As a result, it is possible to reduce the manufacturing cost of the pumping device according to this embodiment and it is also of advantage to apply the pumping device to a compact car.

Further, since clutch springs 34 are accommodated in retainer 33a, it is possible to simplify the configuration and reduce the entire size and volume of the pumping device according to the first embodiment of the invention.

Further, since leaf spring 32 that elastically applies a return force to operation of lever bracket 20 is accommodated in outer case 10, it is possible to minimize the amount of dust or other impurities that may stick to leaf spring 32 with grease applied. As a result, it is possible to improve the durability, such that it is possible to improve the entire performance and quality of the pumping device.

Further, since inner flange 41d is additionally formed in brake drum 41, it is possible to maintain firm connection with cover plate 60. Therefore, it is possible to improve the operational sensitivity, in addition to reducing an operational noise.

A pumping device according to a second embodiment of the invention is described hereafter with reference to FIGS. 27 to 52.

A pumping device according to the second embodiment of the invention has a clutch assembly 30 and a brake assembly 40 disposed outside clutch assembly in order to reduce the entire size, volume, and weight.

In detail, the pumping device includes a cylindrical outer case 10, clutch assembly 30, brake assembly 40, a connecting drum 50, a lever bracket 20, and a cover plate 60. Outer case 10 is fixed inside seat cushion 1a and has an inner circumference. Clutch assembly 30 is accommodated inside outer case 10 such that it can elastically rotated by operating handle lever 3 and allows the adjustment of the position of seat cushion by transmitting power to a link assembly of seat cushion 1a. Brake assembly 40 is disposed in outer case 10 outside of clutch assembly 30 and selectively locks the link assembly of seat cushion 1a that has been moved at a desired position by the power transmitted from clutch assembly 30. Connecting drum 50 is disposed between clutch assembly 30 and brake assembly 40 and transmits the power from clutch assembly 30 to brake assembly 40. Lever bracket 20 is attached to the front of outer case 10 and connected with handle lever 3, a portion of which passing through and disposed in outer case 10 is combined with clutch assembly 30, and transmits rotational power to clutch assembly 30 when handle lever 3 is pulled up or pushed down. Cover plate 60 is attached to the rear, which is open, of outer case 10 to seal outer case 10.

Further, the pumping device according to the second embodiment of the invention further includes an elastic ring 70 and a friction plate 80. Elastic ring 70 is disposed between brake assembly 40 and outer case 10 and rotates with brake assembly 40 by connection with brake assembly 40, and the outer circumference is in press contact with the inner circumference of outer case 10 so that a friction force is always exerted between the inner circumference of outer case 10 and the outer circumference by applying an elastic force that presses the inner circumference of outer case 10. Friction plate 80 is disposed between a side facing brake assembly 40 of connecting drum 50 and brake assembly 40, increases a friction force between connecting drum 50 and brake assembly 40, and restricts the return of connecting drum 50 to a neutral position when handle lever 3 returns to a neutral position.

Outer case 10 has cover plate 60 attached thereto and accommodates clutch assembly 30, brake assembly 40, connecting drum 50, elastic ring 70, and friction plate 80.

Lever bracket 20 is disposed outside outer case 10 and a bracket protrusion 23 that is integrally formed with lever bracket 20 passes through a lever hole 14 formed in outer case 10 and is fitted in a first operational hole 334 of a spring stopper block 330 (described below) of clutch assembly 30.

A shaft hole 12 where an end of clutch shaft 310 passes through is formed at the center of outer case 10, a plurality of protrusion holes 19 is formed at a predetermined radial distance from the center of shaft hole 12, and one of protrusion holes 19 is connected with lever hole 14.

Clutch assembly 30 includes: clutch shaft 310 of which an end passes through the centers of outer case 10 and lever bracket 20 and is engaged with lever bracket 20, and of which the center is fitted on an end of brake assembly 40; a clutch block 320 that is engaged with the other end of clutch shaft 310 and has a plurality of wedge surfaces 321 that is continuously formed along the outer circumference; a spring stopper block 330 that is fixed in outer case 10 such that it is in contact with a side facing outer case 10 of a flange 54 of connecting drum 50; a retainer assembly 340 that is disposed between the outer circumference of clutch block 320 and connecting drum 50 and has a plurality of clutch rollers 341 that is disposed between wedge surfaces 321 of clutch block 320 and connecting drum 50; and a pair of clutch springs 350 that applies an elastic return force to rotation of lever bracket 20 and is inserted in spring grooves 331 that are circumferentially divided into two equal parts in spring stopper block 330 in order to apply an elastic return force to retainer assembly 340 that rotates with lever bracket 20.

Spring stopper block 330 has a plurality of connection protrusions 332 that protrudes to be fitted in protrusion holes 19 of outer case 10, a pair of stopper protrusions 333 that are formed at a predetermined radial distance outward from two connection protrusions 332 facing each other of connection protrusions 332 and functions as a stopper together with connection protrusions 332 by supporting both ends of clutch springs 350 inserted in spring grooves 331, a first actuating hole 334 that is formed in an arc shape between connection protrusion 332 and stopper protrusion 333 and where bracket protrusion 23 is fitted, and a second actuating hole 335 that is formed in a similar shape with first actuating hole 334 at a position facing first actuating hole 334.

Further, retainer assembly 340 has a plurality of retainer protrusions 342 that protrude to be fitted in spring stopper block 330 and contact with inner circumference 336 and a spring actuating protrusion 343 that is fitted in second actuating hole 335 of spring stopper block 330.

Brake assembly 40 includes a brake drum 410, a brake shaft 420, elastic members 430, and brake rollers 440. Brake drum 410 is disposed in connecting drum 50 facing outer case 10 and has a plurality of coaxial supports 411 that is in contact with the inner circumference of outer case 10, and wedge surfaces 412 formed at both sides of coaxial support 411, around outer circumference. A portion of brake shaft 420 passes through brake drum 410 and is engaged with brake drum 410 and the opposite portion passes through cover plate 60 and is connected to the link assembly of seat cushion 1a to transmit power, in which the end of the portion passing through brake drum 410 is fitted in the center of clutch shaft 310. Elastic member 430 is fitted around coaxial support 411 and provides an elastic force outside coaxial support 411. Brake roller 440 is disposed between wedge surface 412 and the inner circumference of outer case 10 such that it is supported by the elastic force of elastic member 430, and pressed to coaxial support 411 against the force of elastic member 430 by rotation of connecting drum 50.

Coaxial support 411 has a column 411a that radially protrudes from between wedge surfaces 412 of brake drum 410 and a wing that is formed in an arc shape with a wide cross-sectional area at the free end of column 411a and contacts with the inner circumference of outer case 10.

Wedge surface 412 of brake drum 410 is a slope, and the farther away from coaxial support 411, the more the distance from the center of brake drum 410 to the slope increases.

A stopper protrusion 413 that restricts movement of brake roller 440 is formed at the end of wedge surface 412 that is adjacent to the column 411a of brake drum 410 and stopper surfaces 411c that restrict brake roller 440 from approaching column 411a together with stopper protrusion 413 are formed at both ends of a wing 411b of coaxial support 411.

Therefore, when brake roller 440 is pressed to column 411a of coaxial support 411, elastic member is excessively pressed, which causes permanent deformation of elastic member 430 beyond the elastic deformation limit.

Elastic member 430 is a W-shaped leaf spring.

Further, elastic ring 70 is disposed between brake drum 410 and outer case 10 and combined with brake drum 410.

Further, friction plate 80 is disposed between a side facing brake drum 410 of flange 54 of connecting drum 50 and coaxial support 411 of brake drum 410.

On the other hand, elastic ring 70 has at least two or more connection protrusions 71 for combination with brake drum 410 and brake drum 410 has connection holes 414 where connection protrusions 71 are inserted.

Further, friction plate 80 has a circular edge 81 that is in surface contact with flange 54 of connecting drum 50 and a plurality of protrusions 82 that radially protrudes from circular edge 81 and is in surface contact with coaxial supports 411 of brake drum 410.

The operation of clutch assembly 30 is as follows.

A neutral position is shown in FIG. 31, in which bracket protrusion 23 lever bracket 20 that is inserted in first actuating hole 334 is not affected by the elasticity of clutch springs 350.

In the neutral position, spring actuating protrusion 343 of retainer assembly 340 that is inserted in second actuating hole 335 is also not affected by the elasticity of clutch springs 350.

Handle lever 3 is positioned at the middle of the up/down movement, in the neutral position as shown in FIG. 1.

Rotation of lever bracket 20 in one direction from the neutral position moves seat cushion 1a up and rotation in the opposite direction moves down seat cushion 1a. Seat cushion 1a is gradually moved up by repeating the operation of pulling handle lever 3 up and returning it to the neutral position, whereas seat cushion 1a is gradually moved down by repeating the operation of pushing down handle lever 3 and returning it to the neutral position.

As handle lever 3 is pulled up or pushed down from the neutral position and lever bracket 20 connected with handle lever 3 correspondingly rotates, clutch shaft 310 engaged with lever bracket 20 and clutch block 320 engaged with clutch shaft 310 integrally rotate. Further, as clutch block 320 rotates, wedge surface 321 rotates and clutch roller 341 is stuck between connecting drum 50 and clutch block 320, such that retainer assembly 340 and connecting drum 50 are integrally rotated by the rotation force transmitted from clutch block 320.

As handle lever 3 is pulled up from the neutral position to move seat cushion 1a up, bracket protrusion 23 of lever bracket 20 moves right along first actuating hole 334 and contracts right clutch spring 350, as shown in FIG. 32, while spring actuating protrusion 343 of retainer assembly 340 moves to the left along second actuating hole 335 and contracts left clutch spring 350.

On the contrary, as handle lever 3 is pushed down from the neutral position to move down seat cushion 1a, bracket protrusion 23 of lever bracket 20 moves left along first actuating hole 334 and contracts left clutch spring 350 as shown in FIG. 33, while spring actuating protrusion 343 of retainer assembly 340 moves right along second actuating hole 335 and contracts right clutch spring 350.

On the other hand, after connecting drum 50 rotates, when handle lever 3 that has been pulled up or pushed down returns to the neutral position by releasing the operational force of a user, retainer assembly 340, clutch block 320, and clutch shaft 310 are integrally rotated and returned to the neutral position by the return force of clutch spring 350 while lever bracket 30 is also rotated separately and returned to the neutral position by the return force of clutch spring 350.

The rotation force of connecting drum 50 is transmitted to brake drum 410 through brake assembly 40 and brake drum 410 correspondingly rotates. Connecting drum 50 that has rotated is locked to brake drum 410 by friction plate 80 and cannot return to the neutral position, which is described below.

On the other hand, friction plate 80 according to an embodiment of the invention is disposed between connecting drum 50 and brake drum 410, such that friction plate 80 increases a friction force between connecting drum 50 and brake drum 410.

Friction plate 80 locks connecting drum 50 to brake drum 410 when handle lever 3 returns to the neutral position, such that connecting drum 50 cannot return to the neutral position, which minimizes operational loss of clutch assembly 30 in the next operation of handle lever 3.

Since brake drum 410 has a plurality of coaxial supports 411 that is circumferentially formed as shown in FIGS. 48 and 49, while brake drum 410 is disposed in outer case 10 as shown in FIG. 35, coaxial supports 411 are in contact with inner circumference of outer case 10, such that it is possible to secure the concentricity of brake drum 410 to outer case 10.

When the concentricity of brake drum 410 to outer case 10 is secured as described above, it is possible to accomplish smooth and quiet operation as compared with when brake drum 410 rotates with respect to outer case 10. As a result, it is possible to improve the operational sensitivity from a user and durability of other peripheral parts in addition to the pumping device for a seat cushion according to an embodiment of the invention.

The operation of brake assembly 40 is described hereafter with reference to FIG. 35.

Hereafter, it is assumed that an operational force of a user is applied to handle lever 3 to move down seat cushion 1a and the operational force is applied counterclockwise in FIG. 35.

As shown at the upper portion in FIG. 35, before a user applies an operational force, brake roller 440 is stuck between wedge surface 412 of brake drum 410 and the inner circumference of outer case 10 by elastic member 430 and brake drum 410 is in lock such that it cannot rotate in any direction with respect to outer case 10.

As an operational force of a user is applied and connecting drum 50 is rotated counterclockwise by clutch assembly 30, connecting drum 50 pushes brake roller 440 to coaxial support 411, such that brake drum 410 is unlocked such that it can rotate counterclockwise.

Subsequently, when connecting drum 50 rotates slightly more, as shown at the lower portion in FIG. 35, brake roller 440 contacts to stopper protrusion 413 and stopper surface 411c. Further, the rotation force provided from connecting drum 50 is transmitted to brake drum 410 through brake roller 440 and coaxial support 411, such that brake drum 410 rotates.

Since brake shaft 420 is engaged with brake drum 410, as brake shaft 420 rotates, the separate link assembly in seat cushion 1a is actuated and seat cushion 1a is moved up.

On the other hand, because connecting drum 50 that has rotated is engaged to brake drum 410 by friction plate 80, connecting drum 50 that has rotated cannot return to the neutral position, together with brake drum 410, when handle lever 3 returns to the neutral position.

Therefore, clutch assembly 30 is immediately actuated in the next operation of handle lever 3, such that it is possible to minimize operational loss of clutch assembly 30.

In the related art, as described above, the configuration for unlocking brake drum 410 locked with respect to outer case 10 and the configuration for rotating brake drum 410 with respect to outer case 10 are separately provided. However, according to an embodiment of the invention, as described above, since the function of unlocking and rotating brake drum 410 is accomplished by the same configuration, it is possible to simplify the manufacturing process of the pumping device for a cushion. Further, in the operation, it is also possible to improve the operational efficiency from the continuous operation by a single configuration as compared with the sequential operation by separate parts.

On the other hand, according to an embodiment of the invention, elastic ring 70 that provides a constant friction force between brake drum 410 and outer case 10 is further included.

Further, according to this embodiment, as shown in FIG. 52, elastic ring 70 has at least two or more connection protrusions 71 that are connected to brake drum 410 and a plurality of curved portions formed along the circumference, such that the outer circumference of elastic ring 70 is in press contact to the inner circumference of outer case 10.

Further, as described above, connection holes 414 where connection protrusions 71 are inserted are formed in brake drum 410.

Combined with brake drum 410 as shown in FIG. 58, elastic ring 70 rotates with brake drum 410 and a friction force is always applied between the inner circumference of outer case 10 and outer circumference of elastic ring 70 by elastic force that presses the inner circumference of outer case 10.

Elastic ring 70 disposed as described above is actuated when brake drum 410 is unlocked with respect to outer case 10 by movement of brake roller 440 due to rotation of connecting drum 50.

That is, when brake drum 410 is unlocked as described above, it is prevented that brake shaft 420 and brake drum 410 are suddenly rotated by brake drum 410, unlike to the user's intention, by torque that is exerted in brake shaft 420 by weight of the occupant on seat cushion 1a or torque that is provided to counterbalance against the above torque.

Even though brake drum 410 is unlocked by movement of brake roller 440 by connecting drum 50, brake drum 410 is not suddenly rotated with respect to outer case 10 by the friction force applied by elastic ring 70, such that brake drum 410 is rotated by only the operation force applied by the user.

Industrial Applicability

Therefore, pumping device for a seat cushion according to an embodiment of the invention provides smooth and quiet operation when a user operates the pumping device.

Further, according to the pumping device according to an embodiment of the invention, since lever bracket 20 and retainer assembly 340 are elastically rotated by clutch springs 350 that are common parts, it is possible to reduce the number of parts of clutch assembly 30, the entire weight, and the manufacturing cost, and achieve a compact pumping device, as compared with the related art in which lever bracket 20 and retainer assembly 340 are elastically rotated by separate springs, respectively.

Further, according to an embodiment of the invention, since when handle lever 3 returns to the neutral position, connecting drum 50 that has rotated cannot return to the neutral position, together with brake drum 410, by friction plate 80 disposed between connecting drum 50 and brake drum 410, it is possible to minimizes operational loss of clutch assembly 30 in the next operation of handle lever 3.

The invention claimed is:

1. A pumping device for a seat cushion of a vehicle comprising:
    a clutch assembly that is disposed in an outer case such that the clutch assembly is elastically rotated by operation of a handle lever, and adjusts the position of the seat cushion by transmitting power to a link assembly of the seat cushion;
    a brake assembly that is disposed outside the clutch assembly in the outer case and selectively locks the link assembly of the seat cushion of which the position has been adjusted, using the power transmitted from the clutch assembly; and
    a connecting drum that is disposed between the clutch assembly and brake assembly and transmits the power of the clutch assembly to the brake assembly;
    a lever bracket that is attached to the front of the outer case and connected with the handle lever, a portion of which passing through and disposed in the outer case is combined with the clutch assembly, and transmits rotational power to the clutch assembly when the handle lever is pulled up or pushed down; and
    a cover plate that is attached to the rear, which is open, of the outer case to seal the outer case,
    wherein the outer case has:
        a drum portion that accommodates the clutch assembly, the brake assembly, and the connecting drum;
        a shaft hole that is formed at the center of the drum portion;
        a plurality of protrusion holes that is circumferentially formed at the same distance from the shaft hole;
        an arc-shaped lever hole that is circumferentially formed at a predetermined distance larger than the distance of the protrusion hole from the shaft hole;
        a block protrusion hole that is formed by cutting a portion of the lever hole toward the shaft hole; a flange that is formed along the circumference of the drum portion and bent in the radial direction of the drum portion to be in surface contact with the cover plate; and
        a plurality of connection holes and connection grooves that are formed at the flange.

2. The pumping device as defined in claim 1, wherein the lever bracket has:
    a bracket hole that is formed in a spline shape at the center;
    connection holes that are circumferentially formed at the same distance from the bracket hole and where connecting members pass through for connection with the handle lever; a bracket protrusion that protrudes at a position on the outer circumference of the lever bracket toward the outer case and is inserted in the lever hole; and
    lever connection grooves that are formed at a plurality of positions along the outer circumference of the lever bracket and spaced apart from each other in order to increase a connection force with the handle lever.

3. The pumping device as defined in claim 2, wherein a distance that is circumferentially defined between both ends of the lever hole is larger than the width of the bracket protrusion, the bracket protrusion is inserted in the center of the lever hole and rotated clockwise or counterclockwise within a range of 15 to 30° by the handle lever.

4. The pumping device as defined in claim 2, wherein the clutch assembly includes:
    a spring stopper block having a plurality of connection protrusions and a block protrusion that are formed on the front facing the outer case and respectively inserted in the protrusion holes and the block protrusion hole formed through the drum portion, a rotation locking protrusion that extends from the block protrusion, a pair of guide flanges that are formed at predetermined sections, and a pair of spring actuating protrusions that protrude at a distance smaller than the distance of the guide flange from the center, along the outer circumference on the rear facing the cover plate; a leaf spring that is disposed between the drum portion and the spring stopper block and has first and second support protrusions that are bent at right angles at both ends, respectively, and locked to the sides of the bracket protrusion and the block protrusion to apply a return force to rotation of the lever bracket;
    a retainer assembly that includes a cylindrical retainer and a plurality of rollers rotatably disposed along the circumference of retainer, and has a pair of protrusion guide grooves where the spring actuating protrusions are inserted and a pair of spring seating grooves that are formed in connection with each other at symmetric positions, respectively, on the front that is fitted on the guide flanges, and a retainer cut portion that is formed at a section of the outer circumference of the protrusion guide groove such that the rotation angle of the spring stopper block is controlled by locking steps that selectively contact both sides of the rotation locking protrusion;
    a pair of clutch springs that are inserted in the spring seating grooves such that both ends are supported by both ends of the spring seating grooves, respectively, and elastically deformed by both ends of the spring actuating protrusions, which contact the clutch springs, by rotation of the retainer;

a clutch shaft that has a shaft flange that radially extends at a middle position in the longitudinal direction of the shaft and is disposed in the retainer assembly, a case connection surface that extends from the shaft flange in the longitudinal direction of the shaft and is disposed in a shaft hole of the outer case, a first spline shaft that extends from the case connection surface in the longitudinal direction of the shaft and is engaged in the bracket hole of the lever bracket, a second spline shaft that extends from the shaft flange in the opposite direction of the first spline shaft, and a center hole that is formed through the centers of the first and second spline shafts; and a clutch block that has a block hole that is formed in a spline shape through the center and engaged with second spline shaft ,and arc-shaped surfaces each of which has a top and bottoms and repeatedly formed along the circumference that contacts with the roller of the retainer assembly when the clutch block is engaged with the second spline shaft.

5. The pumping device as defined in claim 4, wherein the width and thickness of the block protrusion has the same dimension as the block protrusion hole.

6. The pumping device as defined in claim 4, wherein the lengths defined along the circumferences between both ends of the spring actuating protrusion and the protrusion guide groove are the same.

7. The pumping device as defined in claim 4, wherein the retainer cut portion is formed along the outer circumference of one of the protrusion guide grooves.

8. The pumping device as defined in claim 4, wherein the connecting drum has:

a drum portion that accommodates a portion of the retainer assembly such that the rollers of the retainer assembly contact with the inner circumference of the drum portion;

a drum hole that is formed through the center of the drum portion and the second spline shaft of the clutch passes through;

a plurality of protrusion holes that is formed at the same distance from the drum hole and circumferentially arranged at regular intervals;

a flange that is circumferentially formed and radially bent from the drum portion;

a plurality of flange protrusions that extends from the outer circumference of the flange and bends toward the cover plate.

9. The pumping device as defined in claim 8, wherein the protrusion hole is a hole that increases in size in the radial direction.

10. The pumping device as defined in claim 8, wherein the brake assembly includes:

a brake drum having a spline hole that is formed through the center, a plurality of drum protrusions that is circumferentially formed at the same distance from the spline hole and inserted in the protrusion holes of the connecting drum, an outer flange that protrudes from the outer circumference toward the connecting drum to accommodate the drum portion of the connecting drum and has a polygonal border with a plurality of planes and edges connecting the planes, an inner flange that surrounds the spline hole and protrudes toward the cover plate;

a roller assembly including a pair of rollers that is inserted between the flange protrusions of the connecting drum and of which the outer circumference contacts with the inner circumference of the drum portion of the outer case and the outer circumference of the outer flange of the brake drum, and a roller spring that connects the rollers; and a brake shaft including a first spline shaft that protrudes from a flange, which radially protrudes, in the longitudinal direction of the brake shaft to be engaged in the spline hole of the brake drum and a second spline shaft that has an integral shaft rod, which is inserted in center hole of clutch shaft, protrudes from flange in the other longitudinal direction of the brake shaft to be engaged with the link assembly of the seat cushion to transmit power.

11. The pumping device as defined in claim 10, wherein a gap between the drum protrusion and the protrusion hole is larger than a gap between the pair of rollers and the flange protrusion.

12. The pumping device as defined in claim 10, wherein the cover plate has:

a flange hole that is formed at the center and in which the inner flange of the brake drum is force-fitted;

a plurality of assembly holes that is formed along the outer circumference such that the assembly holes are connected with the connection holes of the outer case and where fixing members pass through; and a plurality of connection hooks that protrudes from the outer circumference toward the outer case and inserted in the connection grooves of the outer case to be locked by flanges.

13. The pumping device as defined in claim 1, further comprising:

an elastic ring that is disposed between the brake assembly and the outer case and rotates with the brake assembly by connection with the brake assembly, and the outer circumference is in press contact with the inner circumference of the outer case so that a friction force is always exerted between the inner circumference of the outer case and the outer circumference by applying an elastic force that presses the inner circumference of the outer case.

14. The pumping device as defined in claim 13, further comprising: a friction plate that is disposed between a side facing the brake assembly of the connecting drum and the brake assembly, increases a friction force between the connecting drum and the brake assembly, and restricts the return of the connecting drum to a neutral position when the handle lever returns to the neutral position.

15. The pumping devices as defined in claim 14, wherein the clutch assembly includes:

a clutch shaft of which an end passes through the centers of the outer case and the lever bracket and is engaged with the lever bracket, and of which the center is fitted on an end of brake assembly;

a clutch block that is engaged with the other end of the clutch shaft and has a plurality of wedge surfaces that is continuously formed along the outer circumference;

a spring stopper block that is fixed in the outer case such that the spring stopper block is in contact with a side facing the outer case of the flange of the connecting drum;

a retainer assembly that is disposed between the outer circumference of the clutch block and the connecting drum and has a plurality of clutch rollers that is disposed between the wedge surfaces of the clutch block and the connecting drum; and a pair of clutch springs that applies an elastic return force to rotation of the lever bracket and is inserted in spring grooves that are circumferentially divided into two equal parts in the spring stopper block in order to apply an elastic return force to the retainer assembly that rotates with the lever bracket.

16. The pumping device as defined in claim 15, wherein the spring stopper block has:
   a plurality of connection protrusions that protrudes to be fitted in the protrusion holes of the outer case;
   a pair of stopper protrusions that are formed at a predetermined radial distance outward from two connection protrusions facing each other of the connection protrusions and functions as a stopper together with the connection protrusions by supporting both ends of the clutch springs inserted in the spring grooves;
   a first actuating hole that is formed in an arc shape between the connection protrusion and the stopper protrusion and where the bracket protrusion is fitted; and
   a second actuating hole that is formed at a position facing first actuating hole.

17. The pumping device as defined in claim 16, wherein the retainer assembly has:
   a plurality of retainer protrusions that protrudes to be fitted in the spring stopper block and contacts with the inner circumference of the spring stopper block; and
   a spring actuating protrusion that is fitted in the second actuating hole of the spring stopper block.

18. The pumping device as defined in claim 15, wherein the brake assembly includes:
   a brake drum that is disposed in the connecting drum facing the outer case and has a plurality of coaxial supports that is in contact with the inner circumference of the outer case and wedge surfaces that are formed at both sides of the coaxial support, around the outer circumference of the brake drum;
   a brake shaft of which a portion passes through the brake drum and is engaged with the brake drum and the opposite portion passes through the cover plate and is connected to the link assembly of the seat cushion to transmit power, the end of the portion that passes through brake drum being fitted in the center of the clutch shaft.
   an elastic member that is fitted around the coaxial support and provides an elastic force outside the coaxial support; and
   brake rollers that are disposed between the wedge surfaces and the inner circumferences of the outer cases, supported by an elastic force of the elastic member, and pressed to the coaxial supports against the force of the elastic member by rotation of the connecting drum.

19. The pumping device as defined in claim 18, wherein the elastic member is a W-shape leaf spring.

20. The pumping device as defined in claim 18, the elastic ring is disposed between the brake drum and the outer case and combined with the brake drum.

21. The pumping device as defined in claim 20, wherein the elastic ring has:
   at least two or more connection protrusions for combination with the brake drum; and
   the brake drum has connection holes where the connection protrusions are inserted.

22. The pumping device as defined in claim 18, wherein the friction plate is disposed between a side facing the brake drum of the flange of the connecting drum and the coaxial support of the brake drum.

23. The pumping device as defined in claim 22, wherein the friction plate has:
   a circular edge that is in surface contact with the flange of the connecting drum; and
   a plurality of protrusions that radially protrudes from the circular edge and is in surface contact with the coaxial supports of the brake drum.

* * * * *